United States Patent
Lee et al.

(10) Patent No.: US 11,678,301 B2
(45) Date of Patent: *Jun. 13, 2023

(54) V2X TRANSMISSION RESOURCE SELECTING METHOD IMPLEMENTED BY TERMINAL IN WIRELESS COMMUNICATION SYSTEM AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/465,591

(22) Filed: Sep. 2, 2021

(65) Prior Publication Data

US 2021/0400638 A1 Dec. 23, 2021

Related U.S. Application Data

(63) Continuation of application No. 16/082,207, filed as application No. PCT/KR2017/002413 on Mar. 6, 2017, now Pat. No. 11,147,044.

(Continued)

(51) Int. Cl.
*H04W 72/02* (2009.01)
*H04W 88/06* (2009.01)
(Continued)

(52) U.S. Cl.
CPC ............ *H04W 72/02* (2013.01); *H04W 4/40* (2018.02); *H04W 8/24* (2013.01); *H04W 24/10* (2013.01);
(Continued)

(58) Field of Classification Search
CPC ..................................... H04W 72/02
See application file for complete search history.

(56) References Cited

U.S. PATENT DOCUMENTS 9,531,494 B2 12/2016 Somasundaram et al.
9,942,879 B2 4/2018 Kim et al.
(Continued)

FOREIGN PATENT DOCUMENTS

EP 3142426 5/2015
KR 1020160003257 1/2016
(Continued)

OTHER PUBLICATIONS

3GPP TSG-RAN WG2 #95bis, R2-166967, Kaohsiung, Taiwan, Oct. 10-14, 2016; Agenda Item: 8.13.3; Source: Ericsson; Title: Discussion on Sidelink Operations for Pedestrian. (Year: 2016).*
(Continued)

*Primary Examiner* — Abdeltif Ajid
(74) *Attorney, Agent, or Firm* — Fish & Richardson P.C.

(57) ABSTRACT

Disclosed are a V2X (vehicle-to-everything) transmission resource selecting method implemented by a terminal in a wireless communication system and a terminal using the method. The method is characterized by: receiving type information for indicating the type of a resource pool; and executing a resource selection, on the basis of partial sensing, and/or a random selection from the resource pool on the basis of the type information.

9 Claims, 26 Drawing Sheets

Related U.S. Application Data

(60) Provisional application No. 62/423,738, filed on Nov. 17, 2016, provisional application No. 62/416,669, filed on Nov. 2, 2016, provisional application No. 62/403,028, filed on Sep. 30, 2016, provisional application No. 62/401,743, filed on Sep. 29, 2016, provisional application No. 62/379,221, filed on Aug. 24, 2016, provisional application No. 62/350,727, filed on Jun. 16, 2016, provisional application No. 62/333,862, filed on May 10, 2016, provisional application No. 62/321,748, filed on Apr. 13, 2016, provisional application No. 62/316,574, filed on Apr. 1, 2016, provisional application No. 62/303,389, filed on Mar. 4, 2016.

(51) Int. Cl.
*H04W 24/10* (2009.01)
*H04W 8/24* (2009.01)
*H04W 52/34* (2009.01)
*H04W 52/38* (2009.01)
*H04W 72/044* (2023.01)
*H04W 72/56* (2023.01)
*H04W 4/40* (2018.01)
*H04W 92/18* (2009.01)
*H04W 72/0446* (2023.01)

(52) U.S. Cl.
CPC ....... *H04W 52/346* (2013.01); *H04W 52/383* (2013.01); *H04W 72/044* (2013.01); *H04W 72/56* (2023.01); *H04W 88/06* (2013.01); *H04W 72/0446* (2013.01); *H04W 92/18* (2013.01); *Y02D 30/70* (2020.08)

(56) References Cited

U.S. PATENT DOCUMENTS

| | | | |
|---|---|---|---|
| 10,057,076 | B2 | 8/2018 | Sartori et al. |
| 10,383,147 | B2 | 8/2019 | Rajagopal et al. |
| 10,477,527 | B2 | 11/2019 | Jiang et al. |
| 10,959,209 | B2 * | 3/2021 | Xu ...................... H04W 72/044 |
| 2015/0327180 | A1 | 11/2015 | Ryu et al. |
| 2015/0334760 | A1 | 11/2015 | Sartori et al. |
| 2016/0044619 | A1 | 2/2016 | Ryu et al. |
| 2016/0135148 | A1 | 5/2016 | Novlan et al. |
| 2016/0219566 | A1 | 7/2016 | Jung et al. |
| 2016/0295624 | A1 | 10/2016 | Novlan et al. |
| 2016/0330729 | A1 | 11/2016 | Wei et al. |
| 2016/0338121 | A1 | 11/2016 | Wietfeldt et al. |
| 2017/0188381 | A1 | 6/2017 | Batista et al. |
| 2017/0188391 | A1 * | 6/2017 | Rajagopal ......... H04W 74/0816 |
| 2017/0230918 | A1 * | 8/2017 | Ryu .................... H04W 52/383 |
| 2017/0238321 | A1 | 8/2017 | Sartori et al. |
| 2017/0265198 | A1 | 9/2017 | Sorrentino et al. |
| 2018/0020387 | A1 * | 1/2018 | Van Der Velde ... H04W 72/542 |
| 2018/0176871 | A1 | 6/2018 | Li et al. |
| 2018/0227971 | A1 | 8/2018 | Yasukawa et al. |
| 2018/0317239 | A1 | 11/2018 | Wang et al. |
| 2020/0084738 | A1 | 3/2020 | Nguyen |
| 2020/0314803 | A1 * | 10/2020 | Zhang .............. H04W 74/0808 |

FOREIGN PATENT DOCUMENTS

| | | |
|---|---|---|
| WO | WO2015115847 | 8/2015 |
| WO | WO2015178851 | 11/2015 |
| WO | WO2017137009 | 8/2017 |

OTHER PUBLICATIONS

U.S. Appl. No. 62/142,151, Novlan et al., filed Apr. 2, 2015.
Final Office Action in U.S. Appl. No. 16/082,180, dated Jan. 14, 2022, 17 pages.
U.S. Appl. No. 62/294,541, filed Feb. 12, 2016.
U.S. Appl. No. 62/272,045, filed Dec. 28, 2015.
Huawei et al., "UE Autonomous Resource Selection" 3GPP TSG RAN WG1 Meeting #84, dated Feb. 15-19, 2016, 8 pages.
International Search Report in International Application No. PCT/KR2017/002413, dated May 25, 2017, 4 pages.
LG Electronics, "Discussion on UE Autonomous Resource Allocation Mechanism for PC5-based V2V," 3GPP TSG RAN WG1 Meeting #84, dated Feb. 15-19, 2016, 7 pages.
U.S. Appl. No. 62/296,320 (Year: 2016).
Qualcomm Incorporated, "Details of Sensing for V2V," R1-165910, Presented at 3GPP TSG-RAN WG1 #85, May 23-27, 2016, Nanjing, China, 19 pages.
United States Final Office Action in U.S. Appl. No. 16/082,180, dated Mar. 10, 2021, 21 pages.
United States Office Action in U.S. Appl. No. 16/082,180, dated May 29, 2020, 14 pages.
United States office Action in U.S. Appl. No. 16/082,180, dated Sep. 25, 2020, 16 pages.
United States Office Action in U.S. Appl. No. 16/082,228, dated Feb. 24, 2021, 14 pages.
U.S. Non-Final Office Action in U.S. Appl. No. 16/082,180, dated Jul. 8, 2021, 26 pages.
U.S. Office Action in U.S. Appl. No. 16/082,180, dated Feb. 13, 2020, 16 pages.
U.S. Office Action in U.S. Appl. No. 16/082,211, dated Dec. 9, 2020, 11 pages.

* cited by examiner

V2X TRANSMISSION RESOURCE SELECTING METHOD IMPLEMENTED BY TERMINAL IN WIRELESS COMMUNICATION SYSTEM AND TERMINAL USING SAME

CROSS-REFERENCE TO RELATED APPLICATIONS

This application is a continuation of U.S. application Ser. No. 16/082,207, filed on Sep. 4, 2018, which is a National Stage filing under 35 U.S.C. 371 of International Application No. PCT/KR2017/002413, filed on Mar. 6, 2017, which claims the benefit of U.S. Provisional Applications No. 62/303,389 filed on Mar. 4, 2016, No. 62/316,574 filed on Apr. 1, 2016, No. 62/321,748 filed on Apr. 13, 2016, No. 62/333,862 filed on May 10, 2016, No. 62/350,727 filed on Jun. 16, 2016, No. 62/379,221 filed on Aug. 24, 2016, No. 62/401,743 filed on Sep. 29, 2016, No. 62/403,028 filed on Sep. 30, 2016, No. 62/416,669 filed on Nov. 2, 2016, and No. 62/423,738 filed on Nov. 17, 2016, the contents of which are all hereby incorporated by reference herein in their entirety.

BACKGROUND OF THE INVENTION

Field of the Invention

The present invention relates to wireless communication and, most particularly, to a V2X transmission resource selecting method implemented by a terminal in a wireless communication system and a terminal using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The above-described D2D communication may be expanded and applied to signal transmission and/or reception between vehicles. Most particularly, vehicle-related communication is referred to as vehicle-to-everything (V2X) communication.

In V2X, the term 'X' refers to a pedestrian (communication between a vehicle and a device carried by an individual (e.g.: handheld terminal carried by a pedestrian, cyclist, driver or passenger), in this case, V2X may be indicated V2P), a vehicle (communication between vehicles) (V2V), an infrastructure/network (communication between a vehicle and a roadside unit (RSU)/network (e.g., RSU is a transportation infrastructure entity (e.g., an entity transmitting speed notifications) implemented in an eNB or a stationary UE)) (V2I/N), and so on.

A (V2P communication related) device that is carried by a pedestrian (or individual) will be referred to as a "P-UE", and a (V2P communication related) device that is installed in a vehicle will be referred to as a "V-UE". In the present invention, the term 'entity' may be interpreted as at least one of a P-UE, V-UE, RSU(/network/infrastructure).

Meanwhile, in the V2X communication, when the P-UE intends to transmit a v2X signal, how to select which resource may be an issue. Unlike a device that is installed in a vehicle, the P-UE is sensitive to battery power consumption. Additionally, important issues in the V2X communication may also correspond to periodically transmitting signals and not causing interference to other devices (or terminals). Accordingly, a method for selecting transmission resources of a P-UE while considering the above-mentioned important issues needs to be determined.

SUMMARY OF THE INVENTION

A technical object that is to be achieved by the present invention is to provide a V2X transmission resource selecting method implemented by a terminal in a wireless communication system and a terminal using the same.

In one aspect, provided is a method of selecting a vehicle-to-everything (V2X) transmission resource performed by a user equipment (UE). The method includes receiving type information indicating a type of a resource pool and performing at least one of random selection and partial sensing based resource selection in the corresponding resource pool based on the received type information.

The type information may indicate whether partial sensing is allowed to be performed when the UE performs resource selection in the corresponding resource pool, and the type information may indicate whether random selection is allowed to be performed when the UE performs resource selection in the corresponding resource pool.

The partial sensing may correspond to a sensing method selecting only some subframes, among subframes existing in a sensing window, and selecting a specific subframe within a selecting window as a V2X transmission subframe based on the sensing result.

The sensing window may be configured of 1,000 consecutive subframes, and wherein the selecting window is configured of 100 consecutive subframes positioned after the sensing window.

In case the type of the resource pool corresponds to a type in which only the partial sensing based resource selection is allowed to be performed, the UE may semi-persistently reserve the resource that is selected by performing the partial sensing based resource selection.

In case the type of the resource pool corresponds to a type in which only the random selection is allowed to be performed, the UE may not semi-persistently reserve the resource that is selected by performing the random selection.

In case the type of the resource pool corresponds to a type in which the partial sensing based resource selection is allowed to be performed, and in case the UE performs random selection in the corresponding resource pool, the UE may semi-persistently reserve the randomly selected resource.

The UE may be a UE communicating with another UE being installed in a vehicle.

In another aspect, provided is a user equipment (UE). The UE includes a radio frequency (RF) unit transmitting and receiving radio signals and a processor being operatively connected to the RF unit. The processor is configured to receive type information indicating a type of a resource pool, and to perform at least one of random selection and partial sensing based resource selection in the corresponding resource pool based on the received type information.

According to the present invention, the network may notify (or indicate to) a pedestrian UE of the resource pool type, i.e., whether only random selection is allowed to be performed, or whether only partial sensing based resource selection is allowed to be performed, or whether both random selection and partial sensing based resource selection are allowed to be performed, when selecting a resource than can transmit a V2X signal. Since the pedestrian UE performs adequate operations in accordance with the resource pool type, interference caused to other UEs may be reduced. Additionally, in case different types of resource pools overlap, the UE regulates the method according to which it operates. For example, when a UE performs random selection in a resource pool, wherein the partial sensing based resource selection is allowed to be performed, unlike the operations that are performed in the resource pool, wherein only the random selection is allowed, the corresponding UE may semi-persistently reserve the randomly selected resource during a predetermined period of time and may then perform the operations that are adequate to the characteristics of the resource pool, wherein the partial sensing based resource selection is allowed to be performed.

DESCRIPTION OF EXEMPLARY EMBODIMENTS

Figure 1:
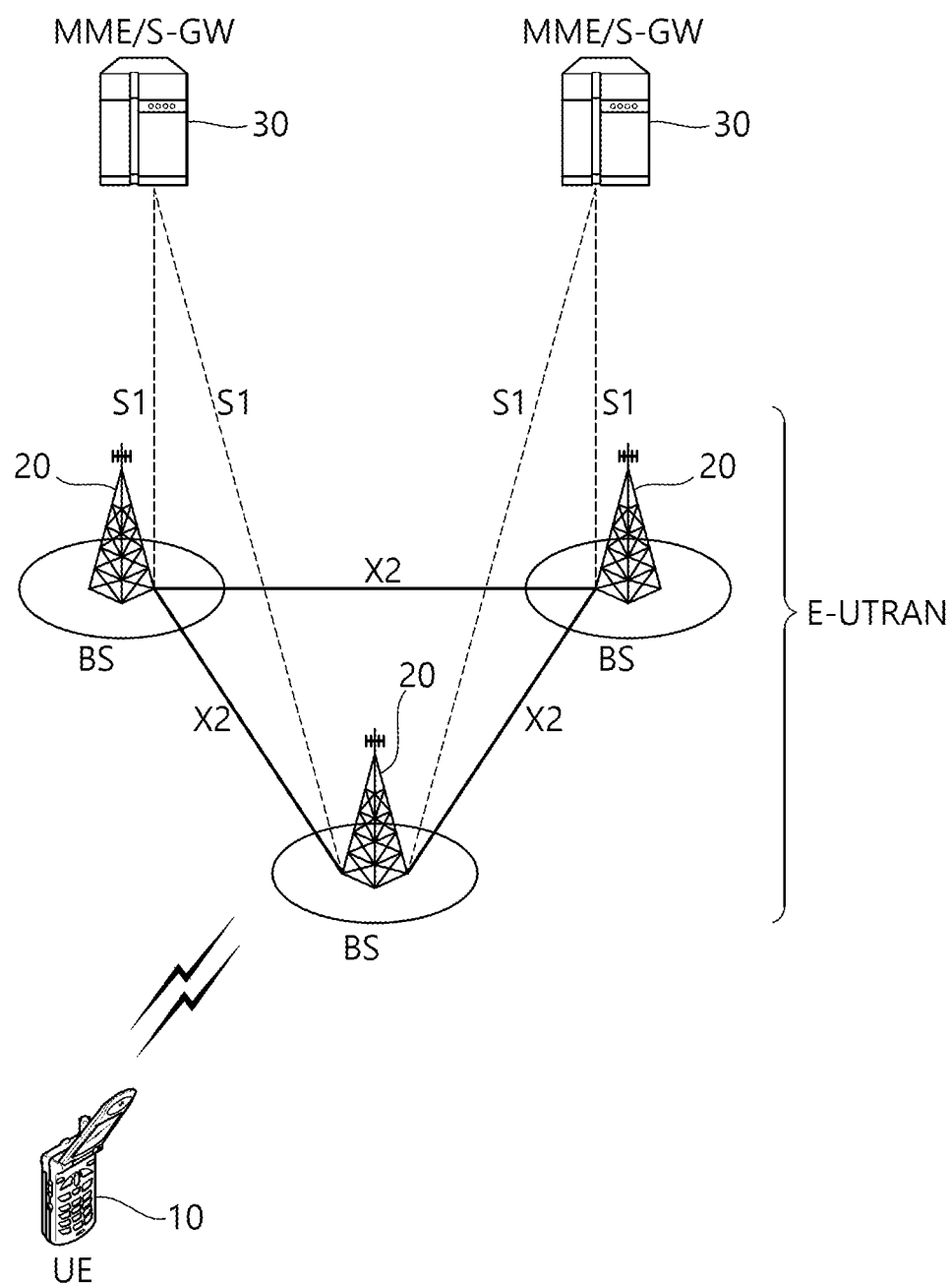
FIG. 1 shows a wireless communication system to which the present invention can be applied.

FIG. 1 shows a wireless communication system to which the present invention can be applied. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
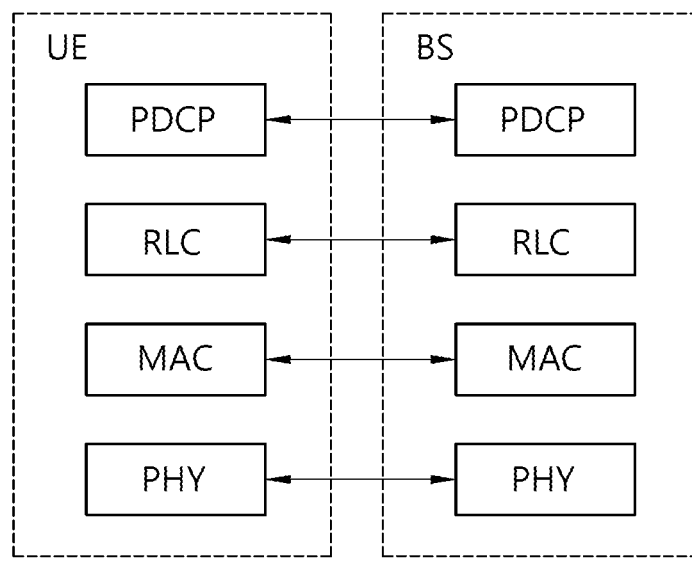
FIG. 2 is a diagram showing a wireless protocol architecture for a user plane.
Figure 3:
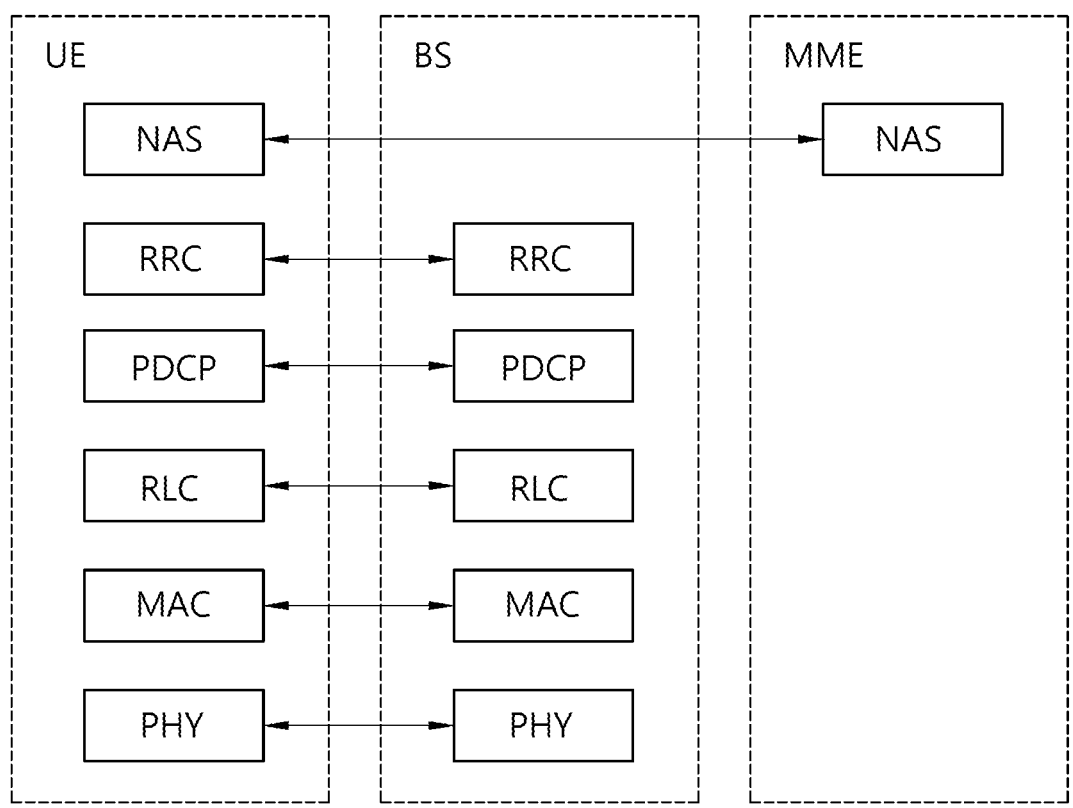
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Now, the D2D operation will be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
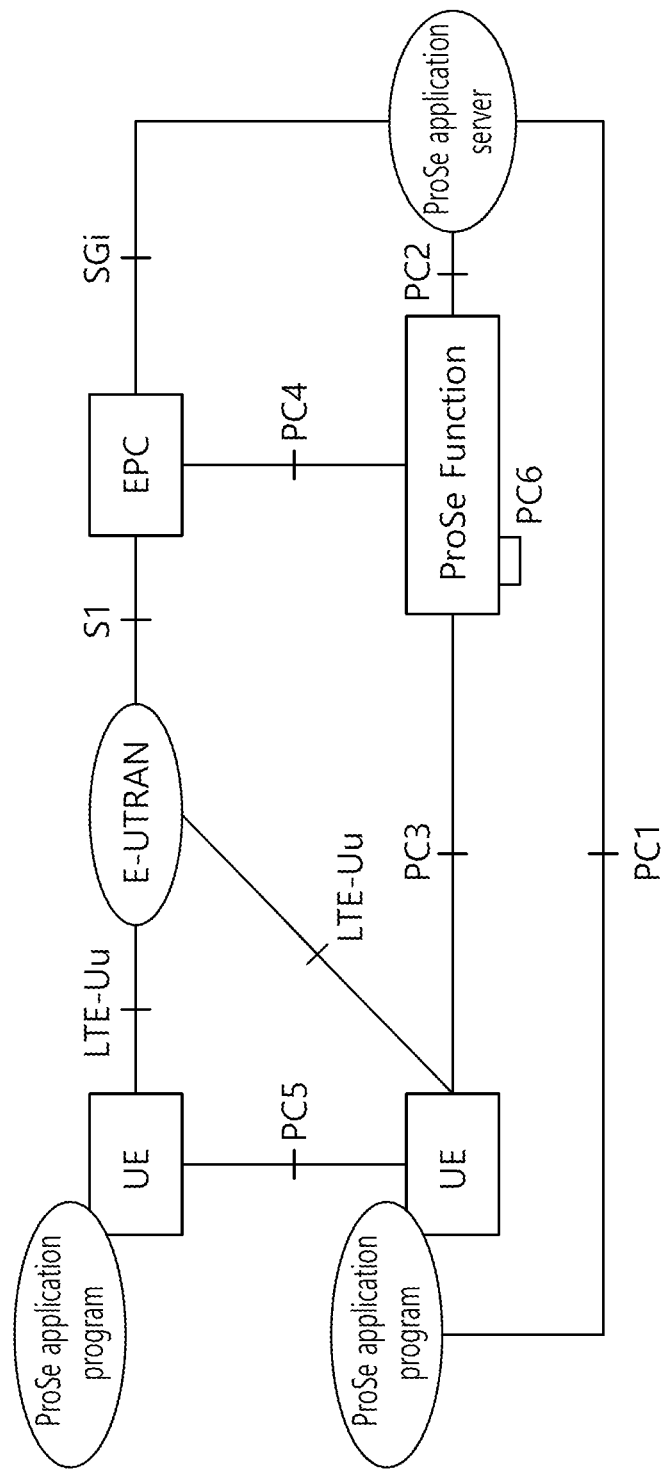
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.
PC2: a reference point between the ProSe APP server and the ProSe function. This is used to define an interaction between the ProSe APP server and the ProSe function. The update of application data in the ProSe database of the ProSe function may be an example of the interaction.
PC3: a reference point between the UE and the ProSe function. This is used to define an interaction between the UE and the ProSe function. A configuration for ProSe discovery and communication may be an example of the interaction.
PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
PC5: a reference point used for using control/user plane for discovery and communication, relay, and 1:1 communication between types of UE.
PC6: a reference point for using a function, such as ProSe discovery, between users belonging to different PLMNs.
SGi: this may be used to exchange application data and types of application dimension control information.

<ProSe Direct Communication (D2D Communication)>.

The ProSe direction communication corresponds to a communication mode enabling two common safety devices to perform direct communication through a PC 5 interface. This communication mode may be supported both in a case when the UEs receive services within a coverage of an E-UTRAN and in a case when a UE deviates from the coverage of the E-UTRAN.

FIGS. 5A to 5D show the deployment examples of types of UE performing ProSe direct communication and cell coverage.

Figure 5B:
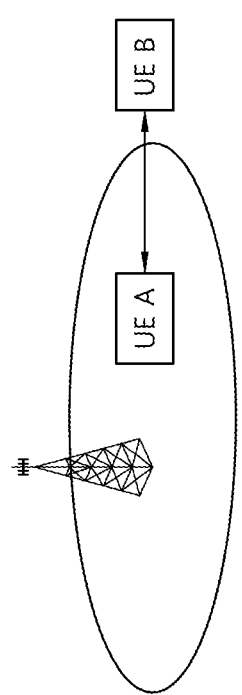
FIGS. 5A to 5D show the deployment examples of types of UE performing ProSe direct communication and cell coverage.
Figure 5D:
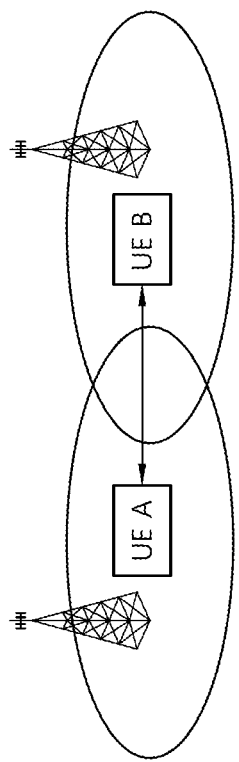
Figure 5A:
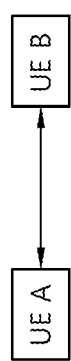
Figure 5C:
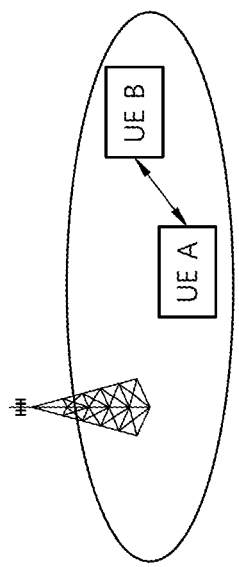

Referring to FIG. 5A, types of UE A and B may be placed outside cell coverage. Referring to FIG. 5B, UE A may be placed within cell coverage, and UE B may be placed outside cell coverage. Referring to FIG. 5C, types of UE A and B may be placed within single cell coverage. Referring to FIG. 5D, UE A may be placed within coverage of a first cell, and UE B may be placed within coverage of a second cell.

ProSe direct communication may be performed between types of UE placed at various positions as in FIGS. 5A to 5D.

Meanwhile, the following IDs may be used in the ProSe direction communication.

Source Layer-2 ID: This ID identifies the transmitter of a packet in the PC 5 interface.
Target Layer-2 ID: This ID identifies the target of a packet in the PC 5 interface.
SA L1 ID: This ID corresponds to an ID for a scheduling assignment (SA) in the PC 5 interface.

Figure 6:
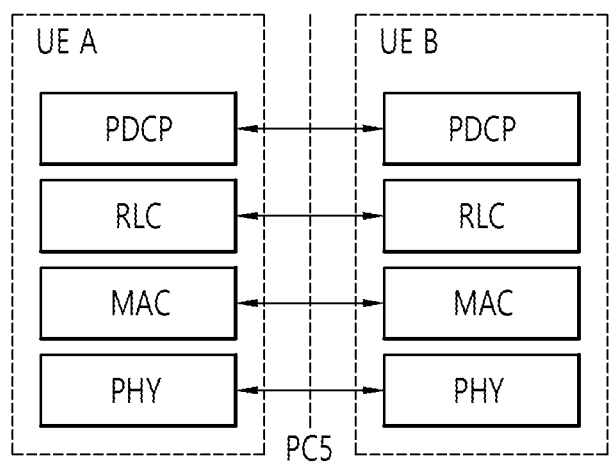
FIG. 6 shows a user plane wireless protocol stack for a ProSe direct communication.

FIG. 6 illustrates a user-plane protocol stack for the ProSe direction communication.

Referring to FIG. 6, the PC 5 interface is configured of PDCH, RLC, MAC, and PHY layers.

In the ProSe direct communication, there may be no HARQ feedback. A MAC header may include a Source Layer-2 ID and a Target Layer-2 ID.

<Radio Resource Assignment for ProSe Direct Communication>.

A ProSe-enabled device (or terminal or user equipment (UE)) may use the following 2 modes of resource assignment for the ProSe direction communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery (D2D Discovery)>

ProSe direct discovery refers to a procedure that is used by a ProSe-enabled device to discover another close-ranged ProSe-enabled device, and this may also be referred to as D2D direct discovery or D2D discovery. At this point, an E-UTRA radio signal may be used through the PC 5 interface. Information that is used for the ProSe direct discovery will hereinafter be referred to as discovery information.

Figure 7:
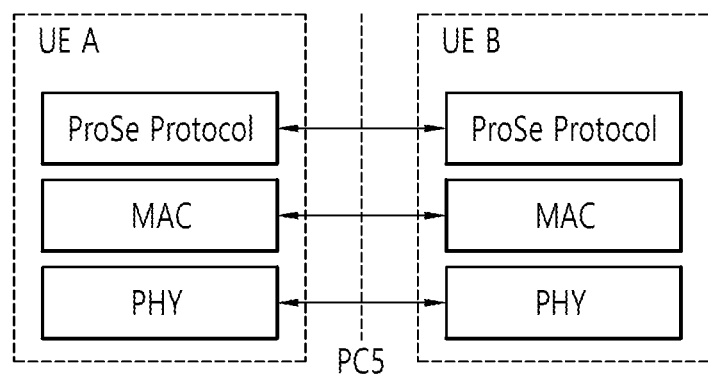
FIG. 7 shows a PC5 interface for a D2D discovery.

FIG. 7 shows a PC 5 interface for D2D discovery.

Referring to FIG. 7, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC IDLE state through the SIB. Types of UE whose ProSe direct discovery has been permitted use the type 1 resource pool for discovery information announcement in the RRC IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

As described above, D2D operations generally have diverse advantages in the aspect of transmitting and receiving signals between close-ranged devices. For example, a D2D device mat perform data communication at a high transmission rate and a low latency. Additionally, the D2D operation may disperse traffic that is concentrated to a base station. And, if a device performing D2D operations functions as a relay station, the corresponding device may also carry out a function of expanding the coverage of the base station. The above-described expansion of the D2D communication includes signal transmission and reception between vehicles, and, most particularly, vehicle-related communication is referred to as vehicle-to-everything (V2X) communication.

Herein, for example, in vehicle-to-X (V2X), the term 'X' refers to a pedestrian (communication between a vehicle and a device carried by an individual (e.g.: handheld terminal carried by a pedestrian, cyclist, driver or passenger) (V2P), a vehicle (communication between vehicles) (V2V), an infrastructure/network (communication between a vehicle and a roadside unit (RSU)/network (e.g., RSU is a transportation infrastructure entity (e.g., an entity transmitting speed notifications) implemented in an eNB or a stationary UE)) (V21/N), and so on. Additionally, for example, for simplicity in the description of the proposed methods, a (V2P communication related) device that is carried by a pedestrian (or individual) will be referred to as a "P-UE", and a (V2P communication related) device that is installed in a vehicle will be referred to as a "V-UE". Additionally, for example, in the present invention, the term 'entity' may be interpreted as a P-UE and/or a V-UE and/or an RSU(/ network/infrastructure).

A device (or UE or terminal) providing (or supporting) the above-described D2D operations may be referred to as a D2D device, and a device providing (or supporting) the above-described V2X operations may be referred to as a V2X device. Hereinafter, for simplicity in the description, although the exemplary embodiments of the present invention will be mainly described in the V2X device point of view, the details corresponding to the V2X device may also be applied to the D2D device.

The V2X device may perform message (or channel) transmission within a resource pool, which is defined (or signaled) in advance. Herein, a resource pool may refer to a resource (or resources) being defined in advance in order to allow the device to perform V2X operations (or being capable of performing V2X operations). At this point, for example, a resource pool may be defined in the aspect of time-frequency.

<Method Allowing 'V2X Communication' and 'Other Communication' to Co-Exist>

The following co-existence methods propose a method allowing 'V2X communication' and 'other communication (e.g., 'DSRC/IEEE 802.11p service', 'new RAT (NR) eV2X service (based on another numerology)')' to efficiently co-exist within the same channel(/band) that is defined (/signaled) in advance.

Herein, for example, in case the following rules(/methods) are applied, 'fairness' in the 'channel(/band) usage rate(/occupation rate)' may also be effectively achieved between different communication types.

For example, the term 'channel(/band/resource)' may be interpreted to have the meaning of 'carrier(/frequency/pool)'.

[Co-existence Method #1] This method allows V2X UE(s) participating in the 'V2X communication' to omit a (2X communication related) channel/signal transmission operation (this may be interpreted as a type of 'silencing period'), in a specific (time/frequency) resource that is defined(/signaled) in advance, and then to perform an '(energy) measurement' operation.

Herein, for example, (configuration) parameters that are related to the (corresponding) 'silencing period' (e.g., cycle period, (time/frequency) resource position(/length), hopping pattern, and so on) may be designated in the form of a 'carrier(/pool)-specific (pre)configuration'.

Herein, for example, by performing the corresponding '(energy) measurement' operation, the V2X UE(s) may be capable of determining whether or not 'another communication (e.g., 'DSRC/IEEE 802.11p service', '(other numerology based) NR eV2X service')'.

Herein, for example, if the '(energy) measurement' value is greater than a threshold value that is defined(/signaled) in advance, a rule may be defined so as to allow the V2X UE(s) (A) to suspend the 'V2X communication' within the corresponding channel(/band) (during a pre-defined(/signaled) period of time) and/or (B) (to change the 'resource(/channel/band)' by which the 'V2X communication' is performed in accordance with a pre-defined(/signaled) rule(/(priority) level) and/or) to perform the 'V2X communication' (during a pre-defined(/signaled) period of time) within the pre-defined(/signaled) (changed) other resource(/channel/band).

Herein, for example, if the '(energy) measurement' value is smaller than the pre-defined(/signaled) threshold value, V2X UE(s) may be capable of continuously performing the 'V2X communication' within the corresponding channel(/band) (without any suspension (or interruption)).

Herein, for example, settings may be made so that the (pre-defined(/signaled)) (time(/frequency)) resource that is used for the detection of the 'other communication' (and/or the 'other RAT') (e.g., the 'silencing period') does not apply a V2X resource pool configuration related bitmap (having a pre-defined(/signaled) length).

Herein, for example, in case the corresponding rule is applied, it may be interpreted that the (pre-defined(/signaled)) (time(/frequency)) resource that is used for the detection of the 'other communication' (and/or the 'other RAT') is excluded from the V2X resource pool configuration.

For example, a rule may also be defined so as to allow the V2X UE(s) to notify the detection (status) information corresponding to the 'other communication' to its neighboring 'V2X UE(s)' (and/or '(serving) base station(/RSU)') through the pre-defined(/signaled) signal(/channel).

Herein, for example, when reporting the corresponding information, the position information (and/or '(in case a position-based resource pool (TDM(/FDM)) division operation is configured(/signaled)) information on the resource pool(/carrier/channel/band) (index) from which the 'other communication' is detected') of the V2X UE(s) may also be included in the reported information.

Herein, for example, a (serving) base station(/RSU) that has received such information may notify the corresponding information to the V2X UE(s) (existing within the (reported) neighboring (or same) position(/region)) (e.g., 'P-UE(S)') (through a pre-defined signal (e.g., through (WAN) DL(/PDSCH)).

Herein, for example, the (serving) base station(/RSU) that has received the information from the (V-UE(s)) may send instructions (or indications) to the V2X UE(s) existing within a position(/region) (being adjacent or identical to) the position(/region), in which the 'other communication' has been detected (and/or pool(/carrier/channel/band)) (e.g., 'P-UE(s)') to perform 'activation/deactivation' of the (related) resource pool and/or to suspend the 'V2X communication' (and/or the 'V2X message TX operation') and/or to perform switching to another pre-defined(/signaled) carrier (/channel/band/pool) (in accordance with a pre-defined(/signaled) rule/(priority) level).

Herein, as another example, the V2X UE(s) (e.g., 'P-UE(s)') having received the corresponding information (from the (serving) base station(/RSU)) may consider(/compare) its (current) position (and/or the pool(/carrier/channel/band) in which it is (currently) performing the V2X message TX operation) and may then decide(/determine) whether or not to maintain(/suspend) the V2X message TX operation within the current pool(/carrier/channel/band) and/or to perform switching to another pre-defined(/signaled) carrier(/channel/band/pool) (in accordance with a pre-defined(/signaled) rule/(priority) level) and to perform the 'V2X communication' (and/or the 'V2X message TX operation') within the (changed) other resource(/channel/band) (during a pre-defined(/signaled) period of time).

Herein, for example, a rule may be defined so that the operation of reporting(/signaling) the corresponding information (performed by the V2X UE(s)) can be performed only in a case where the '(energy) measurement' value is greater than the pre-defined(/signaled) threshold value.

Herein, for example, the '(serving) base station(/RSU)' that has received (or that has received a report on) the detection information of the 'other communication' from the V2X UE(s) may send instructions (A) to change the 'carrier (/channel(/band))' through which the 'V2X communication' is being performed (in accordance with a pre-defined(/signaled) rule/(priority) level) and/or (B) to change the communication type to a 'UU based V2X communication'.

Herein, for example, V2X UE(s) having received the detection information of the 'other communication' from (adjacent) neighboring V2X UE(s) may also (similarly) change the 'channel(/band/carrier)' through which the 'V2X communication' is being performed in accordance with a pre-defined(/signaled) rule/(priority) level and/or may suspend the 'V2X communication' within the corresponding channel(/band/carrier) (during a pre-defined(/signaled) period of time) (and/or may perform the 'V2X communication' within a pre-defined(/signaled) channel(/band/carrier/resource) (that is changed in accordance with a pre-defined(/signaled) rule/(priority) level) (during a pre-defined (/signaled) period of time)).

For example, in order to allow the V2X UE(s) (e.g., P-UE(s)) to efficiently receive the ('other communication' detection) information being (re-)transmitted(/relayed) by the (serving) base station(/RSU) (and/or (other) V2X UE(s)), the V2X UE(s) may be controlled to perform 'WAKE-UP' and/or an 'attempt to receive the corresponding purpose channel(/signal)' in accordance with a pre-defined (/signaled) cycle period(/pattern) (regardless of the 'RRC IDLE state').

Herein, for example, after performing 'WAKE-UP') and reception of (only) the '(corresponding) purpose channel(/signal) reflecting(/including) the (most) recent information', which is transmitted at a most proximate (cycle period) time point before the resource that the V2X UE(s) (e.g., P-UE(s)) have/has selected(/reserved) for the purpose of V2X message TX (or the transmission operation (time point) of the V2X UE(s) (e.g., P-UE(s))) (or before a (time(/timing)) offset value that is pre-configured(/signaled) in advance from the resource that the V2X UE(s) (e.g., P-UE(s)) have/has selected(/reserved) for the purpose of V2X message TX (or the transmission operation (time point) of the V2X UE(s))), the V2X UE(s) (e.g., P-UE(s)) may be capable of deciding(/determining) whether or not to perform a (final) 'V2X communication' (and/or a 'V2X message TX operation') in accordance with the corresponding (recent) information.

For example, if a ('V2X communication' related) (pre-configured(/signaled)) 'LTE signal(/channel)' is not detected within a pre-defined(/signaled) specific (time/frequency) resource, and if (at the same time) the '(energy) measurement' value is greater than a pre-defined(/signaled) threshold value, a rule may be defined so that it can be determined that an 'other communication (e.g., 'DSRC/IEEE 802.11p service', '(other numerology based) NR eV2X service')' is being performed within a proximate distance (and/or a same channel(/band)).

For example, the (serving) base station(/RSU) (and/or (other) V2X UE(s)) having received the 'other communication' detection (status) information from specific V2X UE(s) may notify the corresponding information to (other) neighboring V2X UE(s) (e.g., 'P-UE(S)') (and/or the base station (/RSU)) (within a coverage or establishing a connection) through a pre-defined channel(/signal).

Herein, for example, such information may be transmitted along with additional information, such as a 'position(/identifier) information of specific V2X UE(s)' that is defined (/reported) in advance (and/or '(index) information on a resource pool(/carrier/channel/band) having the 'other communication' detected therein' (in case a position based resource pool (TDM(/FDM)) division operation is configured(/signaled)) and/or '(energy) measurement information') and so on.

For example, according to the above-described rule, in case of V2X UE(s) having suspended the 'V2X communication' within the current channel(/band) (during a pre-defined(/signaled) period of time) (and/or V2X UE(s) having performed the 'V2X communication' within another resource(/channel/band)), after having the corresponding V2X UE(s) perform the '(energy) measurement' operation once again within a specific (time/frequency) resource (within the current channel(/band)) that is pre-defined(/signaled), in case the 'other communication' is not detected, a rule may be defined so that the 'V2X communication' can be performed once again (within the current channel(/band)).

As an additional information, a rule may be defined so that the re-performing of the 'V2X communication' within the current channel(/band) can be performed only (A) in case the 'other communication' is not detected (as a result of the '(energy) measurement' operation) and/or (B) in case a pre-defined(/signaled) backoff(/counter) value is smaller than or equal to '0' (or in case a random (real number) value ('X'), which is selected(/picked) within a range of '0≤X≤1', is smaller than or equal to a pre-defined(/signaled) likelihood value).

Herein, for example, the backoff value may decrease as much as a pre-defined(/signaled) value (e.g., '1') each time the 'other communication' is not detected (when performing the '(energy) measurement' operation).

For example, the '(energy) measurement' operation for the detection of the 'other communication (e.g., 'DSRC/IEEE 802.11p service', '(other numerology based) NR eV2X service')' is required to be performed simultaneously by V2X UE(s) (being positioned at least within a pre-defined (/signaled) distance).

Otherwise, for example, the 'V2X communication' (being performed within a proximate distance (and/or within the same channel(/band))) may be misinterpreted as the 'other communication', and, accordingly, the 'V2X communication' may be excessively suspended.

Therefore, for example, a rule may be defined so that information related to (time/frequency) resources through which the '(energy) measurement' operation is performed (e.g., cycle period, subframe offset, (hopping) pattern, and so on) can be configured(/signaled) and applied based on (not a 'local time' but) a 'global positioning system (GPS) time (or a coordinated universal time (UTC))' (or a 'time (synchronization) of the (serving) base station(/RSU)').

Herein, for example, the (time/frequency) resources through which the '(energy) measurement' operation is performed may be configured while (differently or independently) considering a 'V2X message type (e.g., a 'periodic' or 'event-triggered' V2X message) and/or a 'V2X message priority' and/or a 'V2X UE density(/speed)' and/or a 'V2X message priority' and/or a 'V2X UE type', and so on.

For example, the '(energy) measurement' operation may be (directly) performed (not only by the V2X UE(s) but also) by the (serving) base station(/RSU).

Herein, for example, the (serving) base station(/RSU) having detected the 'other communication (e.g., 'DSRC/IEEE 802.11p service', '(other numerology based) NR eV2X service')' within a proximate distance (and/or the same channel(/band)) may also notify(/instruct) whether or not to suspend the 'V2X communication' (performed within the corresponding channel(/band)) (and/or whether or not 'V2X communication' within another resource(/channel/band), which is pre-defined(/signaled) (according to a rule (/(priority) level)) to neighboring V2X UE(s) (and/or the base station(/RSU)) (existing within a coverage or establishing a connection) (through a pre-defined channel(/signal)).

As yet another example, when 'cross carrier(/pool) scheduling' is performed for diverse purposes/reasons (e.g., for congestion control) (e.g., when the SA transmission and the data transmission are performed in different carriers/(pools), or when a (rear-end) part of the data(/SA) repetition transmission is performed in a different carrier/(pool)), according to a pre-defined(/signaled) rule(/information), a different PHY format may be used in each of the different carriers/(pools).

Herein, for example, in which PHY format (e.g., 'RS structure') the V2X UE will be performing the (control/data information) transmission within a specific carrier may be notified (to other V2X UE(s)) through a (new) field within a pre-defined(/signaled) channel (e.g., PSCCH).

Herein, for example, a PHY format of a channel (e.g., PSCCH) being used for the 'scheduling/control information (and/or the used PHY format information)' transmission may be equally (or commonly) defined between different carriers(/pools).

As yet another example, the V2X UE(s) may be enabled to perform (transmission) resource (re-)selecting as described below. Hereinafter, 1. Details on an example of a (transmission) resource (re-)selecting operation will be described through Table 1, and 2. Details of an example of a transmission resource (re-)reserving(/selecting) operation of V2X TX UE(s) will be described through Table 2.

TABLE 1

1. Details on an example of a (transmission) resource (re-)selecting operation

A V2X device may select a transmission resource by using the following method. It is assumed that the device is being operated in a mode allowing the device to select a resource on its own. While being operated in this mode, when a resource selection/re-selection for a V2X message transmission is triggered, the device (or UE) performs sensing and selects/re-selects a resource based on the sensing result. The UE may transmit a scheduling assignment (SA) indicating the selected/re-selected resource.

For example, a resource selection/re-selection may be triggered to the device from subframe (also referred to as TTI, and hereinafter referred to as the same) #n. Accordingly, the device may perform sensing between subframe #n-a and subframe #n-b (wherein a > b > 0, and wherein a and b are integers) and may select/re-select the source for the V2X message transmission based on the sensed result.

The integers a and b may correspond to values being commonly configured to the V2X UEs or may correspond to values being independently configured to each V2X UE.

Alternatively, in case the above-described values a and b correspond to values that are common to all V2X UEs, for example, the values a and b may establish a relationship such as 'a = 1000 + b'. More specifically, if triggering occurs so that the UE selects its own resource for transmitting the V2X message, the UE may perform a sensing operation during a period of 1 second (1000 ms = 1000 subframes = 1000 TTIs).

The UE may consider the transmission of all decoded SAs during a second stating from subframe #n-a to subframe #n-b. The decoded AS may be associated with the data transmission during a section starting from subframe #n-a to subframe #n-b, and it may be considered that the decoded SAs has been transmitted before the subframe #n-a.

The UE(s) that has/have failed to perform the sensing operation in subframe #m (e.g., for reasons of a signal having to be transmitted from the subframe #m, and so on) may exclude subframes #(m + 100 * k) from the resource selecting/re-selecting. Meanwhile, in subframes that are used by the UE for transmitting its own signals may be skipped without performing the sensing operation.

After performing the sensing operation, the UE selects time/frequency resources for a PSSCH, i.e., a sidelink data channel.

The UE may transmit a scheduling assignment (SA) from subframe #n + c. Herein, c corresponds to an integer greater than or equal to 0, and, herein, c may correspond to a fixed value or a variable value. The scheduling assignment transmission (i.e., PSCCH transmission) may not be required to be performed by the UE in subframes wherein the c value is smaller than $c_{min}$. Herein, the $c_{min}$ value may correspond to a fixed value or may correspond to a value that is configured by the network.

The scheduling assignment (SA) being transmitted from subframe #n + c may indicate associated data being transmitted from subframe #n + d. Herein, d may correspond to an integer greater than or equal to c (d≥c). And, both the c and d values may be smaller than or equal to 100.

d may correspond to a value that is smaller than or equal to $d_{max}$. Herein, the value $d_{max}$ may be dependently determined according to priority levels, such as UE/data/service types, and so on.

The UE may notify whether or not the frequency resource for the signal being transmitted from subframe #n + d will be reused for a potential transmission of another transmission block from subframe #n + e. Herein, e is an integer establishes a relationship of d < e. The UE may explicitly or implicitly notify whether or not the corresponding frequency resource will be reused. The e value may correspond to one value or may correspond to a plurality of values. Also, additionally, the UE may notify that the frequency resource for the signal being transmitted from subframe #n + d will not be reused starting from after subframe #n + e.

A receiving UE receiving a V2X signal decodes a scheduling assignment (SA), which is transmitted by a transmitting UE transmitting a V2X signal. At this point, it may be assumed that the same frequency resource is reserved in subframe #n + d + P * j (wherein j = i, 2 * i, . . . , J * i) by the scheduling assignment. Herein, P may be equal to 100. The J value may be explicitly signaled by the scheduling assignment, or the J value may correspond to a fixed value (e.g., 1). The i value may be explicitly signaled by the scheduling assignment, or the i value may correspond to a pre-configured value or a fixed value. Alternatively, the i value may correspond to an integer ranging between 0 and 10.

Meanwhile, if any one of the following conditions is satisfied, the re-selecting of the V2X resource may be triggered.

1. In case the counter satisfies the expiration condition.

The value of the counter decreases at each transmission of the transmission block, and, when the re-selecting is triggered for all of the semi-persistently selected resources, the counter value may be reset. The reset values may be randomly selected within a specific range, e.g., within a range of 5 to 15 at equal possibilities.

2. In case the transmission block does not match the current resource assignment even if a tolerated maximum modulation and coding scheme (MCS) is used.

TABLE 1-continued

3. In case instructions are made from a higher-level layer, and so on.
Meanwhile, in case all of the PSCCH/PSSCH transmission have the same
priority level, the selecting/re-selecting of the PSSCH resource may be selected
after undergoing the following process.
Firstly, after considering that all resources are available to be selected,
specific resources are excluded based on the scheduling assignment decoding and
additional conditions. At this point, the UE may select any one of the two options
listed below.
The first option corresponds to excluding resources being indicated or
reserved by the decoded scheduling assignment and resources having a DM-RS
power, which is received from data resources being associated with the
scheduling assignment, that is equal to or greater than a threshold value.
The second option correspond to excluding resources being indicated or
reserved by the decoded scheduling assignment and resources having an energy
level, which is measured from data resources being associated with the
scheduling assignment, that is equal to or greater than a threshold value.
The UE may select V2X transmission resources from the resources that are
not excluded.
For example, after measuring the remaining PSSCH resources based on the
total received energy and ranking the measured resources, the UE may select a
subset. The UE may compare the energy from the currently selected resources
with the energy of the subset. Then, when the energy from the currently selected
resources is greater than the threshold value as compared to the energy of the
subset, any one of the energy of the subset may be selected. The UE may
randomly select one resource from the subset.
Alternatively, after measuring the remaining PSSCH resources based on the
total received energy and ranking the measured resources, the UE may select a
subset. The UE may randomly select one resource from the subset.
Alternatively, after measuring the remaining PSSCH resources based on the
total received energy and ranking the measured resources, the UE may select a
subset. The UE may select a resource that can minimize fragmentation of the
frequency resource from the subset.
Alternatively, the UE may measure the received energy (or power) of the
PSSCH that is indicated by the decoded scheduling assignment. And, then, after
adding the measured energy to obtain the total received energy, the UE may sort
the subframes in accordance with the total received energy. The UE may
randomly select a transmission subframe from a set of subframes being available
for usage. Thereafter, the UE may randomly select a frequency from the
transmission subframe.
During the above-described process, the UE first excluded a specific
resource based on the scheduling assignment and the additional conditions and,
then, selected the V2X transmission resource. At this point, in case the scheduling
assignment and the data associated with the scheduling assignment are
transmitted from the same subframe, a method of excluding the resource based on
the DM-RS receiving power of the PSSCH may be supported. More specifically,
the resources being indicated or reserved by the decoded scheduling assignment
and resources having a PSSCH reference signal received power (RSRP), which is
received from data resources being associated with the scheduling assignment,
that is equal to or greater than a threshold value are excluded. More specifically,
the PSSCH RSRP may be defined as a linear average of the power distribution of
resource elements (REs) carrying DM-RSs that are associated with the PSSCH
within physical resource blocks (PRBs) indicated by the PSCCH. The PSSCH
RSRP may be measured from a reference point, which corresponds to an antenna
connection part of the UE. The scheduling assignment may include a 3-bit PPPP
field.
The threshold value may be given in the format of a function corresponding
to priority level information. For example, the threshold value may be dependent
to the priority level information of the transmission blocks and the priority level
information of the decoded scheduling assignment. The threshold value may be
given in units of [2 dBm] within a range of [−128 dBm] to [0 dBm]. A total of 64
threshold values may be predetermined.
It may be assumed that the UE decodes the scheduling assignment from
subframe #m + c, which exists within the sensing section, and that the same
frequency resource is being reserved by the scheduling assignment in subframe
m + d + P * i. As described above, P may correspond to a fixed value that is equal to
100. And, i may be selected from a range of [0, 1, . . . , 10]. Herein, i may be
carrier-specifically configured by the network or may be pre-configured in
advance. i = 0 indicates that the frequency resource is not intended to be reserved.
Herein, i may be configured by a 10-bit bitmap and may be configured as a 4-bit
field within the scheduling assignment.
In the cycle period P * I, a candidate semi-persistent resource X collides with
resource Y, which is reserved by the scheduling assignment of another UE. And,
in case the condition of exclusion is satisfied, the UE may exclude the candidate
semi-persistent resource X. Herein, I may represent an i value that is signaled by
the scheduling assignment.
After excluding resources after performing scheduling assignment decoding,
a sensing process, and so on, in case the remaining resources are less than 20% of
the total resources within the selecting window, the UE may increase the
threshold value (e.g., 3 dB). Thereafter, the UE may repeat the process of
excluding resources. And, this process may be performed until the remaining TABLE 1-continued resources become greater than 20% of the total resources within the selecting
window. The total resources within the selecting window refer to resources that
the UE is required to consider as possible candidate resources.
Meanwhile, during the process of selecting a V2X transmission resource
after excluding a specific resource, when the counter reaches a value of 0, the UE
may maintain the current resource at a possibility p and may reset the counter.
More specifically, the resource may be re-selected at a possibility of 1-p.
After measuring the remaining PSSCH resources after excluding the specific
resources and, then, ranking the measured resources based on the total received
energy, the UE select a subset. The subset may correspond to a set of candidate
resources having the lowest received energy. Herein, the size of the subset may
correspond to 20% of the total resources within the selecting window.
The UE may randomly select one resource from the subset.
When only one transmission block is transmitted from one subframe, the UE
may select M number of continuous sub-channels, and an average value of the
energy measured from each sub-channel may correspond to the energy value
measured from each resource.

TABLE 2

2. Details of an example of a transmission resource (re-)reserving(/selecting)
operation of V2X TX UE(s)
2.1. UE procedure for determining subframes and resource blocks for
transmitting PSSCH and reserving resources for sidelink transmission mode 4
The number of subframes in one set of time and frequency resources for a
transmission opportunity of the PSSCH is given as $C_{resel}$. At this point, in case
$C_{resel}$ is selected, the corresponding value is given as
[10*SL_RESOURCE_RESELECTION_COUNTER], and, otherwise, the value of
$C_{resel}$ may be set to 1.
In case a set of sub-channels in subframe $t_m^{SL}$ is determined just as the time
and frequency resources that are related to the PSSCH transmission corresponding
to a configured sidelink grant, the same sets of sub-channels within subframes
$t_{m+P_{rsvp}*j}^{SL}$, may be determined for PSSCH transmissions corresponding to the
sidelink grant. Herein, j = 1, 2, . . . , and resource reservation intervals for $C_{resel}$ − 1
and $P_{rsvp}$ may be determined by higher-level layers.
2.2. UE procedure for transmitting the PSCCH
In relation to the Sidelink Transmission Mode 4, the UE may configure the
contents of the SCI Format 1 as described below.
In case the SL_RESOURCE_RESELECTION_COUNTER is greater than 1,
the UE configures a resource reservation field as a resource reservation section,
which is determined by higher-level layers that are separated by $P_{step}$. Herein,
$P_{rsvp}$ = 100. And, otherwise, the UE sets the resource reservation field to 0.
2.3. UE procedure for determining the subset of resources to be excluded in
PSSCH resource selection in sidelink transmission mode 4
In case a request is made by the higher-level layers in subframe n, the UE
determines a set of resources being excluded from the PSSCH transmission
according to the following steps listed below. The higher-level layer may
determine a parameter $L_{subCH}$ corresponding to a number of sub-channels being
used in the subframe for the PSSCH transmission, a parameter $P_{rsvp\_TX}$
corresponding to resource reservation intervals that are determined by the higher-
level layer, and a parameter $prio_{TX}$ corresponding to priority levels transmitted
in SCI Format 1, which is associated by the UE.
STEP 1) A candidate single subframe resource $R_{x,y}$ being related to the
PSSCH transmission may be determined just as a set of adjacent sub-channels
$L_{subCH}$ along with sub-channel x + j in subframe $t_y^{SL}$. Herein, an equation of j =
0, . . . , $L_{subCH}$ − 1 may be established.
STEP 2) The UE monitors subframes n-1001, n-1000, n-999, . . . , n-2 excluding
the transmission opportunity of the UE.
STEP 3) Parameter $Th_{a,b}$ may be set to be equal to a value that is starts by
an i-th SL-ThresPSSCH-RSRP field in an SL-ThresPSSCH-RSRP-List-r14. At
this point, i = a * 8 + b + 1.
STEP 4) Set $S_A$ may be initialized to a combination of all candidate single
subframe resources. And, Set $S_B$ may be initialized to an empty set.
STEP 5) In case the following condition is satisfied, the UE excludes the
candidate single subframe resource $R_{x,y}$ from Set $S_A$.
The UE may receive SCI Format 1 in subframe $t_m^{SL}$. And, in the received
SCI Format 1, a 'resource reservation' field and a 'priority' field may respectively
indicate values of $P_{rsvp\_RX}$ and $p_{rioRX}$.
The PSSCH-RSRP measurement according to the received SCI Format 1
may be greater than $Th_{prio_{TX},Prio_{RX}}$.
The same SCI Format 1, which is presumed to be received in subframe
$t_{m+P_{step}\cdot P_{rsvp\_RX}}^{SL}$, may be determined in accordance with the resource blocks and a
set of subframes overlapping with $R_{x,y-P_{rsvpTX}*j}$, which is related to j =
0, 1, . . . , $C_{resel}$ − 1
STEP 6) In case the number of candidate single subframe resources
remaining from Set $S_A$ is less than $0.2 \cdot M_{total}$, STEP 4 may be repeated along
with $Th_{a,b}$, which is increased by 3 dB.

TABLE 2-continued

STEP 7) In relation to the candidate single subframe resource $R_{x,y}$ remaining in Set $S_A$, a metric $E_{x,y}$ may be defined as a linear average of S-RSSI, which is measured in sub-channel x + k in relation to k = 0, . . . , $L_{subCH}$ − 1 in the subframes that are monitored in STEP 2.
STEP 8) The UE may relocate the candidate single subframe resource $R_{x,y}$ along with a minimum metric $E_{x,y}$ from set $S_A$ to set $S_B$. This step may be repeated.
STEP 9) Set $S_C$ may be defined as a set of all of the candidate single subframe resources that are not included in set $S_B$.

For example, the following co-existence methods listed below propose methods for effectively performing a V2X communication related 'sensing operation' and/or 'resource (re-) selecting operation', when the V2X UE(s) detect(s) the other communication (e.g., 'DSRC/IEEE 802.11p service', '(other numerology based) NR eV2X service') within a specific channel(/band/carrier) according to the (above-described) rule and perform(s) a 'channel(/band/carrier) switching(/changing) operation'.

Herein, for example, the wording of the term "sensing" may be interpreted as an energy measurement operation for a pre-defined(/signaled) reference signal (RS) and/or channel (e.g., DM-RS RSRP and/or S-RSSI of a PSSCH (being interconnected to the decoded PSCCH)), or may be interpreted as a decoding operation for a pre-defined(/signaled) channel (e.g., physical sidelink control channel (PSCCH)).

Herein, for example, since a 'congestion level' of a specific channel(/band/carrier) wherein the V2X communication is performed becomes higher (than a pre-configured (/signaled) threshold value), the above-described (partial) co-existence methods may be extendedly applied to a case where the V2X UE(s) perform a 'channel(/band/carrier) switching(/changing) operation' in accordance with a pre-defined rule (or a received signaling(/indicator) (received from the (serving) base station(/RSU))).

[Co-existence Method #2] When the V2X UE(s) perform the 'channel(/band/carrier) switching(/changing) operation', this method allows the resources that are to be used in the V2X communication to be randomly (re-)selected (from a 'V2X resource pool' within a switched(/changed) channel(/band/carrier)).

Herein, for example, the 'channel(/band/carrier) switching(/changing) operation' may also be interpreted as a type of condition according to which the '(transmission) resource (re-) selection' is triggered(/performed).

Herein, for example, the resources that are randomly (re-)selected according to the above-described rule (may only be used for a pre-configured(/signaled) number (e.g., '1') of 'transmission block (TB))' transmissions after performing the 'channel(/band/carrier) switching(/changing) operation' and) may be prevented from being processed with 'reservation'(/'semi-persistent scheduling (SPS)') (for a (plurality of) 'TB' transmission(s) that is/are to be performed later on), or may be prevented from being used(/reserved) as (frequency) resources being used in the (plurality of) 'TB' transmission(s) that is/are to be performed later on.

Herein, as another example, when performing the 'channel(/band/carrier) switching(/changing) operation', the randomly (re-)selected resources may be (exceptionally) processed with 'reservation'(/'SPS') (for (a plurality of (or a pre-configured(/signaled) number of) 'TB' transmissions)), or may be used(/reserved) as (frequency) resources being used for (a plurality of (or a pre-configured(/signaled) number of) 'TB' transmissions.

As yet another example, after (first) performing the 'sensing' operation during a pre-configured(/signaled) time section within the switched(/changed) channel(/band/carrier), this method allows the V2X UE(s) to (re-)select (optimal) resources that are to be used in the V2X communication based on the processed result.

Herein, for example, the corresponding 'sensing time section' value (and/or the "PSSCH-RSRP measurement" threshold value in STEP 5 of Section 2.3. in Table 2 (and/or the "$0.2*M_{total}$" related coefficient(/ratio) value in STEP 6(/8) of Section 2.3. in Table 2 (for example, this may be interpreted as a ratio value drawing(/determining) a minimum number of (candidate) resource that should remain (in Set SA) (among the total (candidate) resources) after performing STEP 5 of Section 2.3. in Table 2 and/or a ratio value drawing(/determining) a (minimum) number of (candidate) resources that should remain in Set SB after performing STEP 8 of Section 2.3. in Table 2) and/or a "PSSCH-RSRP measurement" increase value that is to be applied in case the minimum number of (candidate) resources that should remain in Set SA (among the total (candidate) resources) after performing STEP 5 of Section 2.3. in Table 2 is not satisfied (e.g., "3DB") and/or a cycle period value being used in the sensing operation (e.g., STEP 5 of Section 2.3. in Table 2) (and/or a cycle period value being used in the energy measurement operation (e.g., STEP 8 of Section 2.3. in Table 2))) may be configured(/signaled) differently from the value (e.g., '1000MS') that is applied (/used) when the 'channel(/band/carrier) switching(/changing) operation' is not performed (e.g., a relatively smaller (or greater) value) (or may be identically configured(/signaled)).

Herein, as another example, when performing the transmission resource (re-) reservation(/selection), a limited number of subframes (corresponding to a resource reservation (interval) cycle period) being assumed(/used) (and/or the $C_{reset}$ value is Section 2.1. of Table 2 (e.g., "[10*SL_resource_reselection_counted]")) and/or an I_VALUE (range) value that can be selected(/tolerated) from a V2X message priority level and/or a V2X resource pool (and/or a (V2X) carrier) and/or a P_STEP value and/or a transmission power related (open-loop) parameter(/value) (e.g., "Po", "ALPHA", and so on) may be differently configured(/signaled) from the values being applied(/used) when the 'channel(/band/carrier) switching(/changing) operation' is not performed (or may be equally configured(/signaled)).

[Co-existence Method #3] When the V2X UE(s) perform(s) the 'channel(/band/carrier) switching(/changing) operation', the resources that are to be used in the V2X communication may be (re-)selected (from the 'V2X resource pool' within the switched(/changed) channel(/band/carrier)) according to (part of) the rule described below.

(Example #3-1) Although the 'channel(/band/carrier) switching(/changing) operation' is performed, if a packet(/message) (that is to be transmitted to or that is generated) in a '(low layer) buffer' (and/or a 'PDCP layer') does not exist (or if a packet(/message) is not generated), the V2X UE(s) may also (partially) perform the 'sensing' operation (for the 'V2X resource pool' within the switched(/changed) channel (/band/carrier)).

Herein, for example, the V2X UE(s) may perform the '(partial) sensing' operation until a packet(/message) (that is to be transmitted to or that is generated) in its/their '(low layer) buffer' (and/or a 'PDCP layer') exists(/is achieved) (or until a packet(/message) is generated) (or only during a pre-configured(/signaled) time section).

Herein, for example, in case the above-described rule is applied, the V2X UE(s) may finally (re-)select a most adequate (transmission) resource (from the 'V2X resource pool' within the switched(/changed) channel(/band/carrier)) based on the result of the '(partial) sensing' operation.

Herein, for example, the V2X UE(s) may (limitedly) (re-)select its/their (transmission) resource only in the resource (region) wherein the '(partial) sensing' operation is performed.

Herein, for example, (frequency) resources (being related to a (plurality of) 'TB' transmissions) may be defined to be processed with 'reservation'(/'SPS') only in a case where the '(partial) sensing' operation is performed.

As another example, although the 'channel(/band/carrier) switching(/changing) operation' is performed, in case a long 'latency' (longer than a pre-configured(/signaled) threshold value) still remains, the V2X UE(s) may (partially) perform the 'sensing' operation (for the 'V2X resource pool' within the switched(/changed) channel(/band/carrier)).

(Example #3-2) In accordance to whether or not a pre-configured(/signaled) condition is satisfied (in the above-described (Example #3-1)), the V2X UE(s) may perform(/select) any one of (A) resource (re-)selection based on the '(partial) sensing' operation and (B) 'random'-based resource (re-)selection.

Herein, for example, in case the following condition is (partially) satisfied, the V2X UE(s) may perform the 'random'-based resource (re-)selection (or the resource (re-)selection based on the '(partial) sensing' operation), and, otherwise, the V2X UE(s) may perform the resource (re-)selection based on the '(partial) sensing' operation (or the 'random'-based resource (re-)selection).

(Example #3-2-1) When the 'channel(/band/carrier) switching(/changing) operation' is performed, a case where a (newly) generated packet(/message) (or a packet(/message) that is to be transmitted) exists (in a '(low layer) buffer' (and/or a 'PDCP layer')).

(Example #3-2-2) When the 'channel(/band/carrier) switching(/changing) operation' is performed, a case where a short 'latency' (shorter than a pre-configured(/signaled) threshold value) still remains.

(Example #3-2-3) When the 'channel(/band/carrier) switching(/changing) operation' is performed, a case where a '(reselection) counter' value, which is related to a resource that is (re-)selected from the 'V2X resource pool' within the initial channel(/band/carrier), is smaller than or equal to (or greater than) a pre-configured(/signaled) (e.g., '0') (and/or a case where V2X UE(s) perform(s) (or cannot perform) 'TB' transmission by re-using the (re-)selected (frequency) resource as many times as (its/their) pre-configured(/signaled) number(/cycle period) of re-usage).

(Example #3-3) When the 'channel(/band/carrier) switching(/changing) operation' is performed, in case a '(reselection) counter' value, which is related to a resource that is (re-) selected from the 'V2X resource pool' within the initial channel(/band/carrier), is greater than or equal to (or smaller than) a pre-configured(/signaled) (e.g., '0') (and/or a case where V2X UE(s) perform(s) (or cannot perform) 'TB' transmission by re-using the (re-)selected (frequency) resource as many times as (its/their) pre-configured(/signaled) number(/cycle period) of re-usage), and/or in case a (newly) generated packet(/message) (or a packet(/message) that is to be transmitted) exists (or does not exist) (in a '(low layer) buffer' (and/or a 'PDCP layer')), and/or in case a short (or long) 'latency' (shorter (or longer) than a pre-configured (/signaled) threshold value) still remains, the positions of the V2X communication related (transmission) resources within the switched(/changed) channel(/band/carrier) may (at least) succeed(/maintain) the same positions as the initial channel (/band/carrier).

Herein, for example, in case the above-described rule is applied, it may be interpreted that (part of) the parameters related to the (transmission) resource (re-)selection within the initial channel(/band/carrier) (e.g., '(reselection) counter', number of times(/cycle period) performing the 'TB' transmission by re-using the (re-)selected (frequency) resource, and so on) are succeeded to the switched(/changed) channel(/band/carrier).

Herein, for example, the rule may be limitedly applied only to a case where the V2X communication related 'resource pool configuration(/bandwidth)' within the initial channel(/band/carrier) is identical to that of the switched(/changed) channel(/band/carrier).

For example, when the 'channel(/band/carrier) switching (/changing) operation' is performed, and in case the position of the V2X communication related (transmission) resource within the switched(/changed) channel(/band/carrier) is configured by (re-)using the sensing result corresponding to the initial channel(/band/carrier), the V2X UE(s) may only consider the overlapping (V2X communication related) resource (pool) region between the initial channel(/band/carrier) and the switched(/changed) channel(/band/carrier) (within a logical resource region), so as to select(/reserve) the (most) adequate resource among the overlapping region (based on the sensing result corresponding to the initial channel(/band/carrier)).

Herein, for example, when the 'channel(/band/carrier) switching(/changing) operation' is performed, and in case the position of the V2X communication related (transmission) resource within the switched(/changed) channel(/band/carrier) is configured by (re-)using the sensing result corresponding to the initial channel(/band/carrier), if the corresponding configured (transmission) resource position (that is configured by (re-)using the sensing result corresponding to the initial channel(/band/carrier)) is (already) occupied by another V2X UE (or other V2X UEs) within the switched(/changed) channel(/band/carrier) (for example, this may be interpreted as a case where the V2X UE(s)) has/have performed (in advance) the sensing operation corresponding to the switched(/changed) channel(/band/carrier), the V2X UE(s) may (A) reselect (and/or randomly select) only the corresponding collided (transmission) resources and/or (B) use only the remaining (transmission) resources that are not collided(/overlapped) for the purpose of (V2X message) transmission.

For example, while the V2X UE(s) (having the receiving (/sensing) capability related to a plurality of channels(/bands/carriers)) perform(s) sensing(/reception) operations corresponding to the (corresponding) plurality of channels (/bands/carriers) (and/or other communication (e.g., 'DSRC/IEEE 802.11p service', '(other numerology based) NR eV2X service') detection operation), when another communication is detected within the channel(/band/carrier) through which the V2X UE(s) is/are currently performing the (V2X message) transmission operation, (with the exception for the corresponding channel(/band/carrier),) the V2X UE(s) may select one of the (corresponding) plurality of channels(/bands/carriers) through which the sensing(/reception) operation (and/or the other communication detection operation) was/were performed and may, then, perform the 'channel(/band/carrier) switching(/changing) operation'.

Herein, for example, among the (corresponding) plurality of channels(/bands/carriers), (A) a channel(/band/carrier) having a (relatively) low congestion level (and/or a sensed energy measurement value) and/or (B) a channel(/band/carrier) having (relatively) less resources being occupied by the other V2X UE(s) and/or (C) a channel(/band/carrier) having no other communication detected therein and/or (E) a channel(/band/carrier) of a (relatively) low (or high) index may first be selected (and/or a channel(/band/carrier) of a (higher (or lower) (priority)) level according to a pre-configured/(signaled) (priority) level) may first be selected) or may be randomly selected.

For example, in order to perform the (V2X message) transmission, while the V2X UE(s) uses a (pre-configured (/signaled)) specific carrier(/channel(/band)), when it is determined that another (pre-configured(/signaled)) carrier (/channel(/band)) has a lower 'congestion level' (and/or 'load level'), if the V2X UE(s) switches to the (corresponding) other carrier(/channel(/band)) immediately (or right away), this may cause the system to become instable.

Herein, for example, in order to resolve the corresponding problem, (A) a timer for maintaining the (V2X message) transmission within the initial carrier(/channel(/band)) may be configured(/signaled) (before the ('congestion level' (and/ or 'load level') based) carrier(/channel(/band)) switching is applied) and/or (B) a switching operation to another carrier (/channel(/band)) (having a relatively low 'congestion level' (and/or 'load level')) may be (limitedly) performed only when a 'congestion level difference' (and/or 'load level difference') between the initial carrier(/channel(/band)) and another carrier(/channel(/band)) exceeds a pre-configured(/ signaled) threshold value (for example, this may be interpreted as a type of ('congestion level' (and/or 'load level') based) 'hysteresis').

For example, it will be assumed that a resource (RES_L) being configured(/signaled) to have a 'RAT' of a (relatively) low priority level for the V2X UE(s) and that a resource (RES_H) being configured(/signaled) to have a 'RAT' of a (relatively) high priority level exist (ref Table 3).

Herein, for example, while the V2X UE(s) perform(s) the V2X communication, if a (measured) ('RES_H' related) 'congestion level' value becomes greater than a pre-configured(/signaled) threshold value (CL_RSC_H) (for example, the 'CL_RSC_H' may be interpreted as a threshold value being interconnected with the 'RES_H'), and if the V2X UE(s) consider(s) switching(/offloading) to 'RES_L' accordingly, (actual) switching (from 'RES_H' to 'RES_H') may be allowed only when the 'RES_L' related (measured) 'congestion level' value is smaller than the pre-configured (/signaled) threshold value (CL_RSC_L) (for example, 'CL_RSC_L' may be considered as a threshold value being interconnected with the 'RES_L').

Herein, for example, the 'CL_RSC_H' and the 'CL_RSC_L' may be configured(/signaled) as different values (e.g., 'CL_RSC_H>CL_RSC_L').

For example, the V2X UE(s) may perform a 'congestion level' (and/or 'load level') measurement operation (and/or 'other communication' (e.g., 'DSRC/IEEE 802.11p service', '(other numerology based) NR eV2X service') (and/or 'other RAT') detection operation) even in a (pre-configured (/signaled)) (external) resource region other than a V2X resource pool (that is designated to have a 'carrier(/cell)-specific network (pre)configuration' format.

Herein, for example, if the corresponding 'congestion level' (and/or 'load level') measurement result (corresponding to the (external) resource region) is high, it may be determined that an 'other communication' (and/or 'other RAT') exist(s).

Herein, for example, the corresponding 'congestion level' (and/or 'load level') measurement (corresponding to the (external) resource region) (and/or the 'other communication' (and/or 'other RAT') detection) may be performed in a (separate) pre-configured(/signaled) sub-channel (within the (external) resource region) and/or may be performed through the entire band (within the (external) resource region).

Herein, for example, the ('congestion level' (and/or 'load level') measurement related) (S-RSSI) measurement operation may be performed within the V2X resource(s) without any V2X resource pool distinction.

Herein, for example, the corresponding ('congestion level' (and/or 'load level') measurement related) (S-RSSI) measurement operation may be performed in a '(V2X) pool-specific' (or '(V2X) pool-common) format, and regions excluding the (V2X) pool may be measured separately.

Herein, for example, in (part of) the above-described rule, the measurement operation (within the V2X resource(s)) may be performed only in the (V2X) TX pool (and/or (V2X) RX pool) (within the corresponding carrier).

For example, in case the ('V2X communication' (and/or 'V2X message TX operation') related) carrier(/channel/ band/pool) is to be switched by the V2X TX UE(s) (according to the pre-configured(/signaled) rule(/(priority) level), the V2X TX UE(s) may signal(/broadcast) (in advance) to the (neighboring) V2X RX UE(s) through a pre-defined channel (e.g., 'PSCCH(/PSSCH)' and/or 'PSBCH')' information indicating to which carrier(/channel/band/pool) the V2X TX UE(s) intend(s) to perform switching.

Herein, for example, the (specific) carrier(/channel/band/ pool) through which the channel of the corresponding purpose is to be transmitted may be pre-configured(/signaled) (in a 'UE-common' format).

For example, Table 3 shows a method enabling the 'V2X communication' and the 'other communication' (e.g., 'DSRC/IEEE 802.11p service', '(other numerology based) NR eV2X service') to efficiently co-exist.

TABLE 3

3. Example of a method enabling the 'V2X communication' and the 'other communication' to efficiently co-exist
Proposal 1: An LTE SL V2V design for the co-existence with a Dedicated Short-Range Communications (DSRC) should consider the co-existence with the NR V2X. More specifically, an LTE SL V2V design for the co-existence with the NR V2X should be considered.
3.1. Solutions that can be identified in an SI phase
Proposal 2: A RAN1 specification resource may not be required in the "geographical location and database" and "time sharing between GNSS timing-based systems" options.

Figure 8:
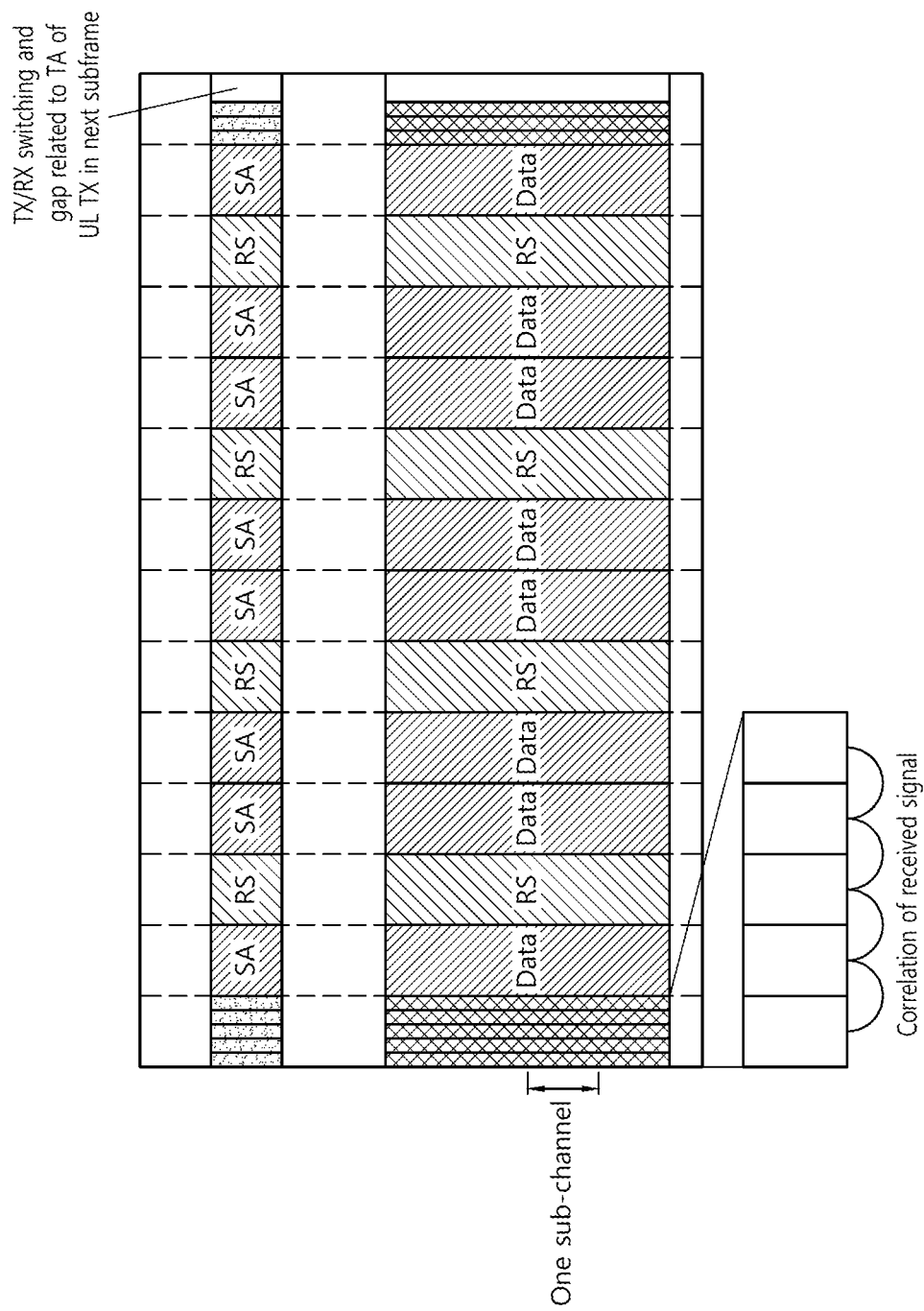
FIG. 8 is an example of an LTE SL V2V detection signal using time repetition of a short sequence.
Figure 9:
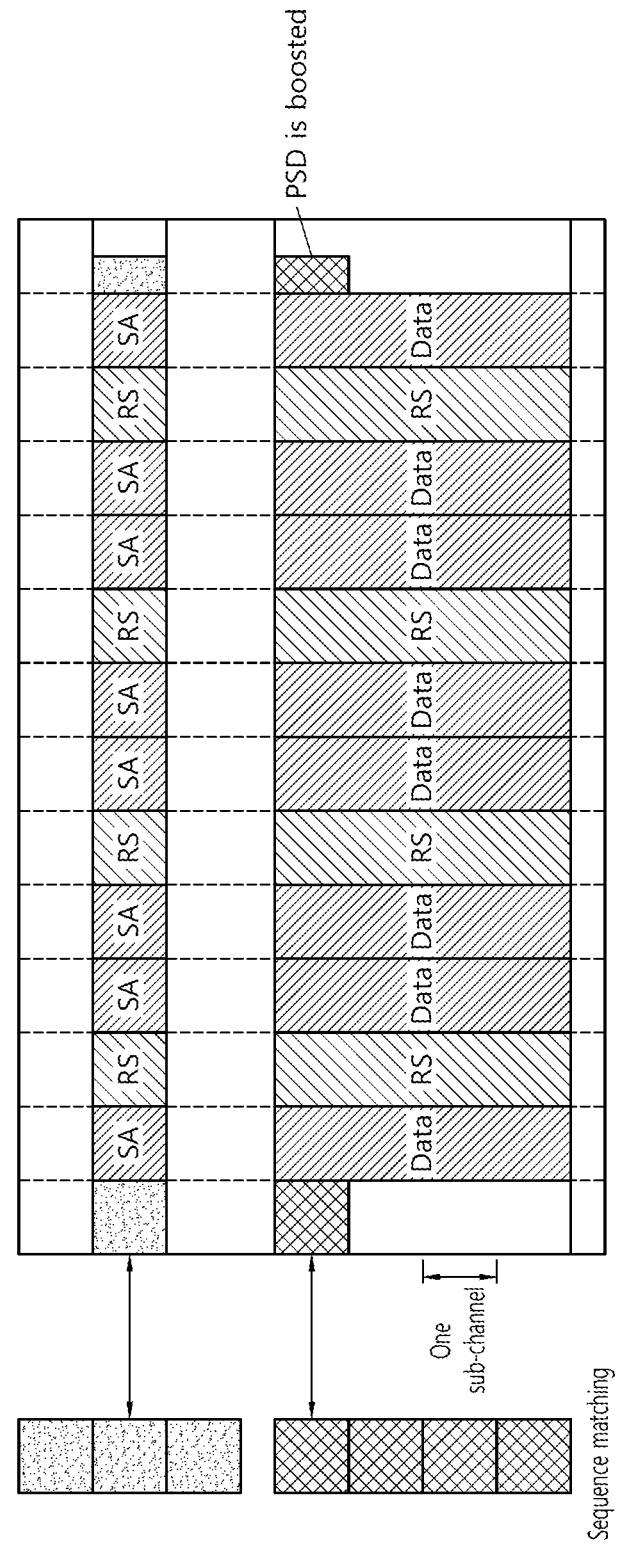
FIG. 9 is an example of an LTE SL V2V detection signal using sequence matching in the frequency domain.

TABLE 3-continued 3.2. Detection of another RAT
Proposal 3: When the LTE UE senses a high energy level from a resource
performing no LTE transmission, the LTE UE may detect the presence of another
RAT. A "resource having no LTE transmission" may correspond to a resource that
is configured just as the implicit resources or a resource having no LTE signals
discovered therein.
Proposal 4: Even in case a load corresponding to an LTE SL V2V is high, a
solution may be required in order to ensure a transmission opportunity of IEEE
802.11p.
In order to ensure detectability, the reference line may correspond to
transmitting a detection signal by the UE each time the PSCCH/PSSCH is
transmitted from the subframe. One of the methods corresponds to using a first
and/or last symbol(s) (including a possibility of using part of such symbols)
within a frequency resource of a corresponding PSCCH/PSSCH. However, this
design should ensure the operations performed in this symbol. Herein, in the first
symbol, an automatic gain control (AGC) operation may be performed, and, in
the last symbol, a TX/RX switching operation and an absorbing operation of an
uplink (UL) TX timing advance may be performed. Hereinafter, two different
options corresponding to the detection signal of the LTE SL V2V will be
described in detail.
FIG. 8 is an example of an LTE SL V2V detection signal using time
repetition of a short sequence.
According to FIG. 8, in the first option, a short sequence may be repeated
within the time domain within the first and/or last symbol(s). The operation of the
intended detection device corresponds to using a so-called "delay correlation"
between a next receiving signal following the time domain receiving signal that is
delayed for as much as a detection sequence length and a correlated receiving
signal.
In this operation, although the UE does not detect the sequence itself, the UE
is capable of identifying a specific repetition pattern of a signal in the time
domain. Therefore, the UE is not required to know the accurate sequence that is
used by the transmitter, and this may correspond to an advantage of a detector
using another RAT.
FIG. 9 is an example of an LTE SL V2V detection signal using sequence
matching in the frequency domain.
According to FIG. 9, in the second option, the detection device may match
each sequence of each frequency resource. Since the transmission bandwidth of
the PS SCH may not be known to the detection device, in order to allow all UEs to
use the same sequence while adequately maintaining a single carrier, a resource
block (RB) size of a detection signal is fixed to have the same size as, for
example, one sub-channel. In order to allow the first symbol to support the AGC
and to maintain the same coverage, a Power Spectral Density (PSD) is required to
be boosted during the transmission of a detection signal, which uses part of the
PSSCH transmission bandwidth.
Proposal 5: When a pre-decided signal is used for an inter-RAT detection, a
new LTE SL signal is required to be transmitted from a first and/or final
symbol(s) of all subframes from which the UE transmits the PSCCH/PSSCH.
Herein, the AGC operation should be ensured in the first symbol, and the TX/RX
switching operation and the absorbing operation of a UL TX timing advance
should be ensured in the last symbol.
3.3. Usage of resources that are potentially shared with another RAT
A detect-and-vacate operation assumes a prioritized access to a resource. In
other words, RAT priority levels are designated so that a RAT given a higher
priority level is detected, another RAT may suspend its usage of the resource.
Accordingly, the UE may be required to define when to perform transmission
from a resource that may be potentially used in another RAT at a high priority.
Proposal 6: In the detect-and-vacate operation, it may be assumed that, in a
given set of resources, different RATs may have different priority levels.
When a RAT having a low priority level (e.g., RAT A) detects a RAT having
a higher priority level (e.g., RAT B) in a specific resource set X corresponding to
RATs having low priority levels, the RAT having a low priority level (e.g., RAT
A) may suspend its transmission.
Related inquiries (or questions) correspond to which resource will be used
for the transmission of RAT A. More specifically, this corresponds to a case
where a predetermined level of waiting time and reliability requirements are
required. In this case, since suspending the transmission is not appropriate, a
basic assumption that RAT A corresponds to another resource set Y having a high
priority level may be made. Therefore, in the point of view of the RAT, the
resource set Y may be used as the basic resource, and resource set X may
correspond to a type of auxiliary set being occasionally used for an offload.
RAT A may use resource set X only when offloading is required. Otherwise,
since the inter-RAT detection is not perfect, interference may occur in RAT B.
Additionally, considering a limitation in the number of operational carriers and an
overhead/latency during switching and sorting (or alignment) of the operational
carriers through the UE, maximum prevention of unnecessary multi-carrier
management (or operation) is required. In case there is no problem of congestion
in a resource set of a high priority level RAT, this may indicate that the UE does
not use a resource set of a low priority level RAT.

TABLE 3-continued

Proposal 7: In the detect-and-vacate operation, it may be assumed that each
RAT has a resource set of the highest priority level. It may be considered that the
UE uses another resource only when congestion is detected from the resource set
of the highest priority level.
A resource set, wherein the LTE SL V2V has a low priority level, may be
configured in multiple carriers. In this case, the receiving UE may be required to
know which carrier is being used by the transmitting UE for the purpose of
offloading. In order to support this operation, the UE may broadcast information
on the transmission carrier to other UEs located near the corresponding UE.
In order to support the sorting method used in the carriers that are used
throughout all of the UEs, among the carriers, the carrier having the first order
may be first considered as the transmission carrier.
In case time is not allowed for the UE to fully (or completely) monitor the
switched carrier, a random resource selection or a limited resource detected,
which were discussed for the V2P, may be viewed as fallback operations.
Meanwhile, in case each of the UEs are equipped with a multi-carrier receiving
function and is already monitoring the candidate carriers, such fallback operation
may not be required. Therefore, an assumed multi-carrier capacity may first be
discussed.
Proposal 8: In case the detect-and-vacate operation is operated through
multiple carrier, discussion is required to be carried out on how to sort (or align)
the transmission carriers among the UEs.
3.4. Inter-RAT co-existence in a V2P case
In case of the BV2P, the P-UE transmission and V-UE reception scenario
was prioritized during the SI phase. However, in case of the co-existence between
the detection-based RATs, if such co-existence mechanism is also used in the V2P
case, the limited P-UE receiving capability needs to be considered. Although one
possibility is to operate each P-UE so that other RATs can be detected before
carrying out the transmission, this will eventually require a larger amount of
battery consumption and RX function of a PC5 carrier. Even if a partial sensing
operation is carried out, limitations may exist in that the P-UE may not be capable
of detecting the presence of another RAT within the subframe that is not
monitored.
In order to resolve this problem, resource of the eNB may be considered.
Each V-UE may report the detection of another RAT to the eNB along with the
position information of the corresponding V-UE. Accordingly,
the eNB may forward the corresponding information to the P-UE, and, by
acquiring a portion of the position information of the related V-UE from the
forwarded information, the transmission of the P-UE may be determined.
Optionally, the eNB may activate/deactivate a resource pool corresponding to the
P-UEs within the region based on the report received from the V-UEs.
Proposal 9: In case the detect-and-vacate operation is operated for the V2P
case, a solution enabling the P-UE to recognize the presence of another RAT may
be required. The V-UE report and eNB forwarding may be considered.
3.5. The above-described proposals may be summarized as described below.
Proposal 1: An LTE SL V2V design for the co-existence with a Dedicated
Short-Range Communications (DSRC) should consider an extension of the co-
existence with the NR V2X.
Proposal 2: A RANI specification resource may not be required in the
"geographical location and database" and "time sharing between GNSS timing-
based systems" options.
Proposal 3: When the LTE UE senses a high energy level from a resource
performing no LTE transmission, the LTE UE may detect the presence of another
RAT. A "resource having no LTE transmission" may correspond to a resource that
is configured just as the implicit resources or a resource having no LTE signals
discovered therein.
Proposal 4: Even in case a load corresponding to an LTE SL V2V is high, a
solution may be required in order to ensure a transmission opportunity of IEEE
802.11p.
Proposal 5: When a pre-decided signal is used for an inter-RAT detection, a
new LTE SL signal is required to be transmitted from a first and/or final
symbol(s) of all subframes from which the UE transmits the PSCCH/PSSCH.
Herein, the AGC operation should be ensured in the first symbol, and the TX/RX
switching operation and the absorbing operation of a UL TX timing advance
should be ensured in the last symbol.
Proposal 6: In the detect-and-vacate operation, it may be assumed that, in a
given set of resources, different RATs may have different priority levels.
Proposal 7: In the detect-and-vacate operation, it may be assumed that each
RAT has a resource set of the highest priority level. It may be considered that the
UE uses another resource only when congestion is detected from the resource set
of the highest priority level.
Proposal 8: In case the detect-and-vacate operation is operated through
multiple carrier, discussion is required to be carried out on how to sort (or align)
the transmission carriers among the UEs.
Proposal 9: In case the detect-and-vacate operation is operated for the V2P
case, a solution enabling the P-UE to recognize the presence of another RAT may
be required. The V-UE report and eNB forwarding may be considered.

Since the above-described examples of the co-existence methods may also be included as one of the methods for implementing the present invention, it will be apparent that the above-described examples can be viewed as other types of co-existence methods. Additionally, although the above-described co-existence methods may be independently implemented, the co-existence methods may be implemented in a combined (or integrated) form of parts of the co-existence methods. For example, although the present invention is described based on a 3GPP LTE system for simplicity in the description, the scope of systems in which the co-existence methods can be applied may be extended to diverse systems other than the 3GPP LTE system.

For example, the co-existence methods according to the present invention may also be extendedly applied to D2D communication. Herein, for example, D2D communication refers to performing communication between a UE and another UE by using a direct wireless channel. And, herein, for example, although the UE refers to a user device, in case a network equipment, such as a base station, transmits/receives signals according to a communication method performed between UEs, the corresponding network equipment may also be viewed as a type of UE.

Additionally, for example, the co-existence methods according to the present invention may also be limitedly applied only in MODE 2 V2X operations (and/or MODE 1 V2X operations). Additionally, for example, the co-existence methods according to the present invention may also be limitedly applied only to V-UE(s) (or P-UE(s)) (and/or V2X UE(s) being equipped with a V2X carrier(/channel(/band)) for a (dedicated) RX(/TX) chain.

Hereinafter, the present invention will be described in detail.

In the following proposed methods, the UE may correspond to a user device (or UE) having restricted (or limited) capability. For example, the UE may correspond to a UE having a limited reception (RX)/transmission (TX) chain/circuit capability (and/or a UE having a limited battery capacity(/duration time/consumption)). For example, the UE may correspond to a UE being equipped with only one receiving unit(/transmitting unit), thereby being incapable of receiving(/transmitting) a signal according to the WAN communication of the first frequency and a signal according to the V2X communication of the second frequency at the same time. The UE may correspond to a pedestrian UE (P-UE; as a UE carried by a pedestrian, this may also be referred to as a handheld UE for pedestrians), which has relatively greater limitation in hardware implementation cost/increase in complexity/battery power consumption (as comparted to a UE being installed in a vehicle (vehicle-UE (V-UE))).

When the UE performs a V2X message transmission(/reception) operation within a V2X carrier or resource pool (a carrier/resource pool having the V2X communication set thereto), a method allowing this operation to be efficiently performed will hereinafter be proposed.

Hereinafter, for simplicity in the description of the proposed method, for example, it will be assumed that a user device P-UE #K has a one-reception (RX) chain/circuit capability and a two-transmission (TX) chain/circuit capability.

Additionally, a situation where the P-UE #K performs WAN DL/UL communication in wide area network (WAN) DL/UL carrier #X (this may be interpreted as carriers having the WAN DL/UL communication configured thereto) and performs a V2X message transmission(/reception) operation within a V2X carrier #Y (at the same time) will be assumed.

However, in addition to the above-described situation, the proposed methods of the present invention may also be extendedly applied in other diverse cases (e.g., cases where capabilities exceeding the reception(/transmission) chain/circuit capability of the V2X UE are being required).

It may be interpreted that the P-UE #K does not have a 'dedicated receiving unit(/transmitting unit) (or dedicated RX(/TX) chain/circuit)' within the V2X carrier #Y where the V2X communication is being performed. More specifically, it may be interpreted that only the 'TX(/RX) chain/circuit' exists within the V2X carrier #Y.

A "transmission resource collision avoiding operation (i.e., sensing method)" between V2X UEs is more advantageous in enhancing the V2X communication performance as compared to a random method wherein the V2X UEs randomly select/re-select a transmission resource.

The sensing operation may (A) be performed through a decoding of a 'scheduling assignment (SA) channel (e.g., PSCCH) and/or through a measurement (e.g., 'PSSCH-RSRP')' of a pre-defined channel/reference signal (RS) (e.g., 'DM-RS') within a 'data channel (e.g., PSSCH)' that is interconnected to the (corresponding) decoded PSCCH and/or (b) be performed through an energy measurement (e.g., 'S-RSSI').

Hereinafter, for example, the terms used herein, such as carrier/band/channel, and so on, may be interpreted as a resource pool.

<Proposed Method #1>

When a P-UE #K (having a limited reception (RX) chain/circuit capability) performs a V2X message transmission operation within V2X carrier #Y, instead of borrowing (/switching) a RX chain/circuit that is used in the WAN downlink reception operation (WAN DL carrier #X) (regardless of the configuration of the sensing operation), the P-UE #K may (re-)select a transmission resource (within the V2X carrier #Y) for performing a V2X message transmission by (always) using a random method.

For example, the V2X message may be (periodically) transmitted based on a cycle period value (that is determined in a higher-level layer (of the UE)) (and/or may be transmitted based on a (re-)selected(/reserved) (periodic) resource (that is (re-) selected(/reserved) based on the corresponding cycle period value). Herein, for example, when performing (transport block (TB) related) (data/scheduling assignment) transmission resource (re-)selection(/reservation), with the exception for a subframe to which the (TB related) (data/scheduling assignment) transmission resource, which is (re-)selected(/reserved) at a previous (cycle period (/transmission resource (re-)selection(/reservation))) time point, the P-UE #K may limitedly perform (re-)selection(/reservation) in the remaining subframes (this has the effect of resolving the half duplex problem).

For example, when the P-UE #K performs the (re-)selection(/reservation) of the transmission resource, may select specific subframe(s), from (re-)selection(/reservation) candidate resources configured of 100 subframes (wherein it is assumed that the 100 subframes are indexed from 0 to 99), and may then transmit a V2X message. If the P-UE #K has selected an $N^{th}$ subframe (from the (re-)selection(/reservation) candidate resources) at a previous transmission resource (re-)selection(/reservation) time point, the P-UE #K may (randomly) select a specific subframe among the remaining subframes excluding the $N^{th}$ subframe (from the (re-)selection(/reservation) candidate resources) at a next transmission resource (re-)selection(/reservation) time point.

Herein, for example, the P-UE #K may perform a V2X message transmission operation by using a 'UU interface' or a WAN uplink (UL) (in case the sensing operation is configured). Such operation may also be interpreted as a switching operation between the PC5 and UU (or WAN uplink).

<Proposed Method #2>

The P-UE #K (having a limited reception (RX) chain/circuit capability) may assume that a "sensing gap(/sensing resource) or receiving gap(/receiving resource) or a partial sensing gap(/partial sensing resource)" of a pattern, which is configured (or determined) or signaled in advance (by the network), (e.g., 'bitmap/cycle period/offset') exists within a time/frequency resource that is configured (or determined) or signaled in advance (prior to performing the V2X message transmission (resource (re-)selection(/reservation)) operation) (e.g., a time/frequency resource preceding the V2X transmission resource pool and/or a time/frequency resource prior to the (scheduling assignment) cycle period (/time point) in/at which the V2X message transmission (resource (re-)selection(/reservation)) operation is to be performed). Herein, for example, the "sensing gap or receiving gap" wording may also be referred to as a partial sensing gap (hereinafter equally applied or used). Herein, for example, the "sensing gap" may refer to a resource that should perform sensing in order to (re-) select(/reserve) the resource (e.g., subframe) that is to be used by the UE for the V2X signal transmission, and, in this aspect, the sensing gap may also be referred to as a sensing resource. Similarly, the "receiving gap" may refer to a resource that should receive (/decode) a signal(/channel) in order to allow the UE to perform the sensing operation (and/or a resource that should perform PSSCH-RSRP/S-RSSI measurement), and, in this aspect, the receiving gap may also be referred to as a receiving. Additionally, a "partial sensing gap" may refer to a (partial) resource that is configured to perform the sensing operation, and, in this aspect, the partial sensing gap may also be referred to as a partial sensing resource.

Within the sensing gap(/resource) (or receiving gap(/resource)/partial sensing gap(/resource), hereinafter equally applied or used), the P-UE #K may perform switching(/borrowing) of its own reception chain/circuit, which is used for the WAN downlink reception operation (WAN DL carrier #X) and/or the sensing operation (or partial sensing operation). Herein, for example, the sensing operation may include at least one of 1) an operation that acquires information on resources that are occupied by performing decoding of the scheduling assignment channels being transmitted by another V2X UE, and 2) an operation that acquires information on resources having a high interference level as a result of performing the (energy) measurement operation (e.g., PSSCH-RSRP, S-RSSI) corresponding to a pre-defined channel/reference signal or resources being occupied by another V2X UE.

By performing the above-described sensing operation, the avoidance of transmission resource collision with other V2X UEs becomes possible.

Figure 10:
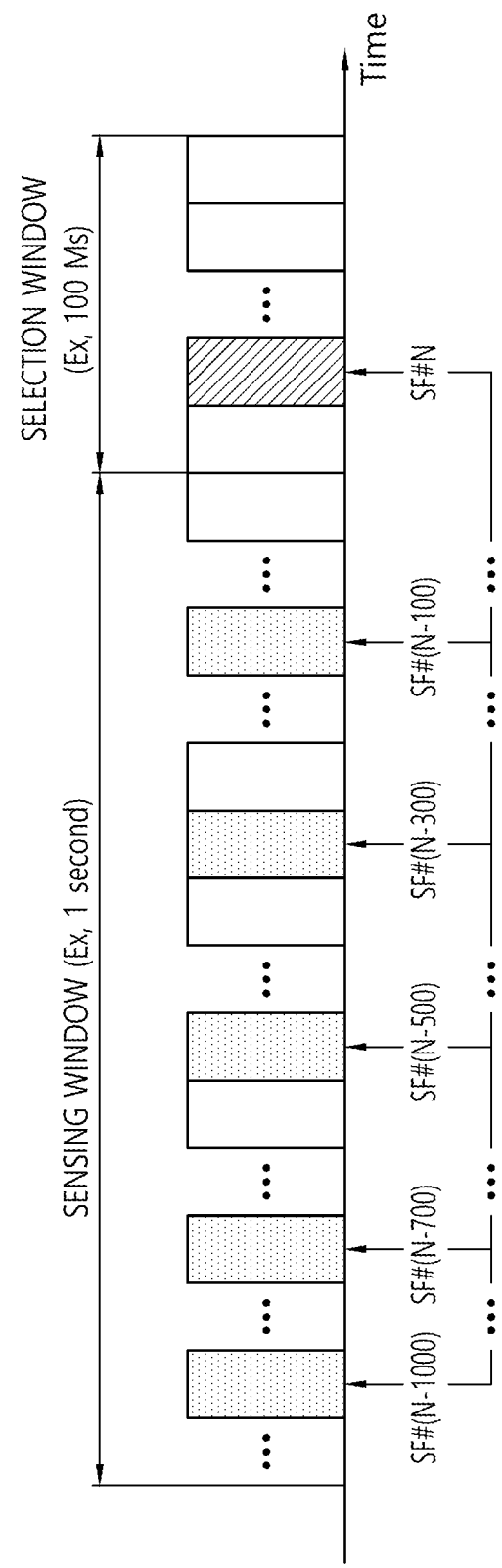
FIG. 10 is an example of a V2X transmission resource selecting method according to a partial sensing operation of <Proposed Method #2>.

FIG. 10 is an example of a V2X transmission resource (re-)selecting(/reserving) method according to a partial sensing operation of <Proposed Method #2>.

Referring to FIG. 10, (re-)selection(/reservation) of the resource for V2X signal transmission may be determined(/triggered) for the UE (P-UE, hereinafter equally applied or used) (according to whether or not a pre-defined condition is satisfied). For example, it will be assumed that the transmission resource (re-)selection(/reservation) is triggered in subframe #m. In this case, the UE may (re-)select(/reserve) a resource for the V2X signal transmission in a section starting from subframe #m+T1 to subframe #m+T2. The section starting from subframe #m+T1 to subframe #m+T2 will hereinafter be referred to as a selection window. The selection window may, for example, be configured of 100 consecutive subframes.

In the selection window, the UE may select a minimum of Y number of subframes as the candidate resources. More specifically, the UE may have to consider a minimum of Y number of subframes as the candidate resources within the selection window. Herein, the Y value may correspond to a pre-configured value or may correspond to a value that is configured (or determined) by the network. Herein, however, how to select the Y number of subframes within the selection window may correspond to an issue of UE implementation. More specifically, if, for example, the Y value is given as 50, the UE may decide which 50 subframes it will be selecting among the 100 subframes configuring the selection window. For example, among the 100 subframes, the UE may select 50 subframes being indexed with odd numbers, or the UE may select 50 subframes being indexed with even numbers. Alternatively, the UE may select 50 subframes according to a random rule.

Meanwhile, in order to (re-)select(/reserve) a specific subframe, e.g., subframe #N (SF #N) as the V2X transmission subframe that can transmit the V2X signal, among the Y number of subframes, the UE may have to sense at least one subframe that is linked or related to subframe #N. Herein, a (total) subframe section that is defined for the sensing process will be referred to as a sensing window, and the sensing window may, for example, be configured of 1,000 subframes. More specifically, the sensing window may be configured of 1,000 milliseconds (ms) or 1 second. For example, within the sensing window, the UE may sense subframes corresponding to subframe #N−100*k (wherein k may correspond to a set of elements corresponding to a range of [1, 10] and may correspond to a value that is pre-determined or configured by the network).

FIG. 10 shows an example where the k value corresponds to {1, 3, 5, 7, 10}. More specifically, the UE may sense subframes #N−1000, #N−700, #N−500, #N−300, and #N−100 so as to estimate/determine whether or not subframe #N is being used by another V2X UE (and/or whether or not a high interference level exists (or whether or not an interference level being greater than or equal to a pre-configured(/signaled) threshold value exists within subframe #N) and may then (finally) select subframe #N according to the estimated/determined result. Since the P-UE is sensitive to the consumption of batter power as compared to the V-UE, instead of sensing all of the subframes existing in the sensing window, the P-UE may sense only part of the subframes, i.e., the P-UE may perform partial sensing.

Figure 11:
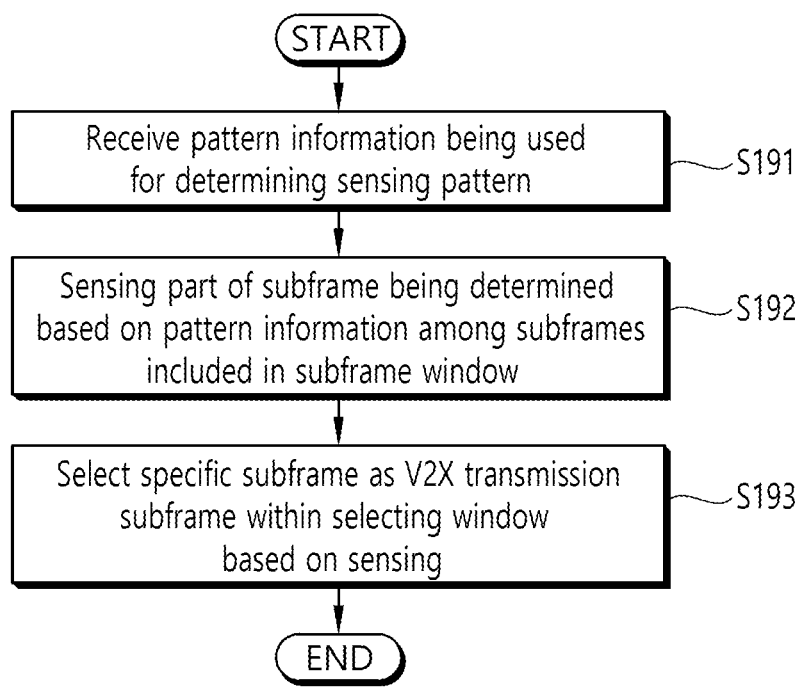
FIG. 11 is an example of a V2X transmission subframe determining method according to the <Proposed Method #2>.

FIG. 11 is an example of a V2X transmission subframe (/resource) (re-) determining(/selecting(/reserving)) method according to the <Proposed Method #2>.

Referring to FIG. 11, the UE receives pattern information that is used for determining a (partial) sensing pattern (S191). The pattern information may be provided by a network through an RRC (or SIB) message, and so on.

The following table shows an example of the pattern information.

TABLE 4

```
-- ASN1START
SL-P2X-SensingConfig-r14 ::=    SEQUENCE {
   minNumCandidateSF-r14           INTEGER (1..13),
   gapCandidateSensing-r14         BIT STRING (SIZE (10))
}
-- ASN1STOP
```

In the table presented above, 'minNumCandidateSF' represents a minimum number of subframes that must be included in the possible candidate resources. As described above, the UE is required to consider the minimum Y number of subframes as the candidate resources within a selection window. At this point, 'minNumCandidateSF' may indicate the Y value.

When a subframe is considered as a candidate resource, 'gapCandidateSensing' indicates which subframe should be sensed. As described above, in case a specific subframe, e.g., subframe #N (SF #N) is selected as a candidate resource among the Y number of subframes, subframes corresponding to subframe #N−100*k should be sensed from the sensing window. And, in this case, 'gapCandidateSensing' may indicate the k value through a 10-bit bit string. For example, in case the k value corresponds to {1, 3, 5, 7, 10}, the 'gapCandidateSensing' may be indicated as "1001010101".

Among the subframes within the sensing window, the UE senses part of the determined subframes based on the pattern information (S192). More specifically, the UE performs partial sensing. Partial sensing has already been described above in detail with reference to FIG. 10.

The UE selects a specific subframe within the selection window as the V2X transmission subframe based on the above-described sensing operation (S193).

Figure 12:
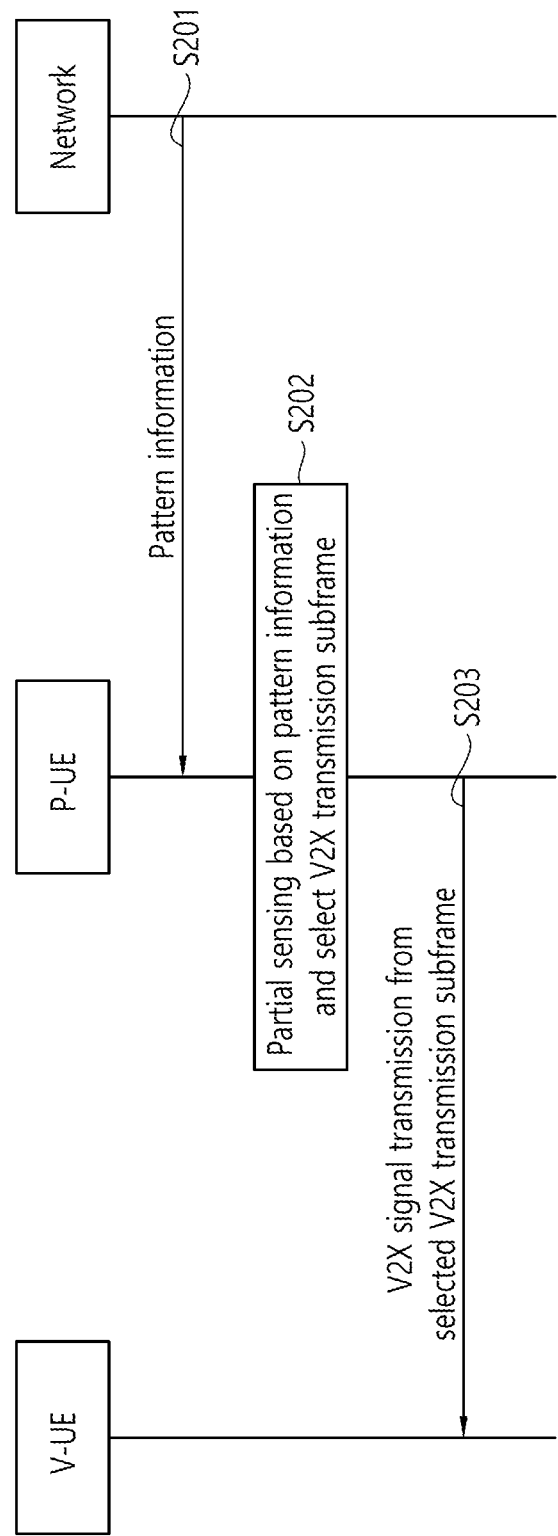
FIG. 12 is an example of a communication method between a pedestrian UE (P-UE), a vehicle UE (V-UE), and a network according to the <Proposed Method #2>.

FIG. 12 is an example of a communication method between a pedestrian UE (P-UE), a vehicle UE (V-UE), and a network according to the <Proposed Method #2>. Herein, for example, although a situation where the P-UE transmits a V2X signal to the V-UE is assumed in FIG. 12, generally, the V2X signal being transmitted by the P-UE may set other entities (e.g., P-UE, V-UE, (UE-type) RSU, and so on) as well as the V-UE as its target.

Referring to FIG. 12, the network provides (sensing) pattern information to the pedestrian UE (S201). The pattern information has already been described above in detail with reference to Table 4.

The P-UE performs partial sensing based on the (sensing) pattern information and selects a V2X transmission subframe in accordance with the partial sensing result (S202).

The P-UE transmits a V2X signal from the selected V2X transmission subframe (S203).

<Proposed Method #3>

(A pedestrian UE having a limited reception chain/circuit capability, such as) P-UE #K may report information on a sensing gap(/resource) or receiving gap(/resource) or partial sensing gap(/resource) having its preferred format or pattern (to the network through the WAN uplink). Herein, for example, the corresponding sensing gap(/resource) or receiving gap(/resource) or partial sensing gap(/resource) information may be configured to have a bitmap format and/or a format informing a cycle period/offset value (of the sensing gap(/resource)(/receiving gap(/resource)/partial sensing gap(/resource))).

The preferred sensing gap(/resource)(/receiving gap(/resource)/partial sensing gap(/resource)) format/pattern may include a partial time/frequency resource region having a relatively low energy measurement result value (and/or a 'congestion level' result value), after the P-UE #K performs the measurement(/sensing) operation (within the pre-configured or pre-signaled time/frequency resource section).

<Proposed Method #4>

(In case the above-described Proposed Method #3 is applied,) If the sensing gap(/resource) (or receiving gap(/resource) or partial sensing gap(/resource)) pattern (received from the base station) fails to cover all of the (previous) time/frequency resource(/pool) region that requires a sensing operation (related to the pool(/resource) in which the V2X message transmission operation is to be performed) (or fails to cover a region corresponding to a pre-configured(/signaled) (threshold) ratio value or more) (e.g., in case the corresponding sensing gap(/resource)(/receiving gap(/resource)/partial sensing gap(/resource)) pattern covers only part of the resources(/subframes) within the sensing window), the corresponding V2X message transmission operation may be performed according to the following rule.

Herein, for example, when the V2X message transmission operation is performed within V2X transmission resource pool #J (which is interconnected with the scheduling assignment pool(/cycle period) #J), the sensing operation for the corresponding V2X transmission resource pool #J may be performed within the previous time/frequency resource (e.g., within V2X transmission resource pool #(J−1) (which is interconnected with the scheduling assignment pool(/cycle period) #(J−1)). As described above, the sensing gap(/resource) (or receiving gap(/resource)) based sensing operation may be interpreted as a 'partial sensing operation'.

(Example #4-1) Within the sensing gap(/resource) (or receiving gap(/resource) or partial sensing gap(/resource) (hereinafter equally applied or used)) pattern (received from the base station), a transmission resource collision avoiding operation with other V2X UEs may be performed by using only the acquired sensing information (e.g., information on the resource occupied by another V2X UE, information on a resource having a high interference level).

For example, (in case another UE repeats the usage of the resource at a consistent cycle period, if the sensing gap(/resource)(/receiving gap(/resource)/partial sensing gap(/resource)) fails to cover all of the (one) repetition cycle period (or sensing window),) the P-UE may be operated so as to be capable of (re-)selecting(/reserving) its optimal transmission resource only within the resource in which the sensing has been performed through the sensing gap(/resource)(/receiving gap(/resource)/partial sensing gap(/resource)).

For example, in case of (re-)selecting(/reserving) a resource having a lowest energy level, the (re-)selection(/reservation) may be limited to (re-)selecting(/reserving) a resource having the lowest energy level among the resources belonging to the sensing gap(/resource) (or receiving gap(/resource) or partial sensing gap(/resource)).

For example, in case of determining a resource occupied by another UE through the scheduling assignment channel decoding of the other UE, the (re-)selection(/reservation) may be limited to (re-)selecting(/reserving) only a 'data resource' that can be scheduled by a scheduling resource that belongs to the sensing gap(/resource)(/receiving gap(/resource)/partial sensing gap(/resource)).

At the current transmission resource (re-)selecting(/reserving) (cycle period) time point, when performing (transmission block related) (data or scheduling assignment, hereinafter equally applied or used) transmission resource (re-)selection(/reservation), the P-UE #K may limitedly perform (re-)selection(/reservation) in the remaining subframes after excluding the subframe to which the (transmission block related) (data or scheduling assignment) transmission resource belongs, wherein the corresponding transmission resource has been (re-)selected(/reserved) at the previous (re-)selecting(/reserving) (cycle period) time point. Accordingly, the half duplex problem may be resolved (under the environment of an incomplete sensing information based transmission resource (re-)selecting(/reserving) operation). Herein, the half duplex problem refers to a case where, since the UE is incapable of transmitting and receiving signals at the same time, in case of repeatedly using the same resource (e.g., frequency resource) for the transmission/reception of signals, the transmission/reception of signals cannot be repeatedly performed within the corresponding resource.

Figure 13:
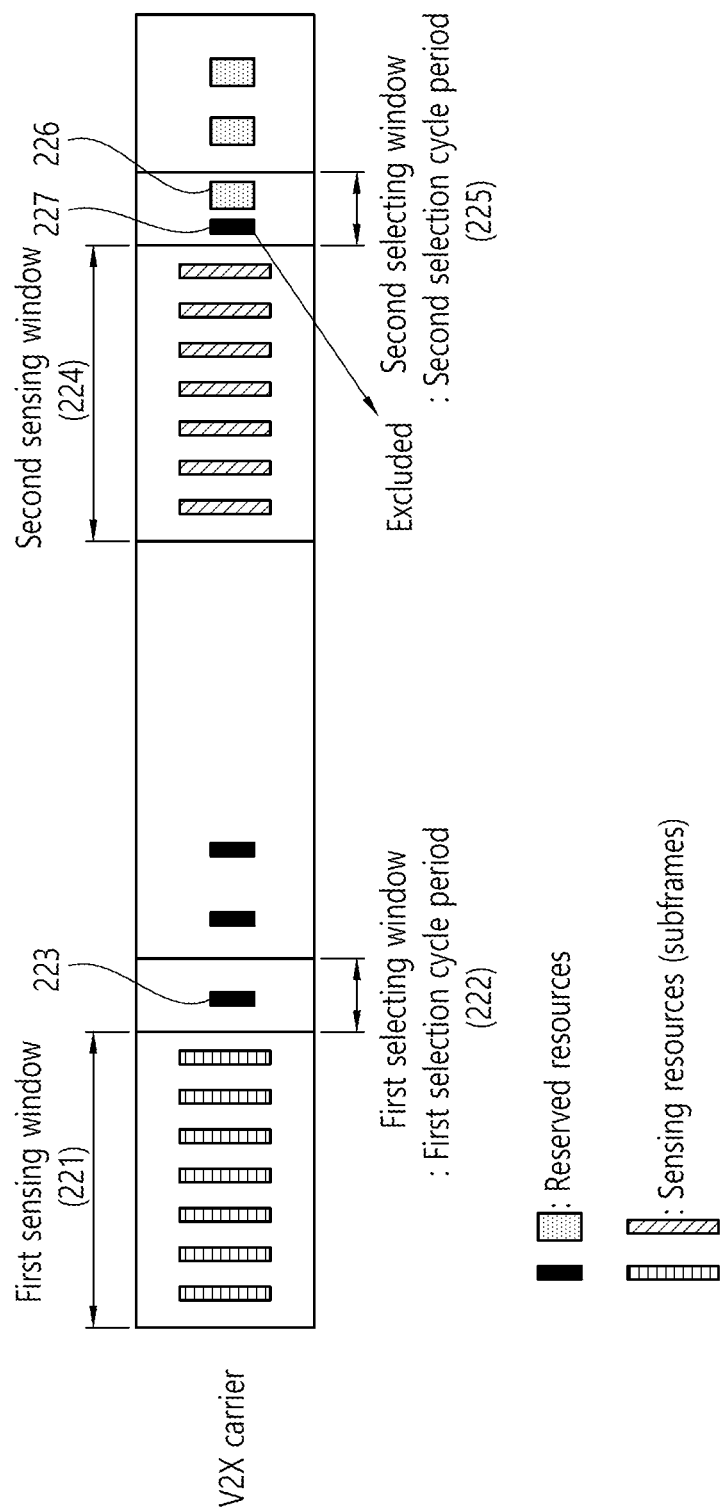
FIG. 13 shows an example of a method for selecting a V2X transmission resource according to Example #4-1.

FIG. 13 shows an example of a method for (re-)selecting (/reserving) a V2X transmission resource according to Example #4-1.

Referring to FIG. 13, at a first transmission resource (re-)selecting(/reserving) time point(/cycle period), the UE may select a first subframe (223) from a first selection window (222). Herein, the interconnected subframes that need to perform sensing when selecting the first subframe (223) are indicated as the sensing resources within a first sensing window (221).

At a first transmission resource (re-)selecting(/reserving) time point(/cycle period), the UE may select a second subframe (226) from a second selection window (225). At this point the second subframe (226) corresponds to a subframe that does not overlap with a subframe (227) having the same position(/order) as the first subframe (223) (within the selection window). More specifically, when selecting the second subframe (226), with the exception of the subframe having the same position/subframe order(/number) as the first subframe (223) within the second selection window, the second subframe (226) is selected from the remaining subframes. The interconnected subframes that are required to perform sensing in order to select the second subframe (226) may be indicates as sensing resources within the second sensing window (224).

According to the above-described method, since different resources are selected from each of the first selection window and the second selection window, the half duplex problem may be resolved.

The sensing resource that is interconnected(/linked) to the excluded subframe(/resource) (even if the sensing resource is included in the sensing gap(/resource)(/receiving gap(/resource)/partial sensing gap(/resource))) may omit the sensing operation and/or may be avoided from being included in the sensing gap (by having the P-UE #K report the related information to the base station).

Figure 14:
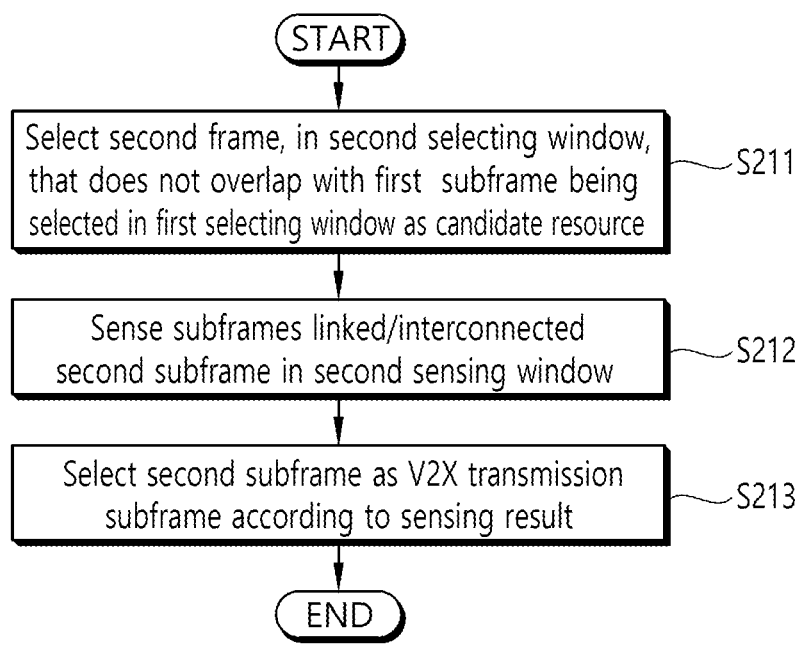
FIG. 14 shows an example of a method for selecting a V2X transmission resource according to Example #4-1.

FIG. 14 shows an example of a method for (re-)selecting (/reserving) a V2X transmission resource according to Example #4-1.

Referring to FIG. 14, the UE may select a second subframe, which does not overlap with a first subframe being selected from a first selection window, from a second selection window as a candidate resource (S211).

The UE senses the subframes being linked/interconnected to the second subframe within the second sensing window (S212).

The UE may select the second subframe as the V2X transmission subframe according to the sensing result (S213).

(Example #4-2) For example, the transmission resource (re-)selection operation may also be performed by using another method that is defined or signaled in advance, for example, a random method.

As another example, the V2X message transmission operation may also be performed by using the 'UU interface' or WAN uplink. Such operation may also be interpreted as switching between the PC5 and the UU (or WAN uplink).

(Example #4-3) If the P-UE #K has failed to receive the sensing gap(/resource) (or receiving gap(/resource) or partial sensing gap(/resource)), the P-UE #K may (re-) select (/reserve) a transmission resource by using another method (/fallback method) (e.g., random method) that is defined or signaled in advance (even if the sensing operation has already been configured). Alternatively, the V2X message transmission operation may also be performed by using the 'UU interface' (or WAN uplink).

[Proposed Method #5] If the P-UE is set to perform the sensing operation for an excessively long period of time, for example, (due to WAN DL RX chain/circuit switching) the WAN downlink receiving performance may be degraded and/or this may be disadvantageous in the aspect of battery power consumption. Alternatively, in case the P-UE is set to perform the (partial) sensing operation only for a fixed (or (semi-)static) time/frequency resource region for a short or limited period of time, for example, degradation may occur in the accuracy of energy sensing and the transmission resource collision avoidance performance. Considering the above-described details, settings may be made so that the (partial) sensing operation related parameters, e.g., a length of a section during which the (partial) sensing operation is performed (sensing duration), a (partial) sensing pattern (this indicates a format(/pattern)/cycle period/offset according to which the sensing operation is being performed, and this pattern may be provided in a bitmap format), and so on, can be processed with '(time) hopping' and/or 'randomization' according to a pre-defined rule.

The '(time) hopping (pattern)' and/or the 'randomization (pattern)' may be randomized among V2X UEs each being different from one another. For example, the '(time) hopping (pattern)' and/or the 'randomization (pattern)' may be randomized by a function that is defined in advance based on at least one of multiple input parameters, such as an ID of a transmitting UE, an ID of a receiving UE, a (cycle period) index (of a resource/pool) in which the V2X message transmission operation is being performed, a scheduling (cycle period) index (of a resource/pool), and so on.

Meanwhile, (although the UE has a reception chain/circuit,) the UE may only have a limited TX chain/circuit capability for a plurality of carriers. In this case, the UE may perform the sensing operation within interconnected sensing resources (being interconnected with resources belonging to a transmission gap) among the resources belonging to a "transmission gap (TX gap)" that is defined or signaled in advance. And, then, the UE may limitedly (re-)select its own optimal transmission resource based on the result of the sensing operation.

The transmission gap may be interpreted as a resource region wherein the V2X message transmission has a relatively higher priority level as compared to the WAN uplink transmission.

In this case, by having the V2X UE (re-)select(/reserve) resource(s) that do(es) not belong to the transmission gap for the purpose of V2X message transmission, due to an overlapping with the WAN uplink transmission (within the same carrier (or different carriers)), the problem wherein the V2X message transmission is omitted (or dropped) (and/or the transmission power is assigned at a lower priority level) may be resolved.

The P-UE #K having a limited transmission chain/circuit capacity may report transmission gap information of a format(/pattern) that is preferred by the P-UE #K (e.g., 'bitmap/cycle period/offset') to the network (through the WAN uplink).

The preferred transmission gap format(/pattern) may include a (partial) (time(/frequency)) resource region having a relatively low (energy) measurement result value (and/or 'congestion level' result value) after the P-UE #K has performed the measurement(/sensing) operation (within a time(/frequency) resource (section) that is configured(/signaled) in advance).

Alternatively, the transmission gap may be commonly applied among carriers having the V2X communication performed therein. In case the transmission gap is configured(/applied) (commonly among the carriers), when 'WAN uplink transmission' and 'V2X message transmission' are performed at the same time within different carriers, or when the 'WAN uplink transmission' and the 'V2X message transmission' partially overlap one another within the time region, since a transmission power distribution of a higher priority level is assigned to the 'WAN uplink transmission', the generated 'problem of degradation in the V2X communication performance' may be resolved.

In other words, in case the 'WAN uplink transmission' and the 'V2X message transmission' are transmitted to (partially or fully) overlap one another within different carriers, this may also be interpreted as the transmission gap assigning(/distributing) transmission power having a relatively higher priority level to the V2X message transmission as compared to the WAN uplink transmission. In case of applying the above-described rule, by assigning(/distributing) a low V2X message transmission related transmission power, the problem of performance degradation in the V2X communication (or public safety (PS) communication) may be resolved.

Alternatively, in the point of view of a V2X UE, in case the 'WAN uplink transmission' and the 'V2X message transmission' are performed at the same time within different carriers or have at least a portion of both transmissions overlap one another in the time region, if the corresponding section is configured as the transmission gap, a transmission power having a relatively higher priority level may be assigned(/distributed) to the V2X message transmission as compared to the WAN uplink transmission. Herein, a predefined or signals minimum value of the transmission power value may be ensured to the WAN uplink transmission. In case the above-described rule is applied, a limited level of the performance related to the WAN uplink communication may be ensured.

Hereinafter, a V2X UE, e.g., V-UE and/or P-UE that can (partially) perform the (scheduling assignment decoding/ energy measurement based) sensing operation will be referred to as a type #A_UE. More specifically, the type #A_UE corresponds to a UE that can perform (partial) sensing. Additionally, a V2X UE (e.g., P-UE) that cannot perform the (scheduling assignment decoding/energy measurement based) sensing operation will be referred to as a type #B_UE. More specifically, the type #B_UE corresponds to a UE that cannot perform (partial) sensing.

Meanwhile, diverse types of V2X transmission resource pools may exist.

Figures 15A, 15B:
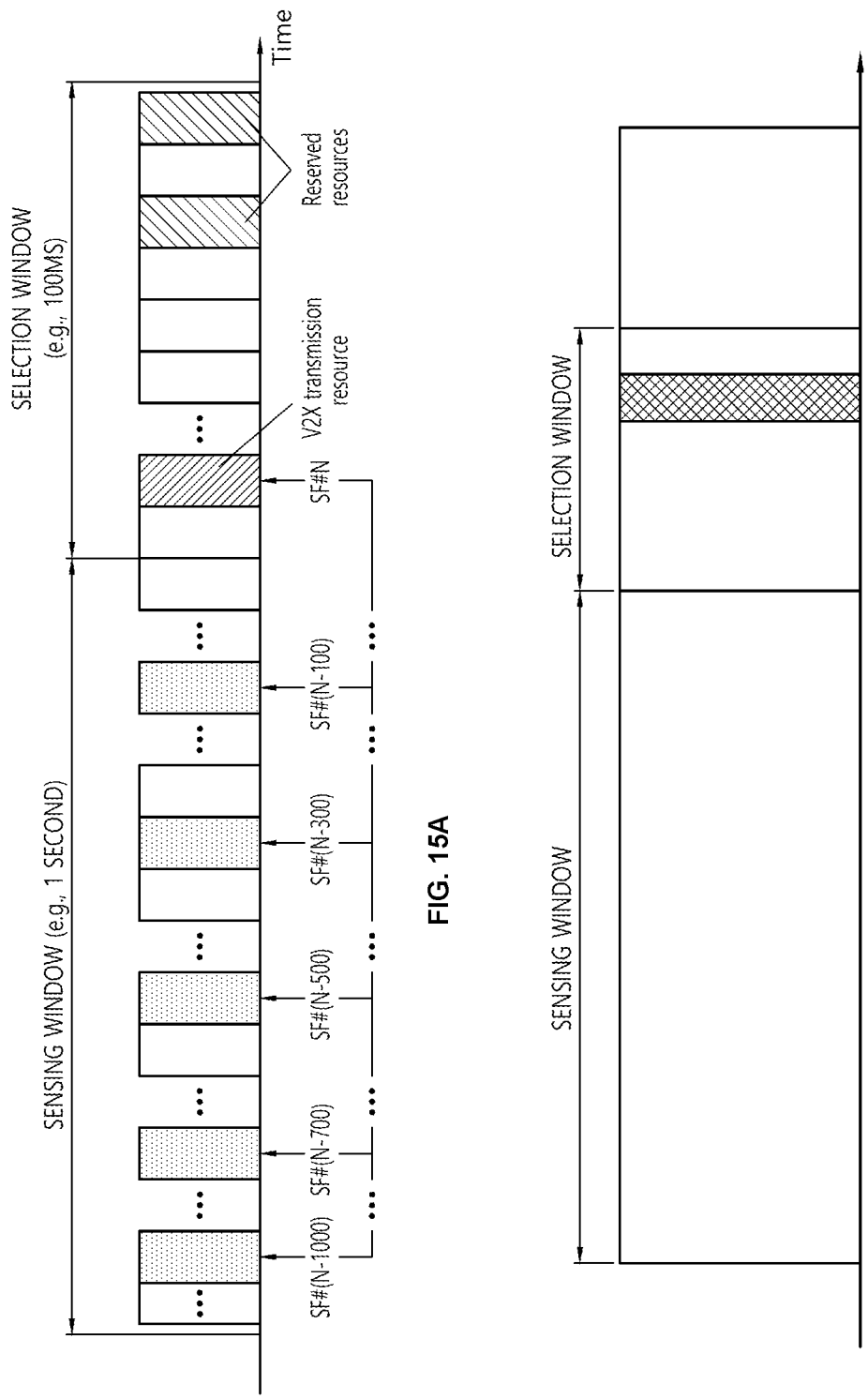
FIGS. 15A and 15B show an example of the V2X transmission resource pool types.

FIGS. 15A and 15B show an example of the V2X transmission resource pool types.

Referring to FIG. 15A, V2X transmission resource pool #A may correspond to the resource pool allowing only the (partial) sensing. In the V2X transmission resource pool #A, the UE is required to select the V2X transmission resource after performing the (partial) sensing, and, in this case, random selection may not be allowed. The V2X transmission resource that is selected by (partial) sensing is semi-persistently maintained at constant cycle period, as shown in FIG. 15A.

In order to allow the UE to perform the V2X message transmission within the V2X transmission resource pool #A, the base station may configure settings so that the (scheduling assignment decoding/energy measurement based) sensing operation can be (partially) performed. This may be interpreted that the 'random selection' of the transmission resource is not allowed within the V2X transmission resource pool #A, and that (only) the '(partial) sensing' based transmission resource selection is performed(/allowed to be performed). The settings may be made by the base station.

Referring to FIG. 15B, V2X transmission resource pool #B may correspond to the resource pool allowing only the random selection. In the V2X transmission resource pool #B, the UE does not perform the (partial) sensing and may randomly select the V2X transmission resource from the selection window. Herein, for example, unlike the resource pool that only allows the (partial) sensing, configuration(/signaling) may be performed so that the selected resource can be prevented from being semi-persistently reserved.

In order to allow the UE to perform the V2X message transmission operation within the V2X transmission resource pool #B, the base station may configure settings so that the (scheduling assignment decoding/energy measurement based) sensing operation is not performed. This may be interpreted that (only) the 'random selection' is performed (/allowed) and/or the '(partial) sensing' based transmission resource selection is not allowed within the V2X transmission resource pool #B.

Meanwhile, although it is not shown in FIGS. 15A and 15B, a resource pool capable of performing both the (partial) sensing and the random selection may exist. The base station may notify that the V2X resource may be selected by using either one of the (partial) sensing method and the random selection method (for implementing the UE) in the above-described resource pool FIG. 16 is an example of a method for selecting a V2X resource pool in a situation where multiple types of resource pools exist.

Figure 16:
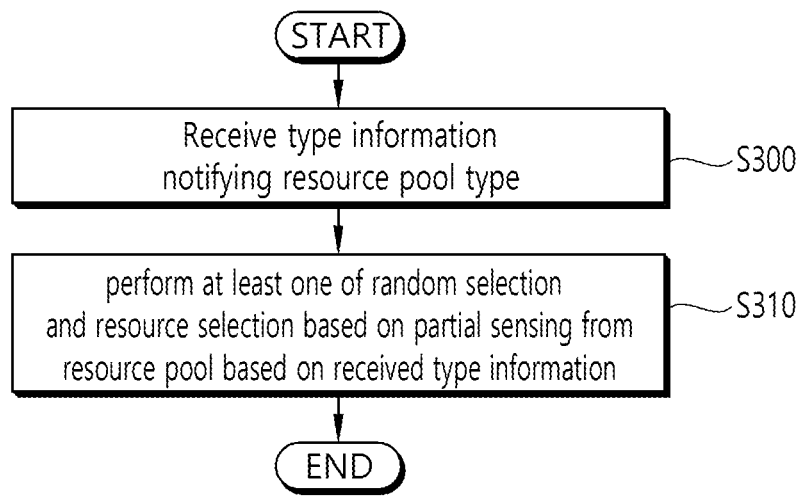
FIG. 16 is an example of a method for selecting a V2X resource pool in a situation where multiple types of resource pools exist.

Referring to FIG. 16, the UE receives type information notifying a type of the resource pool (S300).

The following table shows an example of the type information.

TABLE 5

```
-- ASN1START
SL-P2X-ResourceSelectionConfig-r14 ::=        SEQUENCE {
    partialSonsing-r14         ENUMERATED {true}        OPTIONAL,  -- Need OR
    randomSelection-r14        ENUMERATED {true}        OPTIONAL   -- Need OR
}
-- ASN1STOP
```

In the Table presented above, 'partialSensing' indicates that partial sensing is allowed in the corresponding resource pool for the UE to perform resource selection. 'randomSelection' indicates that, when the UE selects a resource in the corresponding resource pool, random selection is allowed. More specifically, by indicating by which method the UE can select a V2X transmission resource from a specific resource pool, the 'randomSelection' may indicate (or inform) the type of the specific resource pool (e.g., a resource pool that only allows partial sensing based transmission resource selection, a resource pool that only allows random selection based transmission resource selection, a resource pool that allows both partial sensing based and random selection based transmission resource selection).

The UE performs at least one of random selection and resource selection that is based on partial sensing within the resource pool based on the type information (S310).

For example, through a pre-defined signaling (of the type information), the base station may allow a type #A_UE to perform a (scheduling assignment decoding/energy measurement based) sensing operation based transmission resource assignment/scheduling, a V2X message transmission operation, and so on, within the V2X transmission resource pool #A, and the base station may allow a type #A_UE to perform transmission resource assignment/scheduling without the (scheduling assignment decoding/energy measurement based) sensing operation (or a random selection based transmission resource assignment/scheduling), a V2X message transmission operation, and so on, within the V2X transmission resource pool #B.

Even if a UE is capable of performing the (scheduling assignment decoding/energy measurement based) sensing operation, (in addition to the (scheduling assignment decoding/energy measurement based) sensing operation based transmission resource assignment/scheduling, a V2X message transmission operation, and so on (within the V2X transmission resource pool #A),) transmission resource assignment/scheduling without the (scheduling assignment decoding/energy measurement based) sensing operation, a V2X message transmission operation (e.g., the random selection method), and so on, (within the V2X transmission resource pool #B) may be allowed (by the base station through a signaling that is pre-defined in advance). Herein, for example, ((however,) if a V2X transmission resource pool that is required to perform/apply the (scheduling assignment decoding/energy measurement based) sensing operation exists among the V2X transmission resource pools,) the type #A_UE may be set (to be capable of using a V2X transmission resource pool that (absolutely or (necessarily)) required to perform/apply the (scheduling assignment decoding/energy measurement based) sensing operation and/or) to be capable of performing (scheduling assignment decoding/energy measurement based) sensing operation based transmission resource assignment/scheduling, a V2X message transmission operation, and so on (within the V2X transmission resource pool #A).

In order words, this may be interpreted that the usage of a resource (V2X transmission resource pool) designated for a V2X UE having a relatively poor sensing-related capability is limited(/prohibited) to a V2X UE having a relatively excellent sensing-related capability. And/Or, this may be interpreted that, by allowing a V2X UE having a relatively excellent sensing-related capability and a V2X UE having a relatively poor sensing-related capability to use(/share) the same V2X transmission resource pool, the degradation in the V2X communication performance of the V2X UE having a relatively excellent sensing-related capability, which is caused by a collision between transmission resources, may be prevented.

By performing the pre-defined signaling, the base station may notify the type #B_UE whether the 'random selection' operation of the transmission resource is to be performed(/allowed) only in the V2X transmission resource pool #B or whether the 'random selection' operation of the transmission resource is to be performed(/allowed) also in the V2X transmission resource pool #A.

In the V2X transmission resource pool #A, configuration (/signaling) may be performed so that, after performing the '(partial) sensing' based transmission resource selection, the selected transmission resource can be maintained(/reserved) for a predetermined period of time. And/Or, in the V2X transmission resource pool #B, configuration(/signaling) may be performed so that, after performing the transmission resource 'random selection', the selected transmission resource is not maintained(/reserved) for a predetermined period of time. And/Or, in the V2X transmission resource pool #B, configuration(/signaling) may be performed so that, after a V2X UE (e.g., P-UE only) having a '(partial) sensing' capability (and/or an RX chain/circuit capability) (and/or switching(/borrowing) an 'RX chain' being used for the WAN downlink reception performs 'random selection' of the transmission resource, the selected transmission resource can be maintained(/reserved) for a predetermined period of time.

For each V2X transmission resource pool, configuration/signaling may be performed so as to indicate that the corresponding resource pool is being shared in the transmission between which particular V2X UE type. For example, although a specific resource pool is configured(/signaled) so as to be shared between a V-UE and a P-UE, another resource pool may be configured(/signaled) so as to be used only by a V-UE (or a P-UE). And/Or, configuration/signaling may be performed so as to indicate whether the (P-UE related) resource pool, wherein the 'random selection' is allowed, partially or fully overlaps with a '(partial) sensing' based resource pool (being used by the V-UE) (e.g., in case a resource pool wherein 'random selection' is allowed and a '(partial) sensing' based resource pool (fully) overlap, the corresponding resource pool may be interpreted as a resource pool wherein 'random selection' and '(partial) sensing' based resource selection are both (or simultaneously) allowed).

Whether a random selection is allowed in a specific resource pool and/or V2X carrier or whether a sensing-based selection is allowed in the specific resource pool and/or V2X carrier may be explicitly indicated through the type information, as described above, this may also be implicitly determined by a range value of a pre-configured or pre-signaled specific parameter (hereinafter referred to as an I_value).

For example, in case configuration/signaling is made so as to prevent the parameter within a specific resource pool (and/or (V2X) carrier) from selecting(/allowing) remaining values excluding the value '0', the corresponding specific resource pool may be interpreted as a resource pool that is configured(/signaled) to be used only by the UE (e.g., P-UE) performing 'random selection' of transmission resources.

Meanwhile, the specific resource pool may be configured to be shared between the transmission of the V-UE and the P-UE, and/or configuration(/signaling) may be performed so that the (P-UE related) resource pool wherein the 'random selection' is allowed and the '(partial) sensing' based resource pool (being used by the V-UE) can partially or fully overlap with one another. In this case, settings may be made so that the (P-)UE performing the 'random selection' operation can maintain(/reserve) the transmission resource that is selected by 'random selection' within the corresponding resource pool for a predetermined period of time. Alternatively, (in case a specific resource pool is not configured to be shared between the transmission of the V-UE and the P-UE, and/or in case configuration(/signaling) is not performed so that the (P-UE related) resource pool wherein the 'random selection' is allowed and the '(partial) sensing' based resource pool (being used by the V-UE) can partially or fully overlap with one another) settings may be made so that the (P-)UE performing the 'random selection' operation does not maintain(/reserve) the 'random selection' transmission resource within the corresponding resource pool for a predetermined period of time.

Figure 17:
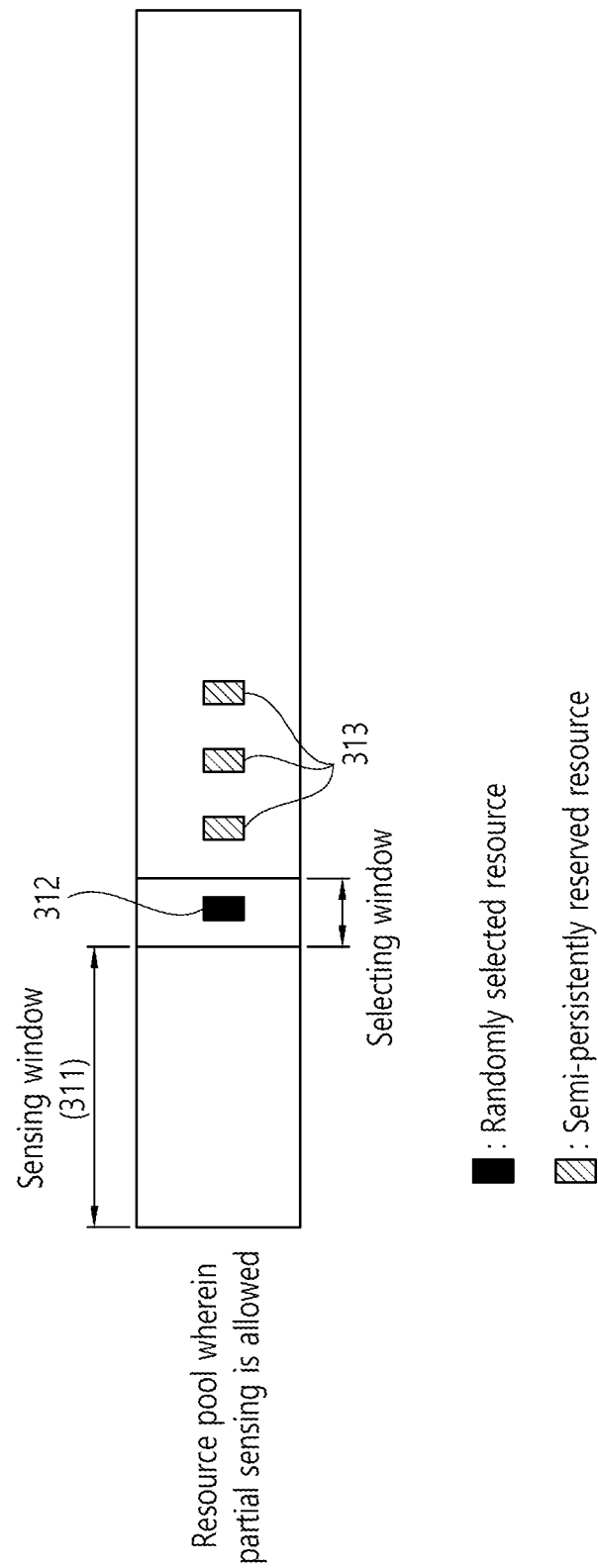
FIG. 17 shows an exemplary operation of a UE that has selected a resource by using the random selection method within a resource pool wherein the (partial) sensing is allowed.

FIG. 17 shows an exemplary operation of a UE that has selected a resource by using the random selection method within a resource pool wherein the (partial) sensing is allowed.

For diverse reasons, the UE may select a V2X transmission resource (312) from the resource pool, wherein the (partial) sensing is allowed, through random selection. For example, in case the resource pool wherein the (partial) sensing is allowed overlaps with the resource pool wherein random selection is allowed (and/or in case both random selection and (partial) sensing are both allowed within a specific resource pool), the UE may select the V2X transmission resource by performing random selection from the resource pool wherein the (partial) sensing is allowed.

In this case, the UE may semi-persistently reserve resources (313) having the same frequency as the V2X transmission resource (312). More specifically, the randomly selected resources are repeatedly reserved at a predetermined cycle period throughout a specific section. Although the UE has actually selected the resource by using the random selection method, in case the resource pool from which the resource is selected overlaps with the resource pool wherein (partial) sensing is allowed (and/or in case the resource pool from which the resource is selected allows both random selection and (partial) sensing)), it may be interpreted that the UE performs similar operations as a UE (performing (partial) sensing operation) in a resource pool, wherein (partial) sensing is allowed.

Meanwhile, a same rule(/method) as the type #A_UE (or type #B_UE) may be applied to a V2X UE (e.g., P-UE) (limited(/partial) sensing_UE) that can perform a (scheduling assignment decoding/energy measurement based) sensing operation only within a pre-configured(/signaled) limited time(/frequency) resource section(/region).

Alternatively, in order to allow the type #A_UE to perform the V2X message transmission operation within the V2X transmission resource pool, the type #A_UE may be configured not to perform (or to perform) the (scheduling assignment decoding/energy measurement based) sensing operation.

For example, it is difficult for P-UE(s) corresponding to (A) a 'limited sensing_UE' format and/or (B) a 'type #B_UE' format and/or (C) a 'limited RX chain/circuit' (or 'no RX chain/circuit') format (e.g., in case a 'dedicated RX chain/circuit' does not exist (or in case only the 'TX chain/circuit' exists) within V2X carrier #Y in which the V2X communication is being performed) to determine (efficiently or within a short period of time) whether other V2X UE(s) (e.g., 'V-UE(s)') located in the surrounding areas of the P-UE(s) (or being adjacent to the P-UE(s)) perform(s) an 'ITS (sidelink) service (related V2X message TX operation)' and/or 'public safety (PS) service (related V2X message TX operation)', and so on.

Therefore, by applying (part of) the following methods, the above-described problems may be resolved(/relieved).

For example, (part of) the following methods may also be (extendedly) used in order to allow the efficiently P-UE(s) of the above-described '(limited) capability(/chain/circuit)' (e.g., a 'limited sensing_UE' format, a 'type #B_UE' format, a 'limited RX chain/circuit' format (or a 'no RX chain/circuit' format or a format having only a 'TX chain/circuit')) to determine(/detect) whether the 'other communication' (e.g., 'DSRC/IEEE 802.11p service', '(other numerology based) NR eV2X service') exists within a proximate distance within the same channel(/band/carrier) (where the V2X communication is performed).

Herein, for example, the P-UE(s), which has/have determined the presence of the 'other communication' (within a proximate distance within the same channel(/band/carrier) (where the V2X communication is performed)), efficiently co-exist(s) according to (part of) a rule that is described in the above-described 'proposed co-existence method' (most particularly, details are described in the <method allowing the 'V2X communication' and the 'other communication' to co-exist>).

Hereinafter, referring to the drawings, a method of determining (or detecting) that another communication is being performed within a Vehicle to X (V2X) carrier, deciding a V2X message transmission resource based on the detected result, and transmitting the V2X message within the transmission resource, which is performed by a P-UE, i.e., (A) a UE having insufficient (or limited) sensing capability (e.g., the above-described 'limited sensing_UE'), or (B) a UE having no sensing capability (e.g., the above-described 'type #B_UE'), or (C) a UE having a limited RX chain/circuit, since a 'dedicated RX chain/circuit' does not exist within a V2X carrier #Y, wherein the V2X communication is being performed (e.g., the above-described 'limited RX chain/circuit'), will be described in more detail with reference to the accompanying drawing.

Figure 18:
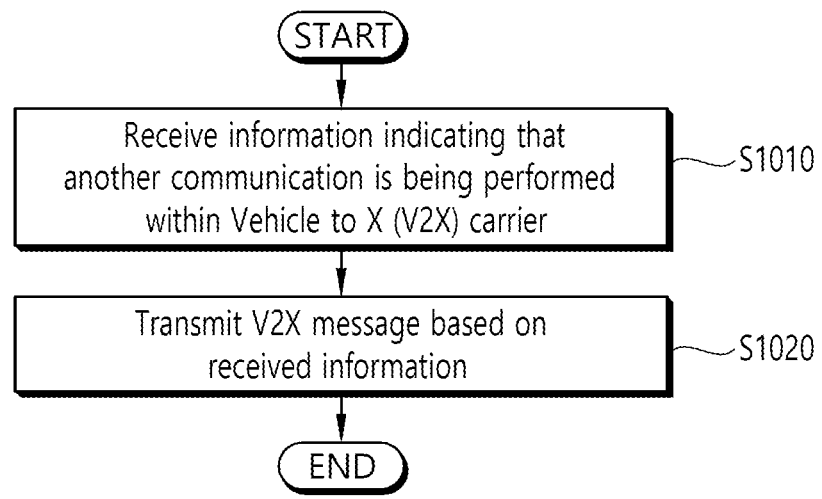
FIG. 18 is a flow chart showing a method for transmitting a V2X message performed by a UE having a limited reception capability according to an exemplary embodiment of the present invention.

FIG. 18 is a flow chart showing a method for transmitting a V2X message performed by a UE having a limited reception capability according to an exemplary embodiment of the present invention.

According to FIG. 18, the UE may receive information indicating that another communication is being performed (/detected) within a Vehicle to X (V2X) carrier (S1010). At this point, the UE having a limited capability of detecting the performance of another communication may correspond to a UE having a limited sensing capability, a UE having no sensing capability, or a UE having no V2X resource dedicated reception chain, and, as described above, the UE may correspond to a P-UE.

Herein, when receiving the information indicating that another communication is being performed(/detected) within a Vehicle to X (V2X) carrier, the UE may (A) receive the corresponding information from other V2X UEs, or (B) receive the corresponding information from the base station. At this point, the information indicating that another communication is being performed(/detected) within the V2X resource may correspond to information indicating a type of sidelink service that is being performed within the V2X resource. Additionally, the information indicating that another communication is being performed(/detected) within the V2X resource may correspond to information indicating whether or not the service being performed within the V2X resource corresponds to a public safety (PB) service. At this point, the information indicating that another communication is being performed(/detected) within the V2X resource may correspond to information indicating whether or not a communication that is based on a radio access technology (RAT) other than the RAT of the V2X communication is being performed within the V2X resource.

More specifically,

[Proposed Method #6] (A) Other V2X UE(s) (e.g., 'V-UE(s)') and/or (B) a (serving) base station (being located near the P-UE(s) or (being adjacent to the P-UE(s)) may be configured to notify information, such as an 'ITS service type(/content)' (currently) being operated (or detected) and/or 'whether or not the service correspond to a PS (or non-PS) service' (and/or 'whether or not another communication (e.g., 'DSRC/IEEE 802.11p service', '(other numerology based) NR eV2X service') exists'), and so on, (to the P-UE(s)) (through a pre-configured(/signaled) channel).

Herein, for example, such rule may be useful for a case where the P-UE(s) has/have difficulty in determining the corresponding information by using a '(sidelink) synchronization signal (SLSS)' (e.g., a case where an 'ITS service type(/content)' and/or 'information related to whether or not the service corresponds to a PS (or non-PS) service' is/are mapped to an 'SLSS sequence(/ID)' (and/or a case where different 'SLSS sequences(/IDs)' are used for each service (/communication)) (and/or a 'PSBCH' (e.g., a case where such information is signaled through a specific (reserved) field within the 'PSBCH') and/or in a case where a 'sidelink (dedicated) RX chain/circuit' does not exist. Herein, for example, the 'SLSS' wording may also be interpreted as 'PSSS' (or 'SSSS').

[Proposed Method #7] For example, in case the 'service type(/content) (information)' (e.g., information on the 'ITS service type' and/or information on 'whether or not the service corresponds to a PS (or non-PS) service', and so on) is mapped to the 'SLSS sequence(/ID)' (and/or in case different 'SLSS sequences(/IDs)' are used for each service (/communication)), (A) Other V2X UE(s) (e.g., 'V-UE(s)') and/or (B) a (serving) base station (being located near the P-UE(s) or (being adjacent to the P-UE(s)) may be configured to notify information on the detected 'SLSS sequence (/ID)' (to the P-UE(s)) (through a pre-configured(/signaled) channel).

Thereafter, based on the above-described information, the UE transmits a V2X message (S1020). Herein, the transmission of the V2X message by the UE based on the above-described information may include determining (or deciding) a V2X message transmission resource based on the above-described information and transmitting the V2X message within the determined (or decided) transmission resource. Herein, in case another communication is performed within the V2X resource, this may indicate that the V2X UE switches the transmission resource of the V2X message to a V2X resource other than the above-mentioned V2X resource, and that the UE transmits the V2X message within the switched other V2X resource. The UE may transmit the V2X message during a predetermined period of time within the switched other V2X resource, and the switched V2X resource may correspond to a subframe excluding the subframe that was used by the UE in a previous transmission block.

More specifically,

For example, (in case the [Proposed Method #7] (and/or the [Proposed Method #6]) is applied,) the P-UE(s) may be configured to 'wake-up' only within pre-configured(/signaled) 'sidelink synchronization(/PSBCH) resource(s)', so as to perform a 'SLSS (sequence(/ID))(/PSBCH)' detection attempt (and/or to perform a 'sensing' operation (for detecting(/determining) the 'other communication') only during (part of) a pre-configured(/signaled) (time(/frequency) resource) section (e.g., this may be interpreted as a type of 'partial sensing' operation) (and/or to perform a 'sensing' operation (for detecting(/determining) the 'other communication') within a (time(/frequency)) resource (region(/section)) before(/immediately preceding) the resource selected (/reserved) by the corresponding P-UE(s) for the purpose of V2X message TX (or the transmission operation (time point) of the corresponding P-UE(s)) (or before a (time(/timing)) offset value that is configured(/signaled) in advance from the resource selected(/reserved) by the corresponding P-UE(s) for the purpose of V2X message TX (or the transmission operation (time point) of the corresponding P-UE(s))) and/or to determine information on an 'ITS service type(/content)' (currently) being operated (or detected) and/or 'whether or not the service correspond to a PS (or non-PS) service' and/or 'whether or not another communication (e.g., 'DSRC/IEEE 802.11p service', '(other numerology based) NR eV2X service') exists').

Herein, for example, in case the 'other communication' is detected, (A) a rule may be defined so that the P-UE(s) can suspend the 'V2X communication' (and/or 'V2X message TX operation') within the initial (or currently used) pool(/carrier/channel/band) and/or (B) a rule may be defined so that the P-UE(s) can change a pool(/carrier/channel/band), in which the 'V2X communication' (and/or the 'V2X message TX operation') is performed, according to a pre-defined (/signaled) rule(/(priority) level) and perform the 'V2X communication' (and/or the 'V2X message TX operation') (during a predetermined period of time that is configured(/signaled) in advance) within the (corresponding changed) other pool(/carrier/channel/band).

As yet another example, (in case the [Proposed Method #7] (and/or the [Proposed Method #6]) is applied,) when other V2X UE(s) (e.g., 'V-UE(s)') being located near the P-UE(s) or (being adjacent to the P-UE(s)) transmit(s) (/report(s)) the determined (or detected) information on an 'ITS service type(/content)' (currently) being operated (or detected) and/or 'whether or not the service correspond to a PS (or non-PS) service' and/or 'whether or not another communication (e.g., 'DSRC/IEEE 802.11p service', '(other numerology based) NR eV2X service') exists' to the (serving) base station, the corresponding other V2X UE(s) may be configured to report(/transmit) 'its/their position information' (and/or 'position information that has determined the corresponding information') (and/or '(in case a position-based resource pool (TDM(/FDM)) division operation is configured(/signaled)) 'resource pool(/carrier/channel/band) (index) information in which the 'other communication' (and/or 'ITS service' and/or 'PS(/non-PS) service') is detected') along with (or in addition to) the above-mentioned information.

Herein, for example, the (serving) base station that has received such information may notify the corresponding information to the P-UE(s) (existing within the (reported) adjacent (or identical) position(/region)) (through a pre-defined signal (e.g., (WAN) DL(/PDSCH)). Herein, for example, the (serving) base station that has received the information (from the V-UE(s)) may direct the P-UE(s) existing within the (adjacent or identical) position(/region) (and/or pool(/carrier/channel/band)), wherein the 'other communication' is detected, to perform 'activation/deactivation' of the (related) resource pool and/or to suspend the 'V2X communication' (and/or the 'V2X message TX operation') and/or to perform switching to another carrier(/channel/band/pool) that is configured(/signaled) in advance (according to a pre-configured(/signaled) rule(/(priority) level).

Herein, as another example, the P-UE(s) that has/have received the corresponding information (from the (serving) base station) may consider(/compare) its/their (current) position (and/or the pool(/carrier/channel/band) in which its/they is/are (currently) performing the V2X message TX operation), and may then decide(/determine) whether to maintain(/suspend) the V2X message TX operation within the current pool(/carrier/channel/band) and/or whether or not to perform switching to another carrier(/channel/band/pool) that is configured(/signaled) in advance (according to a pre-configured(/signaled) rule(//(priority) level) and to perform the 'V2X communication' (and/or the 'V2X message TX operation') within the (corresponding changed (or switched)) other resource(/channel/band) (during a pre-configured(/signaled) period of time). Herein, for example, in case the above-described rule is applied, the P-UE(s) is/are not required to (directly) perform the 'SLSS (sequence(/ID)) (/PSBCH)' detection attempt. Herein, for example, the 'SLSS' wording may also be interpreted as 'PSSS' (or 'SSSS').

As yet another example, when the above-described P-UE(s) of the '(limited) capability(/chain/circuit)' format (e.g., the 'limited sensing_UE' format, the 'type #B_UE' format, the 'limited RX chain/circuit' format (or the 'no RX chain/circuit' format or the format only having the 'TX chain/circuit') perform(s) the 'partial sensing' operation (during a (time(/frequency) resource) section that is configured(/signaled) in advance) for the purpose of detecting(/determining) the 'other communication' (e.g., 'DSRC/IEEE 802.11p service', '(other numerology based) NR eV2X service') in order to reduce the (average) 'partial sensing' time (that is required to be performed until the 'other communication' is effectively(/successfully) detected) (or in order to increase the possibility of detecting the 'other communication' when performing the 'partial sensing' operation) settings may be made so that the other (adjacent) V2X UE(s) (e.g., 'V-UE(s)') (and/or (serving) base station (/RSU)) can omit the (V2X communication related) channel/signal transmission operation (this may be interpreted as a type of 'silencing period') during a (pre-configured(/signaled)) 'partial sensing' (time(/frequency) resource) section.

As yet another example, P-UE(s) (having a limited reception(/transmission) capability) may be configured(/signaled) with different 'conditions for (performing) SLSS transmission(/reception(/monitoring))' depending upon (A) which type (e.g., 'partial sensing', 'full sensing') of sensing is being performed and/or (B) whether or not random selection (of the transmission resource) is performed (without performing the sensing operation).

As yet another example, in case of the P-UE(s) (having a limited reception(/transmission) capability), (part of) the following parameters may be differently (or independently) configured(/signaled) as compared to the V-UE(s).

(Example #1) When performing transmission resource (re-)reservation(/selection), a limited number of subframes (of a resource reservation (interval) cycle period) being assumed(/used) (and/or a Cresei value (e.g., "[10*SL_resource_reselection_counted]") in Section 2.1. of Table 2 of the proposed co-existence method (in the document according to the present invention)

(Example #2) V2X message priority level (for example, the V2X message may be configured(/signaled) to a relatively low (or high) priority level) and/or a "PSSCH-RSRP MEASUREMENT" threshold value in STEP 5 of Section 2.3 in Table 2 of the proposed co-existence method (in the document according to the present invention) (and/or a "0.2*$M_{total}$", which is related coefficient(/ratio) value in STEP 6(/8) of Section 2.3 in Table 2 of the proposed co-existence method (in the document according to the present invention) (for example, this may be interpreted as a ratio value drawing(/determining) a minimum number of (candidate) resources that should be remaining (within set SA) (among the entire (candidate) resources) after performing STEP 5 of Section 2.3 in Table 2 of the proposed co-existence method (in the document according to the present invention) and/or a ratio value drawing(/determining) a (minimum) number of (candidate) resources that should exist within set SB after performing STEP 8 of Section 2.3 in Table 2 of the proposed co-existence method (in the document according to the present invention)) may be configured(/signaled) a different (or independent) values, and/or an increasing value of "PSSCH-RSRP MEASUREMENT" (e.g., "3DB") being applied to a case where the minimum number of (candidate) resources that should remain within set SA (among the entire (candidate) resources) after performing STEP 5 of Section 2.3 in Table 2 of the proposed co-existence method (in the document according to the present invention), and/or a cycle period value being used in a sensing operation (e.g., STEP 5 of Section 2.3 in Table 2 of the proposed co-existence method (in the document according to the present invention)) (and/or an energy measurement operation (e.g., STEP 7/8 of Section 2.3 in Table 2 of the proposed co-existence method (in the document according to the present invention)). Herein, for example, (i.e.,) the above-described example may be applied to the operation in which the network signals the (partial) sensing pattern of the P-UE.

(Example #3) I_VALUE (range) value and/or P_STEP value that can be selected(/allowed) within a V2X resource pool (and/or (V2X) carrier).

(Example #4) Transmission power related (open-loop) parameter(/value) (e.g., "Po", "ALPHA", and so on) and/or V2X resource pool(/carrier).

As another example, as shown below in Table 6, a 'V2X message transmission operation' (and/or '(transmission) resource selection(/reservation) operation') of the P-UE(s) (having a limited reception (RX)(/transmission (TX)) capability) may be efficiently supported.

TABLE 6

4. Example of efficiently supporting a 'V2X message) transmission operation' (and/or '(transmission) resource selection(heservation) operation') of the P-UE(s) (having a limited reception (RX)(/transmission (TX)) capability)
4.1. Prerequisites for a random resource selection corresponding to P-UE
According to the present invention, the P-UEs including all P-UEs having no sidelink Rx capability may support all possibilities for being capable of using random selection.
In case a P-UE uses random selection, only the pool, wherein the random selection performed by the P-UE is allowed, may be used for the random selection.
Whether or not the pool, wherein the random selection performed by the P-UE is allowed, is allowed to overlap with another pool may depend upon the network configuration.
A possibility of configuring pools, wherein the random selection performed by the P-UE is not allowed, may be supported.
According to the present invention, the possibility of the P-UE being capable of using partial sensing in a sub-set of a subframe is supported.

TABLE 6-continued

The partial sensing of the P-UE may be based on a V2V sensing based
resource selection. At this point, the resource selection of the P-UE according to
the partial sensing may be similar to the V2V sensing based resource selection.
In case of a P-UE having a sidelink Rx function, it may be considered
whether or not the partial sensing support is necessary (or mandatory).
4.2. Method for supporting random resource selection in a V2P
The current sidelink transmission mode 4 is based on sensing and resource
reservation (i.e., using the same time/frequency resource for a number of
transmission block (TB) transmissions). Since the random resource selection of
the P-UE will skip the sensing procedure, whether or not the randomly selected
resource will be maintained for a specific period of time may have to be
considered. Applying a reservation operation to the random resource selection
may have the following advantages and disadvantages as described below.
Advantages: Even though the P-UE does not perform sensing, a resource
that is reserved by the P-UE may be monitored by the V-UE, and collision may be
avoided during the resource selection of the V-UE.
Disadvantages: Firstly, in case the P-UE selects a non-preferable resource
(e.g., resource being used by another adjacent UE or resource experiencing
intense in-band emission interference from another UE transmission), as
degradation in the performance is prolonged, this may lead to consecutive failures
in message delivery.
The advantage and disadvantage of applying resource reservation to the
random selection may depend upon whether or not the P-UE transmission and the
V-UE transmission share the same pool.
In case the resource pool, wherein the random selection is allowed, does not
overlap with the resource pool that is used for the V-UE transmission, since there
is no UE benefiting from the operation of resource reservation, there may be no
advantage in applying resource reservation.
Accordingly, random selection having no resource reservation should be
supported in the present invention. This indicates that whether or not the random
selection through the resource reservation is required to be additionally supported
should be considered.
Proposal 1: At least a random selection having no resource reservation may
be supported in the present invention. This indicates that whether or not the
random selection through the resource reservation is required to be additionally
supported should be considered.
Additionally, in the random resource selection procedure, how the resource
re-selection is performed should also be considered. In order to avoid consistently
selecting inappropriate resources, when the P-UE re-selects a resource, changing
the resource (i.e., avoiding re-selection of the resource that has already been
selected and selecting other resources) is needed. More specifically, the P-UE
may exclude the subframe that has already been used in a previous transmission
block (TB) transmission. And, accordingly, the influence of the in-band emission
may be randomized by the TB transmission.
Proposal 2: The P-UE may exclude the subframe that has already been used
in a previous transmission block (TB) transmission. And, accordingly, the
influence of the in-band emission may be randomized by the TB transmission.
The transmission capability of the P-UE may also be considered. Since the
P-UE may transmit one message per second, the usage rate of a transmission
chain in a PC5 carrier for V2P may be equal to 0.2%. Therefore, in case all P-UEs
are required to be equipped with a V2P transmission dedicated transmission
chain, the device implementation cost may increase unnecessarily. Being similar
to the 3gpp Rel-12/13 D2D, by using a ProSe gap for the P-UE transmission, a
chain being used for the UL transmission may be temporarily borrowed.
Proposal 3: The P-UE may temporarily perform switching of the
transmission chain being used for the UL transmission with an SL transmission
chain for V2P.
4.3. Conclusion
The above-described proposals may be summarized as described below.
Proposal 1: At least a random selection having no resource reservation may
be supported in the present invention. This indicates that whether or not the
random selection through the resource reservation is required to be additionally
supported should be considered.
Proposal 2: The P-UE may exclude the subframe that has already been used
in a previous transmission block (TB) transmission. And, accordingly, the
influence of the in-band emission may be randomized by the TB transmission.
Proposal 3: The P-UE may temporarily perform switching of the
transmission chain being used for the UL transmission with an SL transmission
chain for V2P.

Hereinafter, in order to facilitate the understanding, the above-described exemplary embodiment will be described below with reference to the flow chart. Hereinafter, for simplicity in the description, details of the following drawing that overlap with the details described above will be omitted. In other words, the above-described exemplary embodiments may also be applied to the exemplary embodiments that will hereinafter be described.

Figure 19:
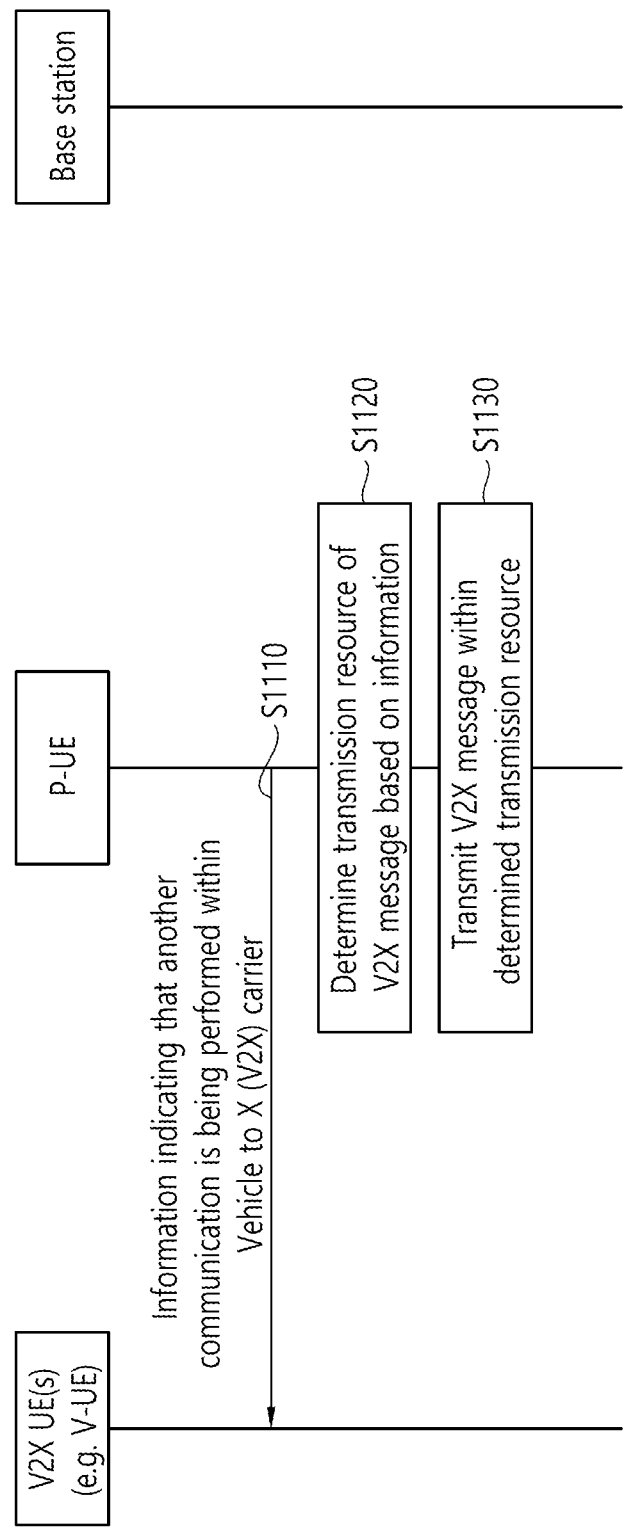
FIG. 19 is a flow chart showing a method for transmitting a V2X message performed by a UE having a limited reception capability according to another exemplary embodiment of the present invention.

FIG. 19 is a flow chart showing a method for transmitting a V2X message performed by a UE having a limited reception capability according to another exemplary embodiment of the present invention.

According to FIG. 19, the UE may receive information indicating that another communication is being performed (/detected) within a Vehicle to X (V2X) carrier from another V2X UE (S1110). At this point, as described above, the other V2X UE may correspond to a V-UE.

For example, as described above, the step of receiving information indicating that another communication is being performed(/detected) within a Vehicle to X (V2X) carrier may indicate that, as described above, an 'ITS service type(/content)' (currently) being operated (or detected) and/or 'whether or not the service correspond to a PS (or non-PS) service' (and/or 'whether or not another communication (e.g., 'DSRC/IEEE 802.11p service', '(other numerology based) NR eV2X service') exists'), and so on, is/are notified (to the P-UE(s)) (through a pre-configured(/signaled) channel). Since a detailed description of this example has already been presented above, a detailed description of the same will be omitted for simplicity.

Thereafter, based on the above-described information, the UE may determine a transmission resource of a V2X message (S1120).

Herein, for example, based on the above-described information, in case the 'other communication' is detected, (A) a rule may be defined so that the P-UE(s) can suspend the 'V2X communication' (and/or 'V2X message TX operation') within the initial (or currently used) pool(/carrier/channel/band) and/or (B) a rule may be defined so that the P-UE(s) can change a pool(/carrier/channel/band), in which the 'V2X communication' (and/or the 'V2X message TX operation') is performed, according to a pre-defined(/signaled) rule(/(priority) level) and perform the 'V2X communication' (and/or the 'V2X message TX operation') (during a predetermined period of time that is configured(/signaled) in advance) within the (corresponding changed) other pool (/carrier/channel/band). Since a detailed description of this example has already been presented above, a detailed description of the same will be omitted for simplicity.

Additionally, for example, in case of the above-described P-UE(s) (having a limited reception(/transmission) capability), (part of) the parameters may be differently (or independently) configured(/signaled) as compared to the V-UE(s). Since a detailed description of this example has already been presented above, a detailed description of the same will be omitted for simplicity.

Additionally, for example, a 'V2X message transmission operation' (and/or '(transmission) resource selection(/reservation) operation') of the P-UE(s) (having a limited reception (RX)(/transmission (TX)) capability) may be efficiently supported. Since a detailed description of this example has already been presented above, a detailed description of the same will be omitted for simplicity.

Thereafter, within the determined transmission resource, the UE may transmit the V2X message (S1130). The example of the UE transmitting the V2X message within the determined transmission resource has already been described above in detail.

Figure 20:
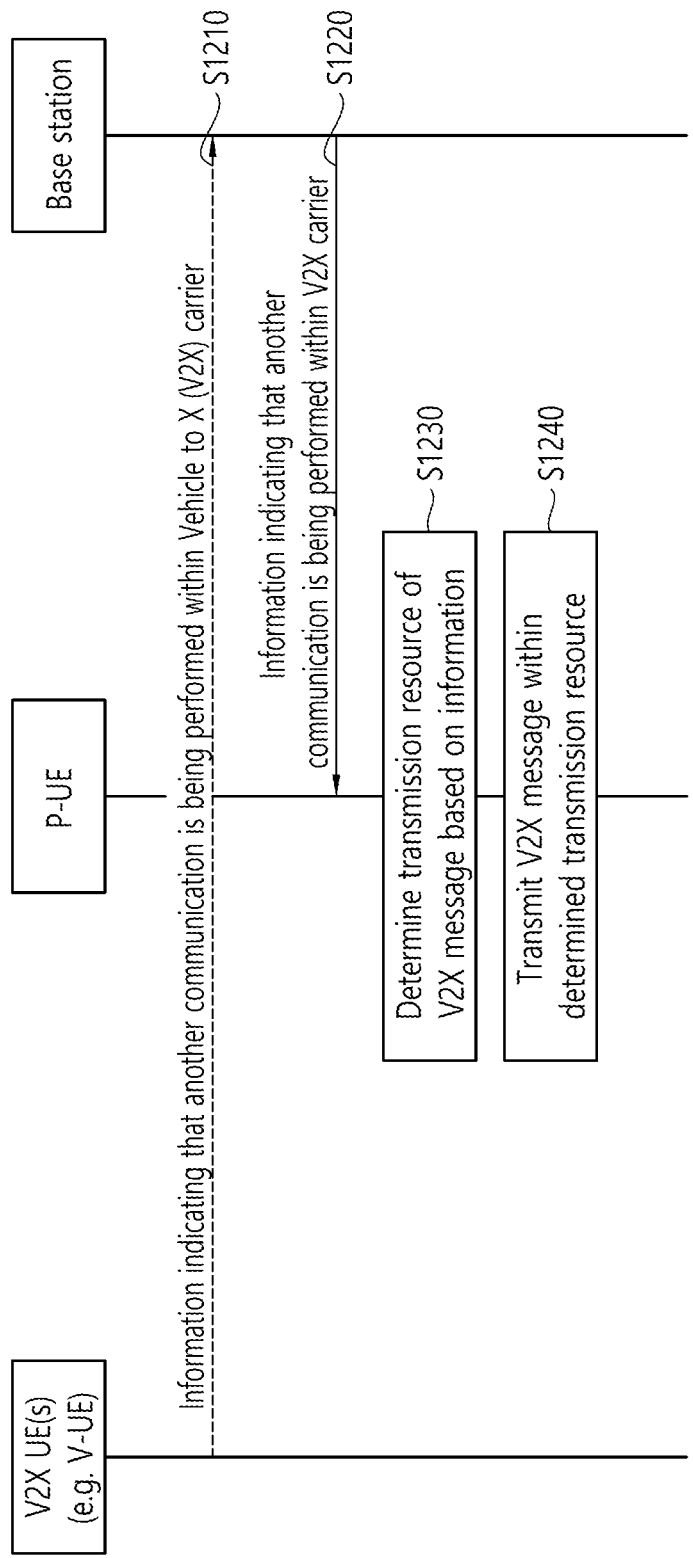
FIG. 20 is a flow chart showing a method for transmitting a V2X message performed by a UE having a limited reception capability according to yet another exemplary embodiment of the present invention.

FIG. 20 is a flow chart showing a method for transmitting a V2X message performed by a UE having a limited reception capability according to yet another exemplary embodiment of the present invention.

According to FIG. 20, the base station may receive information indicating that another communication is being performed(/detected) within a Vehicle to X (V2X) carrier from a V2X UE (other than a P-UE) (S1210). At this point, as described above, the other V2X UE may correspond to a V-UE.

For example, as described above, the step of receiving information indicating that another communication is being performed(/detected) within a Vehicle to X (V2X) carrier may indicate that, as described above, an 'ITS service type(/content)' (currently) being operated (or detected) and/or 'whether or not the service correspond to a PS (or non-PS) service' (and/or 'whether or not another communication (e.g., 'DSRC/IEEE 802.11p service', '(other numerology based) NR eV2X service') exists'), and so on, is/are notified (to the P-UE(s)) (through a pre-configured(/signaled) channel). Since a detailed description of this example has already been presented above, a detailed description of the same will be omitted for simplicity.

Additionally, for example, when other V2X UE(s) (e.g., 'V-UE(s)') being located near the P-UE(s) or (being adjacent to the P-UE(s)) transmit(s)(/report(s)) the determined (or detected) information on an 'ITS service type(/content)' (currently) being operated (or detected) and/or 'whether or not the service correspond to a PS (or non-PS) service' and/or 'whether or not another communication (e.g., 'DSRC/IEEE 802.11p service', '(other numerology based) NR eV2X service') exists' to the (serving) base station, the corresponding other V2X UE(s) may be configured to report (/transmit) 'its/their position information' (and/or 'position information that has determined the corresponding information') (and/or '(in case a position-based resource pool (TDM (/FDM)) division operation is configured(/signaled)) 'resource pool(/carrier/channel/band) (index) information in which the 'other communication' (and/or 'ITS service' and/or 'PS(/non-PS) service') is detected') along with (or in addition to) the above-mentioned information. Since a detailed description of this example has already been presented above, a detailed description of the same will be omitted for simplicity.

The UE (a UE other than the other V2X UE, e.g., P-UE) may receive information indicating that another communication is being performed(/detected) within a Vehicle to X (V2X) carrier from the base station (S1220). More specifically, the UE may receive the information indicating that another communication is being performed(/detected) within the Vehicle to X (V2X) carrier, which is transmitted by the other V2X UE and, then, forwarded by the base station. Alternatively, the UE may receive the information indicating that another communication is being performed (/detected) within the Vehicle to X (V2X) carrier, which is generated by the base station.

For example, as described above, the step of receiving information indicating that another communication is being performed(/detected) within a Vehicle to X (V2X) carrier may indicate that, as described above, an 'ITS service type(/content)' (currently) being operated (or detected) and/or 'whether or not the service correspond to a PS (or non-PS) service' (and/or 'whether or not another communication (e.g., 'DSRC/IEEE 802.11p service', '(other numerology based) NR eV2X service') exists'), and so on, is/are notified (to the P-UE(s)) (through a pre-configured(/signaled) channel). Since a detailed description of this example has already been presented above, a detailed description of the same will be omitted for simplicity.

Thereafter, based on the above-described information, the UE may determine a transmission resource of a V2X message (S1230).

Herein, for example, based on the above-described information, in case the 'other communication' is detected, (A) a rule may be defined so that the P-UE(s) can suspend the 'V2X communication' (and/or 'V2X message TX operation') within the initial (or currently used) pool(/carrier/channel/band) and/or (B) a rule may be defined so that the P-UE(s) can change a pool(/carrier/channel/band), in which the 'V2X communication' (and/or the 'V2X message TX operation') is performed, according to a pre-defined(/signaled) rule(/(priority) level) and perform the 'V2X communication' (and/or the 'V2X message TX operation') (during a predetermined period of time that is configured(/signaled) in advance) within the (corresponding changed) other pool (/carrier/channel/band). Since a detailed description of this example has already been presented above, a detailed description of the same will be omitted for simplicity.

Additionally, for example, in case of the above-described P-UE(s) (having a limited reception(/transmission) capability), (part of) the parameters may be differently (or independently) configured(/signaled) as compared to the V-UE(s). Since a detailed description of this example has already been presented above, a detailed description of the same will be omitted for simplicity.

Additionally, for example, a 'V2X message transmission operation' (and/or '(transmission) resource selection(/reservation) operation') of the P-UE(s) (having a limited reception (RX)(/transmission (TX)) capability) may be efficiently supported. Since a detailed description of this example has already been presented above, a detailed description of the same will be omitted for simplicity.

Thereafter, within the determined transmission resource, the UE may transmit the V2X message (S1240). The example of the UE transmitting the V2X message within the determined transmission resource has already been described above in detail.

In case of a PS service related V2X transmission performed by a V2X UE (moving at a relatively fast speed), the WAN transmission operation may not always be prioritized over the V2X transmission operation.

Accordingly, in the present invention, in case the WAN transmission operation overlaps with the V2X transmission operation in the time domain, how the V2X transmission operation will be performed by using which method will hereinafter be described in detail with reference to the corresponding drawings.

Figure 21:
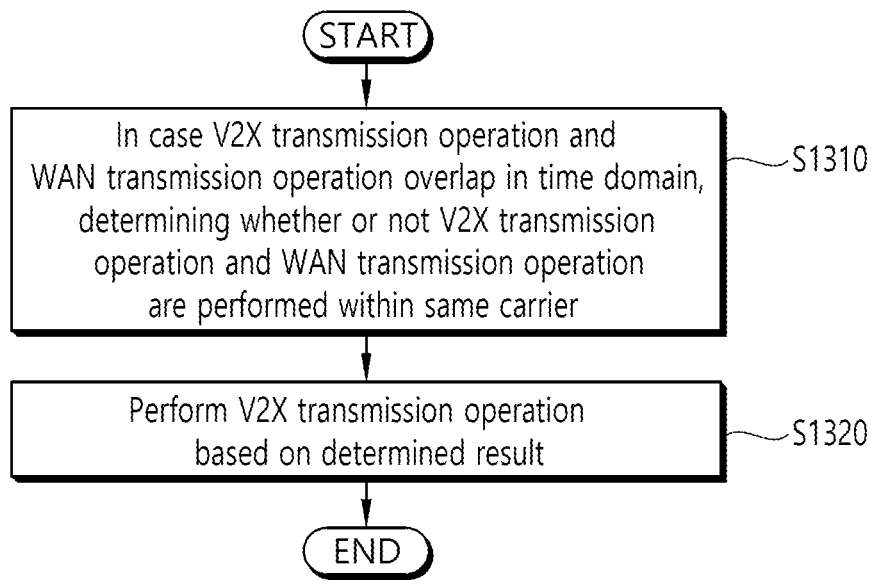
FIG. 21 is a flow chart of a V2X transmission method, in a case where a WAN transmission operation overlaps with a V2X transmission operation in a time domain, according to an exemplary embodiment of the present invention.

FIG. 21 is a flow chart of a V2X transmission method, in a case where a WAN transmission operation overlaps with a V2X transmission operation in a time domain, according to an exemplary embodiment of the present invention.

According to FIG. 21, in case the WAN transmission operation overlaps with the V2X transmission operation in the time domain, the UE may determine whether or not the WAN transmission operation and the V2X transmission operation are performed within the same carrier (S1310). At this point, the UE may correspond to the above-described V2X UE.

Thereafter, based on the determined result, the UE may perform the V2X transmission operation (S1320). More specifically, (A) a method of efficiently determining the V2X transmission power, in case the V2X transmission operation and the WAN (UL) transmission operation each being performed within a different carrier (partially or fully) overlap one another in the time domain and/or (B) a detailed method of prioritizing the V2X transmission operation (overlapping with the WAN (UL) transmission operation within the same carrier (and/or different carriers) in the time domain) over the WAN (UL) transmission, the method(s) being performed by the UE, will hereinafter be described in detail.

Figure 22:
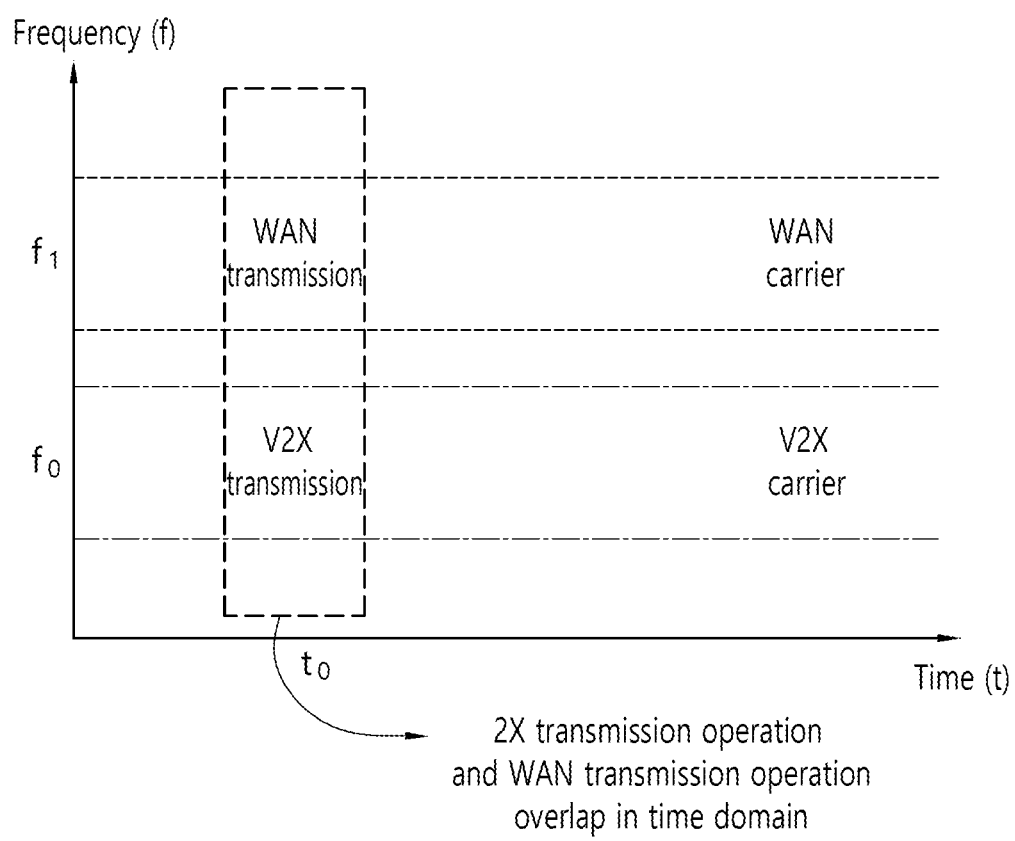
FIG. 22 shows a general example, wherein the V2X transmission operation and the WAN (UL) transmission operation each being performed within a different carrier (partially or fully) overlap one another in the time domain.

(A) A method of efficiently determining the V2X transmission power, in case the V2X transmission operation and the WAN (UL) transmission operation each being performed within a different carrier (partially or fully) overlap one another in the time domain FIG. 22 shows a general example, wherein the V2X transmission operation and the WAN (UL) transmission operation each being performed within a different carrier (partially or fully) overlap one another in the time domain.

As shown in FIG. 22, the UE may perform the V2X transmission at a t0 time point within a V2X carrier having an f0 frequency, and the UE may perform the WAN transmission at a t0 time point within a WAN carrier having an f1 frequency.

In the subframe, in case a sidelink transmission of the UE overlaps with an uplink transmission of the UE in the aspect of time, the UE is required to adjust the sidelink transmission power so that the total transmission power does not exceed $P_{CMAX}$ in the overlapping part.

Generally, according to the D2D operation, in case the WAN TX and the SL TX overlap one another in different carriers in the aspect of time, the WAN TX may be prioritized over the SL TX in the aspect of power assignment.

In other words, in case the D2D operations are performed within different carriers, and in case the WAN TX and the SL TX are performed at the same time point or at overlapping time points, the UE may assign a larger level of power to the WAN TX (as compared to the SL TX). However, as described above, in case of the V2X transmission that is performed by a V2X UE, which moves at a relatively faster speed, since the V2X transmission more frequently requires more urgent transmission operations as compared to the D2D transmission, the WAN transmission operation may not be prioritized over the V2X transmission operation.

Accordingly, in order to resolve this problem, the following exemplary embodiment may be provided.

Figure 23:
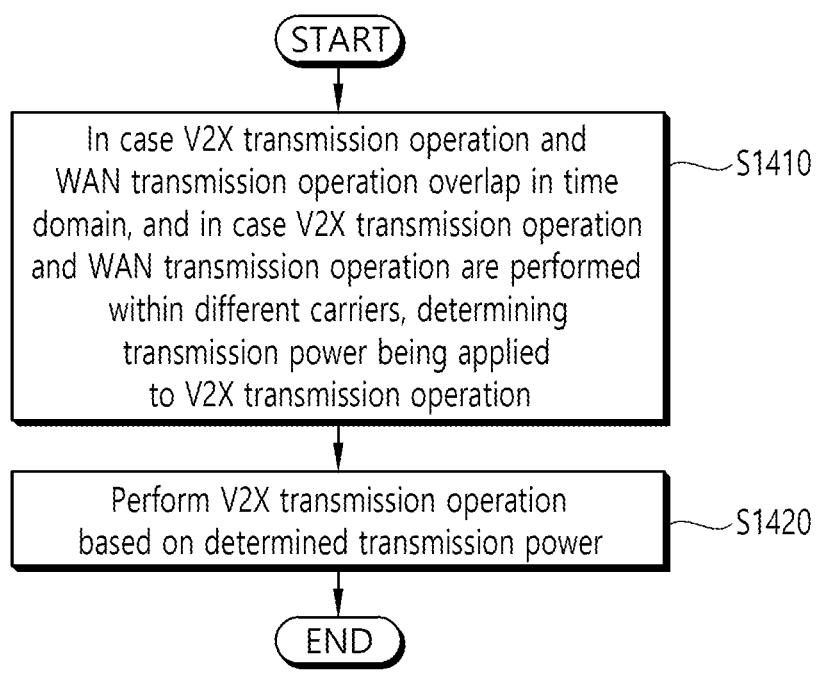
FIG. 23 is a flow chart of a V2X transmission method, in a case where a WAN transmission operation overlaps with a V2X transmission operation in a time domain, according to another exemplary embodiment of the present invention.

FIG. 23 is a flow chart of a V2X transmission method, in a case where a WAN transmission operation overlaps with a V2X transmission operation in a time domain, according to another exemplary embodiment of the present invention.

According to FIG. 23, in case the WAN transmission operation overlaps with the V2X transmission operation in the time domain, and in case the V2X transmission operation and the WAN transmission operation are each performed within a different carrier, the transmission power being applied to the V2X transmission operation may be determined (S1410). The UE may refer to a V2X UE. More specifically, the following options may be provided.

In case the following options are applied, when assigning the power, by assigning a higher priority level to the V2X TX (over the WAN TX), a degradation in the V2V performance may be efficiently prevented.

At this point, for example, in case a V2V TX occurs in a time domain that is configured along with a 'V2V gap', or in case a V2V TX having a ProSe priority per packet (PPPP) (pre-)configured therein is performed, the options listed below may be limitedly applied. According to Option 2 presented below, solutions (or procedures) being related to a dual connection may be re-used.

Option 1: Power is first assigned to the V2V TX, and the remaining power is assigned to the WAN TX.

Option 2: Minimum power for the V2V TX is ensured.

Herein, for example, a V2X message TX (partially and/or fully) overlaps with a WAN UL TX in the time domain, within different carriers (or frequencies) (and/or the same carrier (or frequency)) (in the point of view of a (one) specific V2X UE), (part of) the following rule may be applied so that the performance of the V2X message TX (having a relatively high PPPP) and/or the WAN UL TX (being relatively more important) (e.g., PUCCH(/PRACH) (/PUSCH/SRS)) can be guaranteed (or ensured) (at a maximum level).

Herein, for example, (part of) the following rule may be limitedly applied only in a case where a (time) synchronization difference between the V2X message TX and the WAN UL TX is greater than a pre-configured(/signaled) threshold value.

(Example #1) A "guaranteed minimum power (G_minpower))" may be configured(/signaled) in the V2X message TX (having a value that is greater than or equal to a pre-configured(/signaled) PPPP threshold value) and/or the WAN UL TX (of a pre-configured(/signaled) channel(/signal)).

Herein, for example, the process of applying the pre-configured(/signaled) G_minpower value within the WAN UL TX (and/or V2X message TX) may be limitedly performed only in a case where a ProSe priority per packet (PPPP) value of the V2X message TX that (partially or fully) overlaps (in the time domain) is greater than the pre-configured(/signaled) threshold value (for example, in case the PPPP value of the V2X message TX is smaller than the pre-configured(/signaled) threshold value, the power assignment to the WAN UL TX may be prioritized) (and/or a case where a sum of the (required) V2X message TX power value and the required WAN UL TX power value exceeds a maximum transmission power value (e.g., '23 DBM') of the UE).

Herein, for example, the WAN UL TX (and/or V2X message TX) related G_minpower value may be differently (or independently) configured(/signaled) for each PPPP value of the V2X message TX (being (partially or fully) overlapped (in the domain)).

(Example #2) In case the PPPP value of the overlapping V2X message TX (being (partially or fully) overlapped) (in the domain) is greater than the pre-configured(/signaled) threshold value, settings may be made so that the WAN UL TX can be omitted (for example, in case the PPPP value of the V2X message TX is smaller than the pre-configured(/signaled) threshold value, the V2X message TX may be omitted).

Herein, for example, the corresponding rule may be limitedly applied only in a case of performing WAN UL TX after excluding a pre-configured(/signaled) (important) channel(/signal) (e.g., PUCCH(/PRACH)(/PUSCH/SRS)).

Herein, for example, in case of the pre-configured(/signaled) (important) channel(/signal) (e.g., PUCCH(/PRACH)(/PUSCH/SRS)), the above-described (Example #1) (e.g., G_minpower) may be (exceptionally) applied (for example, this may be interpreted that settings are made so that the (corresponding) (important) channel(/signal) transmission is not omitted) and/or the V2X message TX may be (exceptionally) omitted.

The above-described details may be summarized as shown below.

Proposal: In summary, the two options listed below may support a prioritized power assignment to the SL TX over the WAN TX.
(1) Option 1: Power is first assigned to the V2V TX, and the remaining power is assigned to the WAN TX.
(2) Option 2: Minimum power for the V2V TX is ensured.
(B) A detailed method of prioritizing the V2X transmission operation (overlapping with the WAN (UL) transmission operation within the same carrier (and/or different carriers) in the time domain) over the WAN (UL) transmission FIG. 24 shows a general example, wherein the V2X transmission operation (overlapping with the WAN (UL) transmission operation within the same carrier (and/or different carriers) in the time domain) is prioritized over the WAN (UL) transmission.

Figure 24:
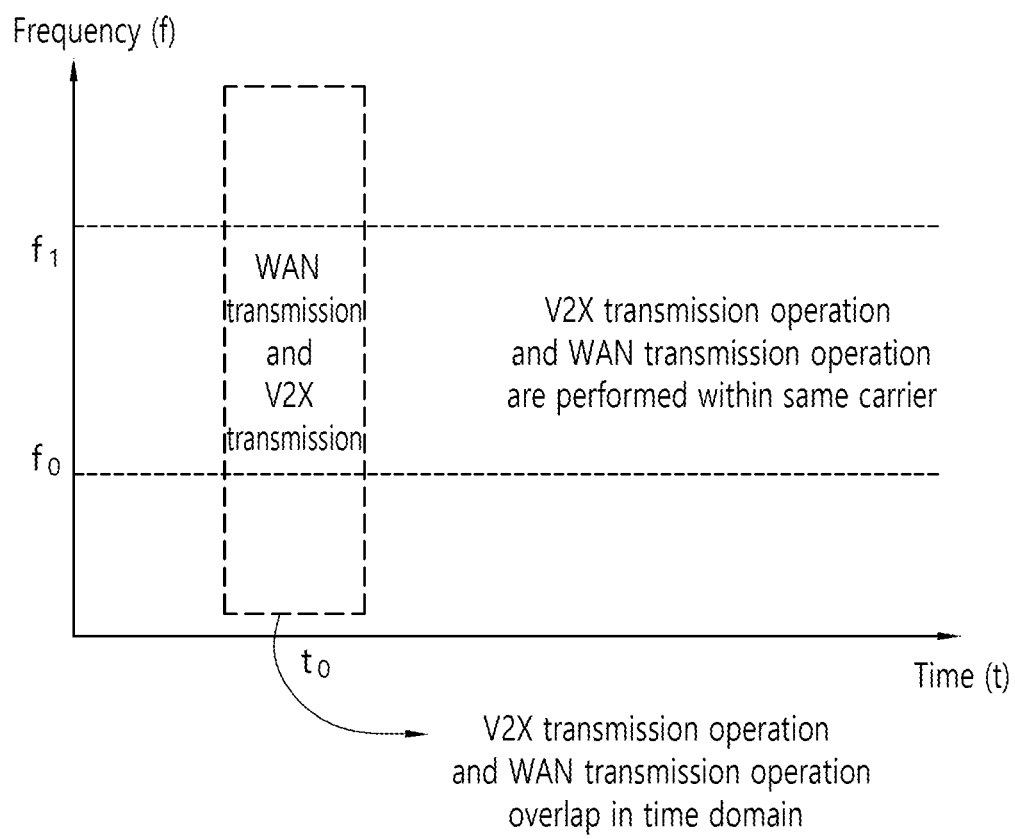
FIG. 24 shows a general example, wherein the V2X transmission operation (overlapping with the WAN (UL) transmission operation within the same carrier (and/or different carriers) in the time domain) is prioritized over the WAN (UL) transmission.

As shown in FIG. 24, the UE may perform the V2X transmission and WAN transmission at a t0 time point within the same carrier having an f0 frequency. Although FIG. 24 generally shows an example of performing the V2X transmission and the WAN transmission within the same carrier for simplicity in the description, the following exemplary embodiment of the present invention may also be applied to a case where the V2X transmission and the WAN transmission are performed within different carriers.

Herein, for the above-described PC5-based V2V and WAN co-existence, the following details may be supported.

Firstly, a sidelink open-loop power control may be re-used for the SL TX related to V2V.

Additionally, the SL TX for V2V may be prioritized over the WAN TX. At this point, the SL TX related to V2V may also apply the above-described D2D operations (e.g., Mode 1 and/o Mode 2). Herein, the priority level may be managed by the base station (eNB).

Moreover, the same receiver function of the D2D communication UE may be assumed in the V2V UE. More specifically, in case the UE is configured to receive V2V, the RX chain may be capable of always receiving the V2V signal without influencing the WAN reception.

Hereinafter, in case the WAN transmission operation overlaps with the V2X transmission operation in the time domain, the V2X transmission method will be described in more detail.

Figure 25:
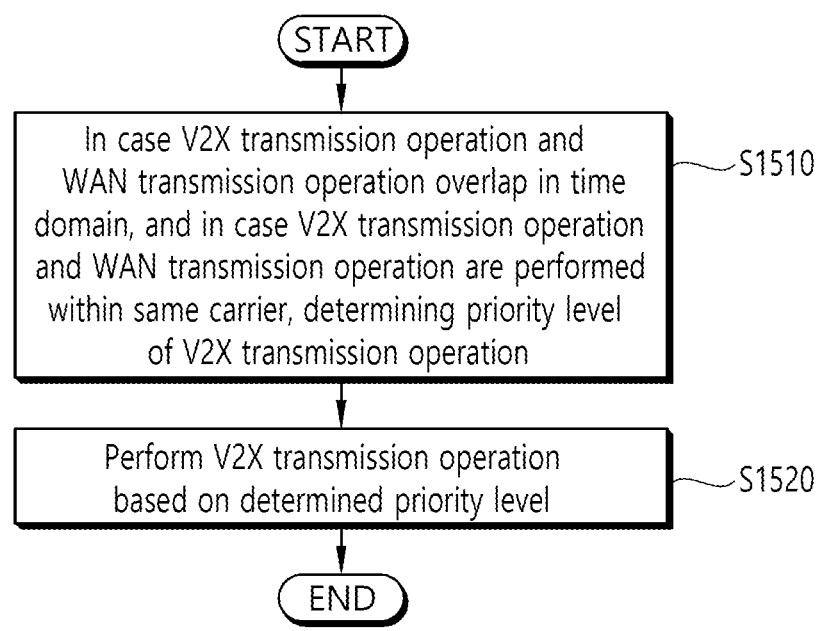
FIG. 25 is a flow chart of a V2X transmission method, in a case where a WAN transmission operation overlaps with a V2X transmission operation in a time domain, according to yet another exemplary embodiment of the present invention.

FIG. 25 is a flow chart of a V2X transmission method, in a case where a WAN transmission operation overlaps with a V2X transmission operation in a time domain, according to yet another exemplary embodiment of the present invention.

According to FIG. 25, in case the WAN transmission operation overlaps with the V2X transmission operation in the time domain, and in case the V2X transmission operation and the WAN transmission operation are performed within the same carrier, the UE may determine the priority level of the V2X transmission operation (S1510). At this point, the UE may correspond to the above-described V2X UE. More specifically, the following options may be applied.

It is important for the SL TX prioritization through the WAN TX to ensure (or guarantee) the V2V performance of the TM4 in a shared carrier case (i.e., SL TX and WAN TX within the same carrier). As one of the possible options supporting this function, the re-usage of a 'ProSe gap' (e.g., a time section during which the D2D TX being configured by the network is prioritized over the WAN TX) may be considered along with an optimized additional correction for a V2V traffic pattern.

As another example, it may be considered to always prioritize the V2V TX having the PPPP configured therein over the WAN TX. In other words, in case the V2V TX overlaps with the WAN TX within the same carrier in the aspect of time, the V2V TX having another PPPP may be dropped.

Proposal: In order to support the prioritization of the SL TX through the WAN TX, one of the following options may be selected.

Option 1: After applying a number of required corrections (e.g.: adoption of an additional cycle period being adequate for the V2V traffic pattern), a 'ProSe gap' that is related to Rel-13 eD2D search may be re-used. Herein, for example, in the correspond GAP ((time(/frequency)) resource) region, settings may be made so that only the V2X (message) TX, which is interconnected with a PPPP being equal to or greater than a pre-configured(/signaled) PPPP (or a specific PPPP that is pre-configured(/signaled), may be prioritized over the WAN UL TX.

Option 2: A V2V TX having a (pre-)configured PPPP may also be prioritized over the WAN TX.

In conclusion, the above-described details may be summarized as described below.

Proposal: In order to support the prioritization of the SL TX through the WAN TX, one of the following options may be selected.

(1) Option 1: After applying a number of required corrections (e.g.: adoption of an additional cycle period being adequate for the V2V traffic pattern), a 'ProSe gap' that is related to Rel-13 eD2D search may be re-used.

(2) Option 2: A V2V TX having a (pre-)configured PPPP may also be prioritized over the WAN TX.

As another example, in case of the P-UE(S), for the selection(/switching) operation between a "(partial) sensing-based resource selection behaviour(/pool)" and a "random resource selection behaviour(/pool)", its (final) performance or non-performance may be determined in accordance with whether or not the "congestion level" (which is (directly) measured by the P-UE(s), or which is received from another V2X entity (e.g., the (serving) base station, V-UE(s)) exceeds the pre-configured(/signaled) threshold value.

Herein, if the "congestion level" (which is (directly) measured by the P-UE(s) that has/have performed(/used) the "(partial) sensing-based resource selection behaviour (/pool)", or which is received from another V2X entity) exceeds the pre-configured(/signaled) threshold value, settings may be made so that the "random resource selection behaviour(/pool)" can be performed(/used).

Since the examples of the above-described proposed methods may be included as one of the implementation methods of the present invention, it will be apparent that the corresponding examples can be viewed (or considered) as a type of the proposed methods. Additionally, although the above-described proposed methods may be independently implemented, the above-described proposed methods may also be implemented in a combined (or integrated) form of parts of the proposed methods.

For example, although the present invention is described based on a 3GPP LTE system for simplicity in the description, the scope of systems in which the proposed methods can be applied may be extended to diverse systems other than the 3GPP LTE system.

For example, the proposed methods according to the present invention may also be extendedly applied to D2D communication. Herein, for example, D2D communication refers to performing communication between a UE and another UE by using a direct wireless channel. And, herein, for example, although the UE refers to a user device, in case a network equipment, such as a base station, transmits/receives signals according to a communication method performed between UEs, the corresponding network equipment may also be viewed as a type of UE.

Additionally, for example, the proposed methods according to the present invention may also be limitedly applied only in MODE 2 V2X operations (and/or MODE 1 V2X operations).

Additionally, for example, in addition to being applied to P-UE(s) having limited reception(/transmission) chain/circuit capability, the proposed methods according to the present invention may also be extendedly applied to vehicle UE(s) (V-UE(s)) (and/or P-UE(s) having non-limited reception(/transmission) chain/circuit capability).

Additionally, for example, the proposed methods according to the present invention may also be extendedly applied to a case where the WAN UL TX and the V2X message TX overlap with one another in different carrier(s) within the time domain.

Additionally, for example, the proposed methods according to the present invention may also be extendedly applied to a case where the P-UE(s) (having limited reception(/transmission) chain/circuit capability) perform(s) a "partial sensing operation" (corresponding to (part of) the resource section(/region)) within the "sensing gap(/resource) (or RX gap(/resource) or partial sensing gap(/resource))", which is received from the network (or base station) and/or a case where the P-UE(s) perform the "partial sensing operation" within (part of) the resource section(/region), which the P-UE(s) has/have configured(/signaled) (on its/their own), without receiving any of the corresponding related information.

Additionally, for example, the proposed methods according to the present invention may be limitedly applied only to a case where the P-UE(s) (having limited reception(/transmission) chain/circuit capability) perform(s) a 'partial sensing' (and/or 'full sensing') operation (based transmission resource selection) (and/or a case where the P-UE(s) (having limited reception(/transmission) chain/circuit capability) perform(s) transmission resource random selection (without performing any sensing operation).

Additionally, for example, the proposed methods according to the present invention may be limitedly applied only to a case where the V2X MESSAGE TX and the WAN UL TX (partially and/or fully) overlap with one another in the time domain within different carriers (or frequencies) (and/or the same carrier (or frequency) (in the point of view of a specific (one) V2X UE).

Figure 26:
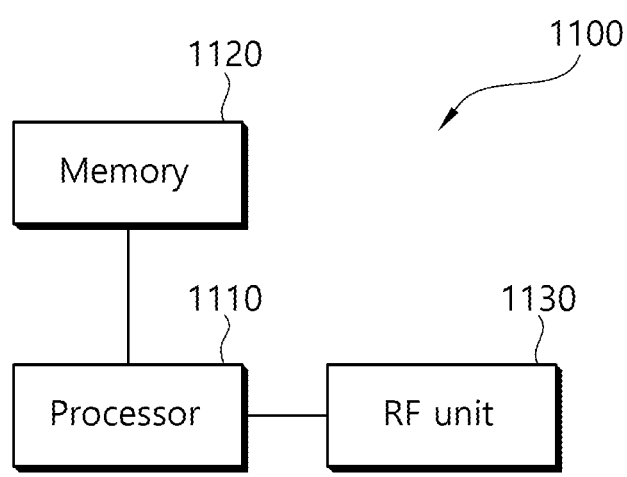
FIG. 26 is a block diagram showing a user equipment (UE) implementing an exemplary embodiment of the present invention.

FIG. 26 is a block diagram showing a user equipment (UE) implementing an exemplary embodiment of the present invention.

Referring to FIG. 26, a user equipment (UE) (1100) includes a processor (1110), a memory (1120), and a radio frequency (RF) unit (1130).

According to an exemplary embodiment of the present invention, the processor (1110) may execute the functions/operations/methods that are described in the present invention. For example, the processor (1110) may receive type information indicating a type of the resource pool, and, then, based on the type information, the processor (1110) may perform at least any one of random selection and partial sensing based random selection in the corresponding resource pool.

In case the type of the resource pool corresponds to the type wherein only the partial sensing based resource selection is allowed to be performed, the processor (1110) may semi-persistently reserve the resource that is selected by using the partial sensing based resource selection.

In case the type of the resource pool corresponds to the type wherein only the random selection is allowed to be performed, the processor (1110) may not semi-persistently reserve the resource that is selected by the random selection.

In case the type of the resource pool corresponds to the type wherein the partial sensing based resource selection is allowed to be performed, however, if the processor (1110) performs random selection in the corresponding resource pool, the processor (1110) may semi-persistently reserve the randomly selected resource. The resource being semi-persistently reserved has already been described above in detail with reference to FIG. 17.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for selecting a sidelink transmission resource in a wireless communication system, the method performed by a user equipment (UE) and comprising:
receiving type information indicating at least one resource selection mechanism allowed in a resource pool; and
performing a resource selection by one resource selection mechanism, among a partial sensing and a random selection, in the resource pool based on the type information,
wherein the type information indicates whether the partial sensing is allowed for the UE selecting a resource in the resource pool and whether the random selection is allowed for the UE selecting a resource in the resource pool, and
wherein:
based on i) the type information indicating both the partial sensing and the random selection are allowed in a resource pool and ii) the UE performing the resource selection by the random selection in the resource pool, resources selected by the random selection are reserved for a predetermined period of time.

2. The method of claim 1, wherein the partial sensing is a resource selection mechanism that the UE senses only some subframes, among subframes in a sensing window, and selects a specific subframe in a selection window as a sidelink transmission subframe based on the sensing result.

3. The method of claim 2, wherein the sensing window comprises 1,000 consecutive subframes, and wherein the selecting window comprises 100 consecutive subframes located after the sensing window.

4. A user equipment (UE), comprising:
a transceiver;
at least one processor; and
at least one computer memory operatively connected to the at least one processor and storing instructions that, based on being executed by the at least one processor, perform operations comprising:
receiving, via the transceiver, type information indicating at least one resource selection mechanism allowed in a resource pool, and
performing a resource selection by one resource selection mechanism, among a random selection and a partial sensing, in the resource pool based on the type information,
wherein the type information indicates whether the partial sensing is allowed for the UE selecting a resource in the resource pool and whether the random selection is allowed for the UE selecting a resource in the resource pool, and
wherein:
based on i) the type information indicating both the partial sensing and the random selection are allowed in a resource pool and ii) the UE performing the resource selection by the random selection in the resource pool, resources selected by the random selection are reserved for a predetermined period of time.

5. The UE of claim 4, wherein the partial sensing is a resource selection mechanism that the UE senses only some subframes, among subframes in a sensing window, and selects a specific subframe in a selection window as a sidelink transmission subframe based on the sensing result.

6. The UE of claim 5, wherein the sensing window comprises 1,000 consecutive subframes, and wherein the selecting window comprises 100 consecutive subframes located after the sensing window.

7. An apparatus, the apparatus comprising:
at least one processor; and
at least one computer memory operatively connected to the at least one processor and storing instructions that, based on being executed by the at least one processor, perform operations comprising:
receiving type information indicating at least one resource selection mechanism allowed in a resource pool, and
performing a resource selection by one resource selection mechanism, among a random selection and a partial sensing, in the resource pool based on the type information,
wherein the type information indicates whether the partial sensing is allowed for the apparatus selecting a resource in the resource pool and whether the random selection is allowed for the apparatus selecting a resource in the resource pool, and
wherein:
based on i) the type information indicating both the partial sensing and the random selection are allowed in a resource pool and ii) the at least one processor performing the resource selection by the random selection in the resource pool, resources selected by the random selection are reserved for a predetermined period of time.

8. The apparatus of claim 7, wherein the partial sensing is a resource selection mechanism that the apparatus senses only some subframes, among subframes in a sensing window, and selects a specific subframe in a selection window as a sidelink transmission subframe based on the sensing result.

9. The apparatus of claim 8, wherein the sensing window comprises 1,000 consecutive subframes, and wherein the selecting window comprises 100 consecutive subframes located after the sensing window.

* * * * *